US012546786B2

(12) United States Patent
Tong et al.

(10) Patent No.: US 12,546,786 B2
(45) Date of Patent: Feb. 10, 2026

(54) CIRCULATORY BIOMARKERS FOR PLACENTAL OR FETAL HEALTH

(71) Applicant: THE UNIVERSITY OF MELBOURNE, Melbourne (AU)

(72) Inventors: Stephen Tong, Melbourne (AU); Tu'uhevaha Joy Lino, Melbourne (AU); Teresa Mary MacDonald, Melbourne (AU); Susan Philippa Walker, Melbourne (AU)

(73) Assignee: THE UNIVERSITY OF MELBOURNE, Melbourne (AU)

( * ) Notice: Subject to any disclaimer, the term of this patent is extended or adjusted under 35 U.S.C. 154(b) by 344 days.

(21) Appl. No.: 17/056,881

(22) PCT Filed: May 24, 2019

(86) PCT No.: PCT/AU2019/050516
§ 371 (c)(1),
(2) Date: Nov. 19, 2020

(87) PCT Pub. No.: WO2019/222812
PCT Pub. Date: Nov. 28, 2019

(65) Prior Publication Data
US 2021/0199663 A1 Jul. 1, 2021

(30) Foreign Application Priority Data
May 24, 2018 (AU) .............................. 2018901813

(51) Int. Cl.
*G01N 33/68* (2006.01)
*C12Q 1/6876* (2018.01)

(52) U.S. Cl.
CPC ......... *G01N 33/689* (2013.01); *C12Q 1/6876* (2013.01); *C12Q 2600/112* (2013.01); *G01N 2333/471* (2013.01); *G01N 2800/368* (2013.01)

(58) Field of Classification Search
None
See application file for complete search history.

(56) References Cited

U.S. PATENT DOCUMENTS

| | | | |
|---|---|---|---|
| 5,270,163 A | 12/1993 | Gold et al. | |
| 5,475,096 A | 12/1995 | Gold et al. | |
| 5,840,867 A | 11/1998 | Toole et al. | |
| 6,268,222 B1 | 7/2001 | Chandler et al. | |
| 6,306,610 B1 | 10/2001 | Bawendi et al. | |
| 6,544,776 B1 | 4/2003 | Gold et al. | |
| 6,592,822 B1 | 7/2003 | Chandler | |
| 6,599,331 B2 | 7/2003 | Chandler et al. | |
| 2014/0349881 A1* | 11/2014 | Thomas ............... | G01N 33/689 506/18 |

FOREIGN PATENT DOCUMENTS

| | | |
|---|---|---|
| WO | 2007/097741 A1 | 8/2007 |
| WO | 2009/097579 A1 | 8/2009 |
| WO | 2017/181367 A1 | 10/2017 |

OTHER PUBLICATIONS

Heng (PLOS ONE May 2014 vol 9 Issue 5 e96901 pp. 1-13).*
Coleman (Drug Discovery Today. 2003. 8: 233-235).*
Pramatirta (BMC Res Notes 2015 8:208).*
Chan (G&P magazine 2006 vol. 6 No. 3 pp. 20-26).*
Gaccioli (American Journal of Obstetrics and Gynecology Feb. 2018 S725-S733).*
Watanabe, et al., "Changes in plasma levels of hepatocyte growth factor and its associated factors during pregnancy", J Obstet Gynaecol Res., vol. 32, No. 1, pp. 10-14, Feb. 2006.
Anson-Cartwright, et al., "The glial cells missing-1 protein is essential for branching morphogenesis in the chorioallantoic placenta", Nat Genet, vol. 25, pp. 311-314, 2000.
Bakalis et al., "Prediction of small-for-gestational-age neonates: screening by maternal biochemical markers at 30-34 weeks", Ultrasound in obstetrics and genecology, 46, pp. 208-215, 2015.
Barker, "In utero programming of chronic disease", Clinical Science, 95, pp. 115-128, 1998.
Barker, "In Utero Programming of Cardiovascular Disease", Theriogenology, 53. pp. 555-574, 2000.
Barker, et al., "Infant Mortality, Childhood, Nutrition, and Ischaemic Heart Disease in England and Wales", Lancet, 1. pp. 1077-1081, 1986.
Benton et al., "Can placental growth factor in maternal circulation identify fetuses with placental intrauterine growth restriction?", Am J Obstet Gynecol, 206, 163e, pp. 161-167, 2012.
Brownfoot et al., "Metformin as a prevention and treatment for preeclampsia: effects on soluble fms-like tyrosine kinase 1 and soluble endoglin secretion and endothelial dysfunction", Am J Obstet Gyneocol, 214, pp. 356e1-356e15, 2016.
Brownfoot et al., "Effects of Pravastatin on Human Placenta, Endothelium, and Women With Severe Preeclampsia", Hypertension, 66, pp. 687-697, 2015.
Chaiworapongsa et al., "Maternal plasma concentrations of angiogenic/antiangiogenic factors in the third trimester of pregnancy to identify the patient at risk for stillbirth at or near term and severe late preeclampsia", American Journal of Obstetrics and Gynecology, 208(287):e281-287, e215, 2013.
Cooper et al., "Growth in infancy and bone mass in later life", Annals of the Rheumatic Disease, vol. 56, pp. 17-21, 1997.
Fadigas et al., "Prediction of small-for-gestational-age neonates: screening by fetal biometry at 35-37 weeks", Ultrasound in obstetrics and genecology, 45, pp. 559-565, 2015.

(Continued)

*Primary Examiner* — Amanda Haney
(74) *Attorney, Agent, or Firm* — BakerHostetler

(57) ABSTRACT

Disclosed are assays, protocols and reagents to facilitate clinical management of pregnancy with improved pre- and post-natal health outcomes for fetuses developing in an environment of placental insufficiency.

8 Claims, 17 Drawing Sheets
Specification includes a Sequence Listing.

(56) References Cited

OTHER PUBLICATIONS

Fan et al., "Transient, Inducible, Placenta-Specific Gene Expression in Mice", Endocrinology, vol. 153, No. 11, pp. 5637-5644, 2012.
Griffin et al., "Diagnostic accuracy of placental growth factor and ultrasound parameters to predict the small-forgestational-age infant in women presenting with reduced symphysis-fundus height", Ultrasound in obstetrics and genecology, 46, pp. 182-190, 2015.
Hales, et al., "Type 2 (non-insulin-dependent) diabetes mellitus: the thrifty phenotype hypothesis*", Diabetologia 35, pp. 595-601, 1992.
Higgins et al., "Placental phenotype and resource allocation to fetal growth are modified by the timing and degree of hypoxia during mouse pregnancy", The Journal of physiology, 594.5, pp. 1341-1356, 2016.
Kaitu'u-Lino et al., "MMP-14 is Expressed in Preeclamptic Placentas and Mediates Release of Soluble Endoglin", The American journal of pathology, vol. 180, No. 3, pp. 888-894, 2012.
Kaitu'u-Lino et al., "Characterization of protocols for primary trophoblast purification, optimized for functional investigation of sFlt-1 and soluble endoglin", Pregnancy hypertension, 4, pp. 287-295, 2014.
Kaitu'u-Lino et al., "Activating Transcription Factor 3 is Reduced in Preeclamptic Placentas and Negatively Regulates sFlt-1 (Soluble fms-Like Tyrosine Kinase 1), Soluble Endoglin, and Proinflammatory Cytokines in Placenta", Hypertension, 70, pp. 1014-1024, 2017.
Kumasawa et al., "Pravastatin induces placental growth factor (PGF) and ameliorates preeclampsia in a mouse model", Proc Natl Acad Sci USA, vol. 108, No. 4, pp. 1451-1455, 2011.
Miller et al., "The consequences of fetal growth restriction on brain structure and neurodevelopmental outcome", The Journal of Physiology, 594, pp. 807-823, 2016.
Mifsud, et al., "Placental Pathology in Early-Onset and Late-Onset Fetal Growth Restriction", Fetal diagnosis and therapy, 36, pp. 117-128, 2014.
Moutier et al., "Placental anomalies and fetal loss in mice, after administration of doxycycline in food for Tet-system activation", Transgenic research, 12, pp. 369-373, 2003.
Onda et al., "Proton Pump Inhibitors Decrease Soluble fms-Like Tyrosine Kinase-1 and Soluble Endoglin Secretion, Decrease Hypertension, and Rescue Endothelial Dysfunction", Hypertension, 69, pp. 457-468, 2017.
Paiva et al., "Measurement of mRNA Transcripts of Very High Placental Expression in Maternal Blood as Biomarkers of Preeclampsia", J Clin Endocrinol Metab, vol. 96, No. 11, pp. E1807-1815, 2011.
Sovio et al., "Screening for fetal growth restriction with universal third trimester ultrasonography in nulliparous women in the Pregnancy Outcome Prediction (POP) study: a prospective cohort study", Lancet, 386, pp. 2089-2097, 2015.
Szabo et al., "Matriptase inhibition by hepatocyte growth factor activator inhibitor-1 is essential for placental development", Oncogene, 26, pp. 1546-1556, 2007.
Szabo et al., "Regulation of Feto-Maternal Barrier by Matriptase- and PAR-2-Mediated Signaling is Required for Placental Morphogenesis and Mouse Embryonic Survival", PLOS genetics, vol. 10, Issue 7, p. e1004470, 2014.
Tanaka et al., "Hepatocyte Growth Factor Activator Inhibitor Type 1 (HAI-1) is Required for Branching Morphogenesis in the Chorioallantoic Placenta", Mol Cell Biol, vol. 25, No. 13, pp. 5687-5698, 2005.
Tong et al., "Heme Oxygenase-1 is Not Decreased in Preeclamptic Placenta and Does Not Negatively Regulate Placental Soluble fms-Like Tyrosine Kinase-1 or Soluble Endoglin Secretion", Hypertension, 66, pp. 1073-1081, 2015.
Fadigas, et al., "Prediction of small-for-gestational-age neonates: screening by placental growth factor and soluble fms-like tyrosine kinase-1 at 35-37 weeks", Ultrasound Obstet Gynecol, vol. 46, pp. 191-197, 2015.
George, "Hypoxia and Ischemia Regulate Placental Syndecan Expression and Shedding", The FASEB Journal, vol. 30, Issue S1, 2016.

Schmedt, et al., "Evaluation of placental syndecan-1 expression in early pregnancy as a predictive fetal factor for pregnancy outcome", Prenatal Diagnosis, vol. 32, pp. 131-137, 2012.
Schlembach, et al., "Angiogenic growth factor levels in maternal and fetal blood: correlation with Doppler ultrasound parameters in pregnancies complicated by pre-eclampsia and intrauterine growth restriction", Ultrasound Obstet Gynecol, vol. 29, pp. 407-413, 2007.
Van Herrewege, "The abundance of several proteins identified in pre-diagnosis samples from women with pre-eclampsia is altered in placental explant cultured under hypoxic conditions", Reproductive Sicences, vol. 21, No. 3, Mar. 2014.
Sahasrabudhe, et al., "Chronic Endometritis and Recurrent Pregnancy Loss", Curr Obstet Gynecol Rep, vol. 6, pp. 55-61, 2017.
Eddy, et al., "Oxidative Stress Drives ECM Shedding in Placental Trophoblasts", FASEB Journal, vol. 31, No. 1, 2017.
Baston-Büst, et al., "Are Leptin and Corticosterone responsible for Metabolic and Reproductive Modifications in the Syndecan-1 Knock out Mouse?", Reproduktionsmed Endokrinol, vol. 14, No. 1, 2017.
GenBank Accession No. AJ551176.1, Homo sapiens mRNA for Syndecan-1 (SDC-1 gene), Oct. 7, 2008.
Altschul, et al., "Gapped BLAST and PSI-BLAST: A new generation of protein database search programs", Nucleic Acids Research, vol. 25, No. 17, pp. 3389-3402, 1997.
Boulvain, et al., "Induction of labour versus expectant management for large-for-date fetuses: a randomised controlled trial", The Lancet, vol. 385, Issue 9987, pp. 2600-2605, 2015.
Seed, et al., "Summary statistics for diagnostic tests", Stata Technical Bulletin 59: 9-12, Reprinted in Stata Technical Bulletin Reprints, vol. 10, pp. 90-93, 2001.
Gribskov, "Sigma factors from E. coli, B. subtilis, phage SP01, and phage T4 are homologous proteins", Nucleic Acids Res., 14(16), pp. 6745-6763, Aug. 26, 1986.
Grobman, et al., "Labor Induction versus Expectant Management in Low-Risk Nulliparous Women", New England Journal of Medicine, vol. 379, No. 6, pp. 513-523, Aug. 9, 2018.
NM_003710.3, Homo sapiens serine peptidase inhibitor, Kunitz type 1 (SPINT1), transcript variant 2, mRNA, Mar. 4, 2019.
NM_181642.2, Homo sapiens serine peptidase inhibitor, Kunitz type 1 (SPINT1), transcript variant 2, mRNA, Mar. 4, 2019.
NM_001032367.1, Homo sapiens serine peptidase inhibitor, Kunitz type 1 (SPINT1), transcript variant 3, mRNA, Mar. 4, 2019.
NP_003701.1, kunitz-type protease inhibitor 1 isoform 2 precursor [Homo sapiens], Feb. 20, 2021.
NP_857593.1, kunitz-type protease inhibitor 1 isoform 1 precursor [Homo sapiens], Feb. 20, 2021.
NP_001027539.1, kunitz-type protease inhibitor 1 isoform 2 precursor [Homo sapiens], Feb. 20, 2021.
Romari's, et al., "Molecular Polymorphism of the Syndecans", The Journal of Biological Chemistry, vol. 274, No. 26, pp. 18667-18674, 1999.
Smith, et al., "Comparison of Biosequences", Advances in Applied Mathematics, vol. 2, Issue 4, pp. 482-489, Dec. 1981.
XP_005262679.1, syndecan-1 isoform X3 [Homo sapiens], Nov. 21, 2020.
XM_005262620.4, Predicted: Homo sapiens syndecan 1 (SDC1) transcript variant X1, mRNA, Nov. 21, 2020.
XM_005262621.3, Predicted: Homo sapiens syndecan 1 (SDC1) transcript variant X2, mRNA, Nov. 21, 2020.
XM_005262622.2, Predicted: Homo sapiens syndecan 1 (SDC1), ranscript variant X3, mRNA, Nov. 21, 2020.
XP_005262677.1, syndecan-1 isoform X1 [Homo sapiens], Nov. 21, 2020.
XP_005262678.3, syndecan-1 isoform X2 [Homo sapiens], Nov. 21, 2020.
Kaitu'u-Lino, et al., "Circulating SPINT1 is a biomarker of pregnancies with poor placental function and fetal growth restriction", Nature Communications, vol. 11, Article No. 2411, 2020.
Tong, et al., "Circulating serine peptidase inhibitor Kunitz type 1 (SPINT1) in the second trimester is reduced among pregnancies that end in low birthweight neonates: cohort study of 2006 pregnancies", Am J Obstet Gynecol MFM, 4(4), 100618, 2022.

(56) References Cited

OTHER PUBLICATIONS

Osuchukwu, et al., "Small for Gestational Age", National Library of Medicine, StatPearls Publishing, Treasure Island (FL), 2023.

* cited by examiner

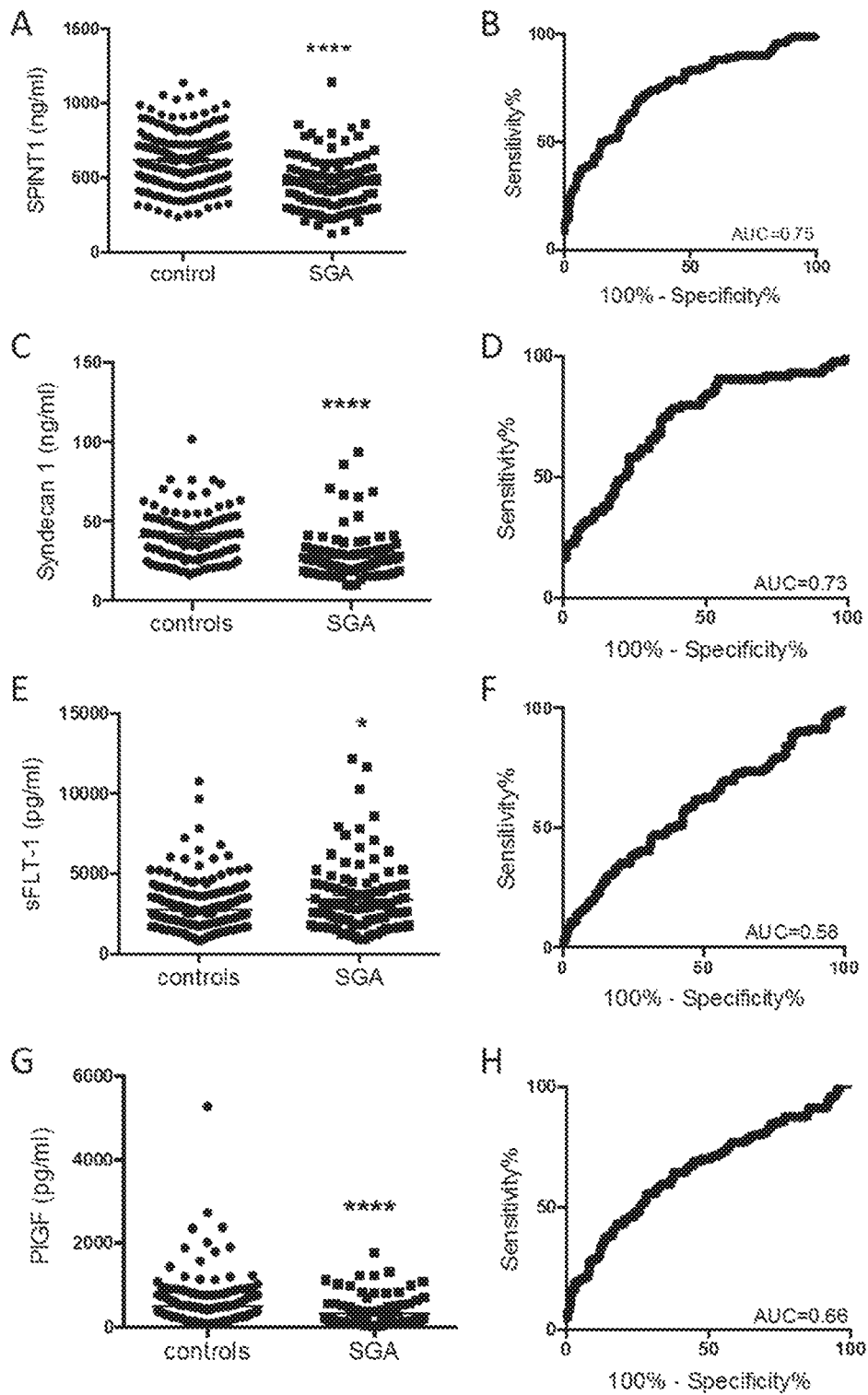
Figures 1A to H

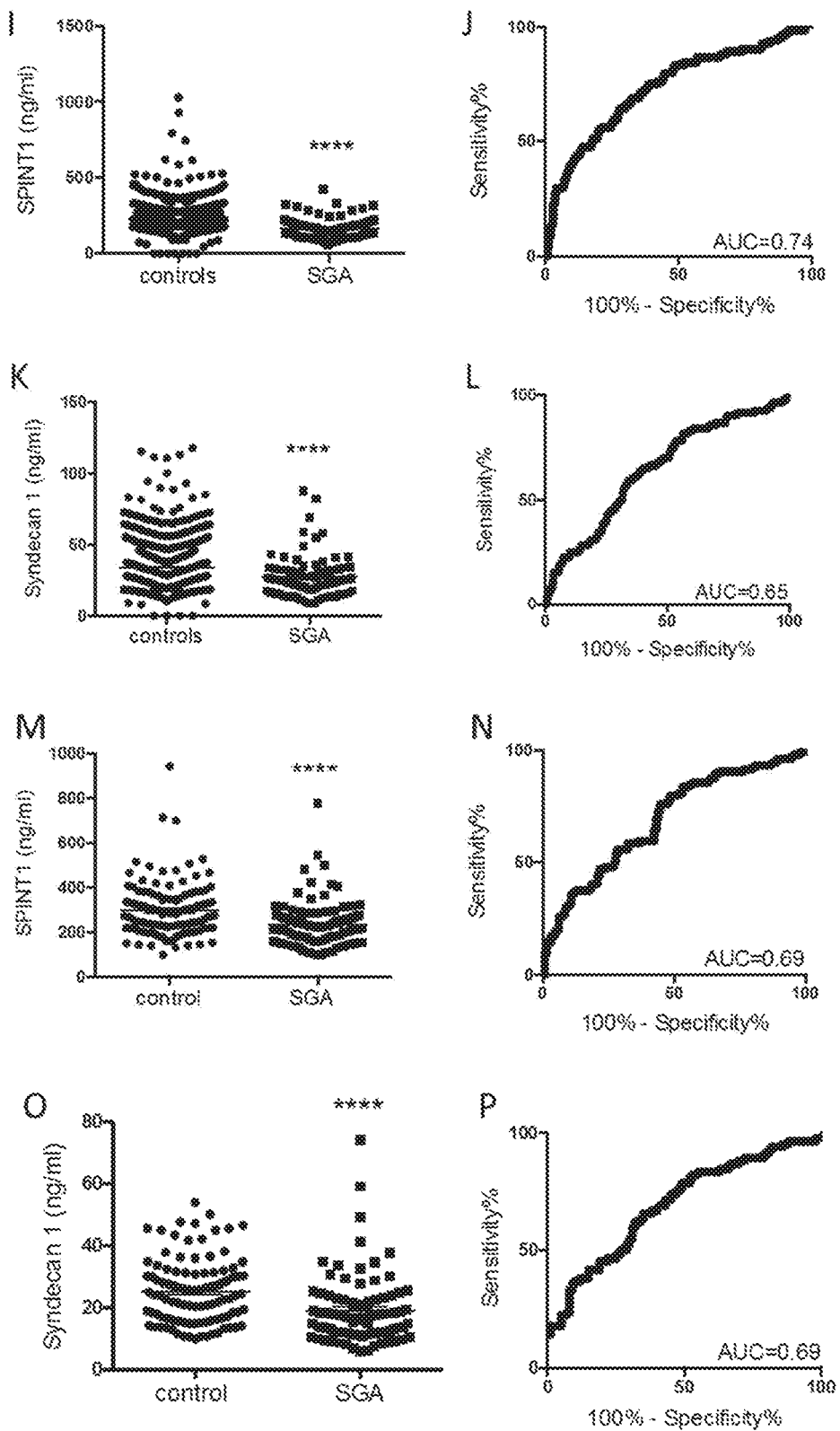
Figures 1J to P

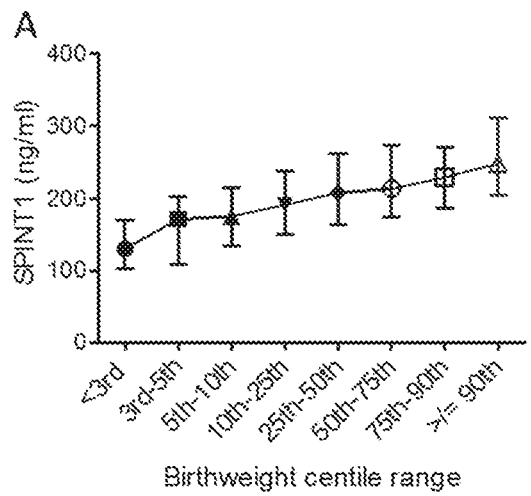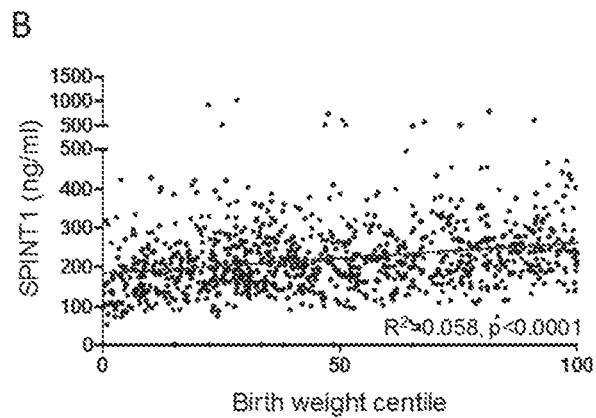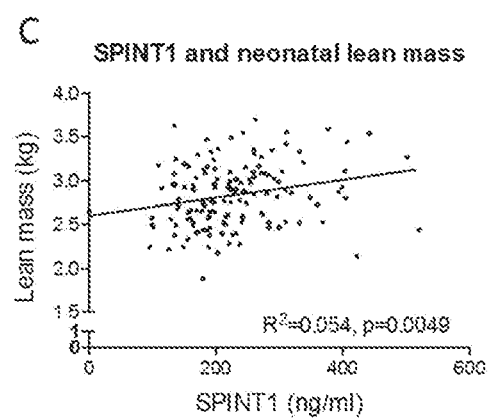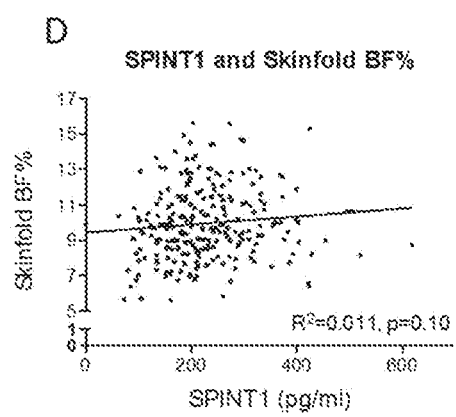
Figures 2A to D

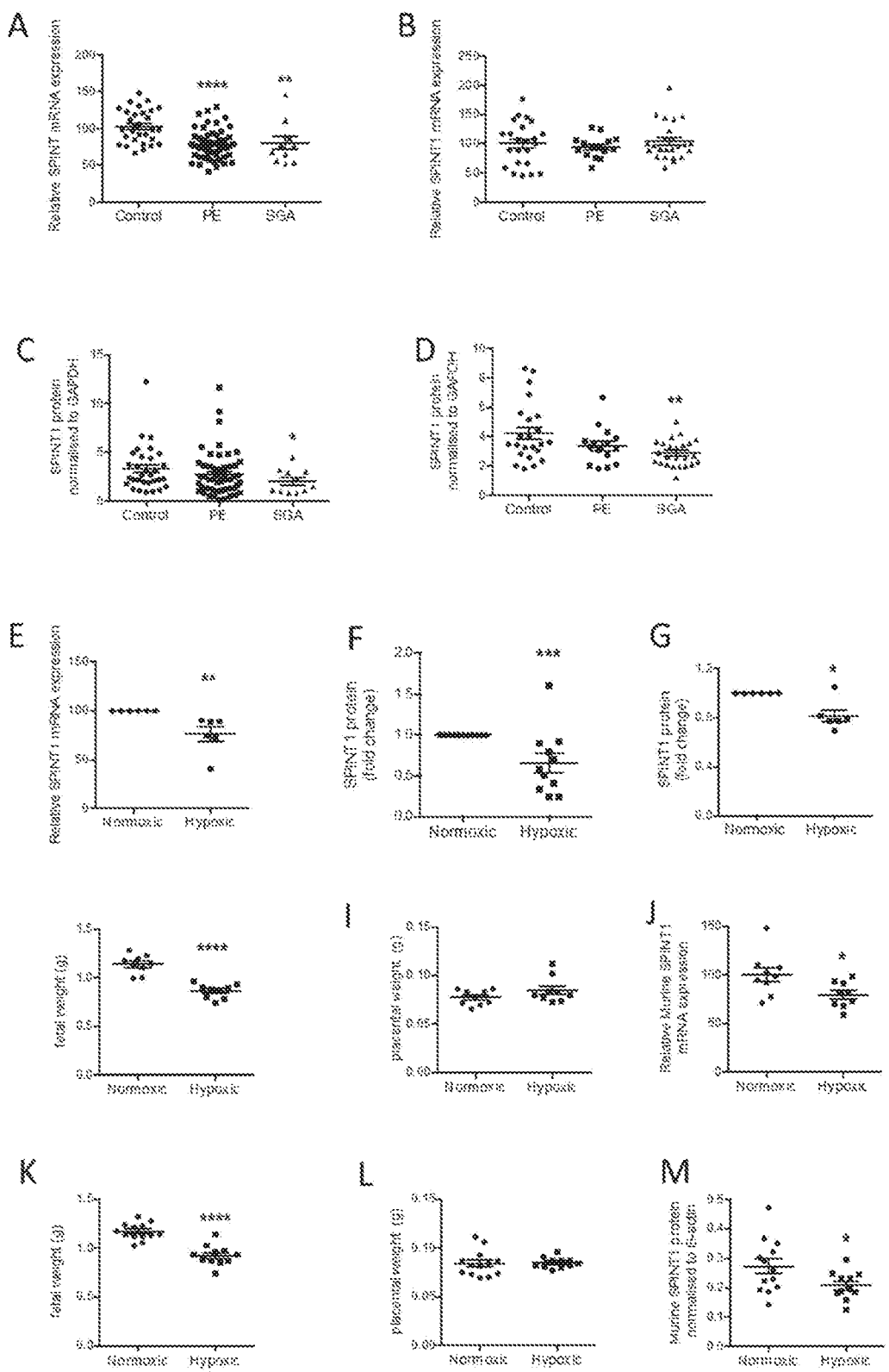
Figures 3A to M

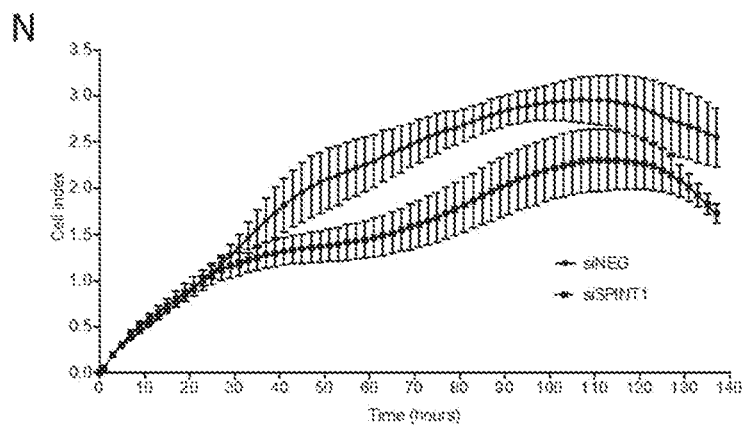
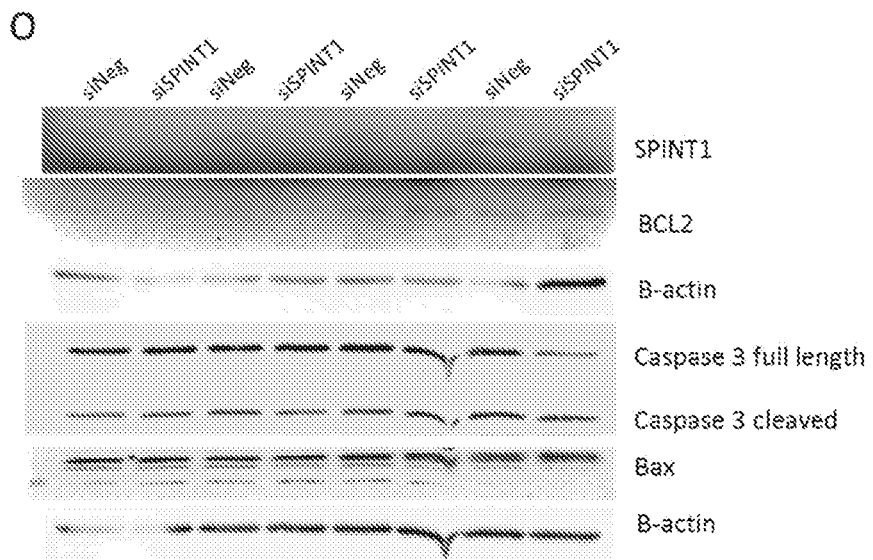
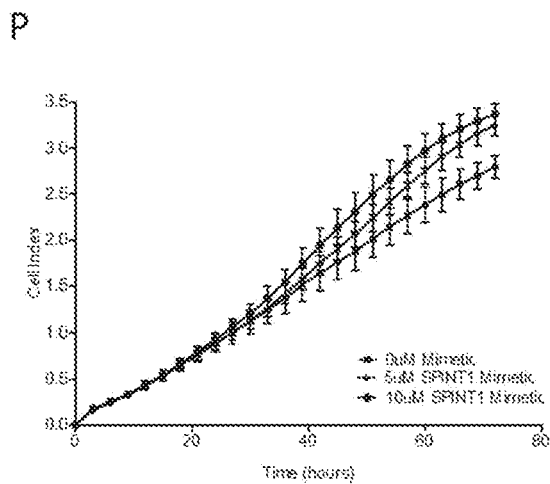
Figures 3N to P

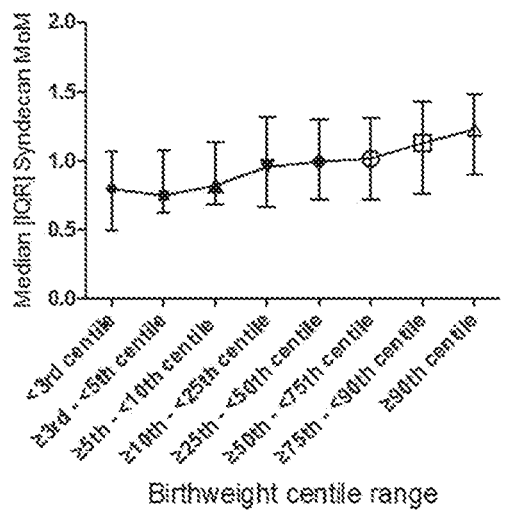
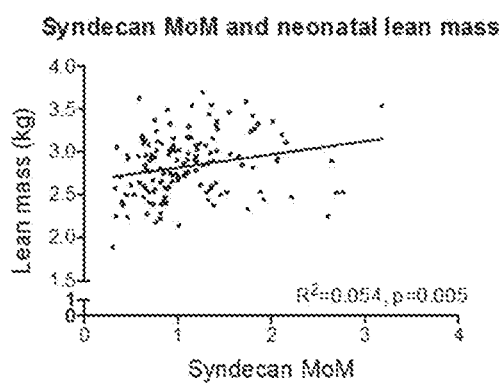
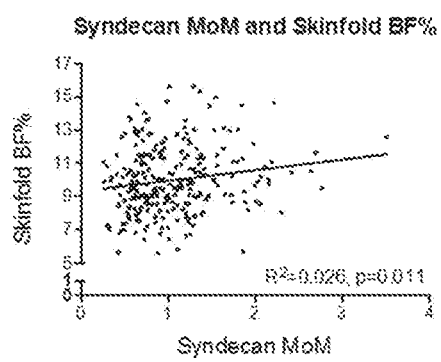
Figures 4A to C

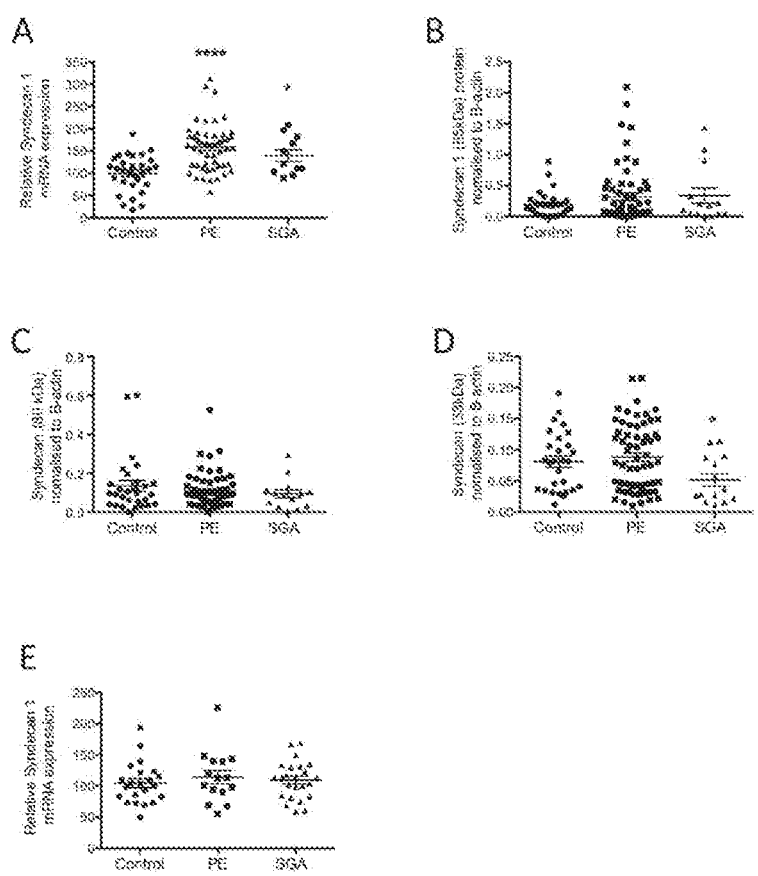
Figures 5A to E

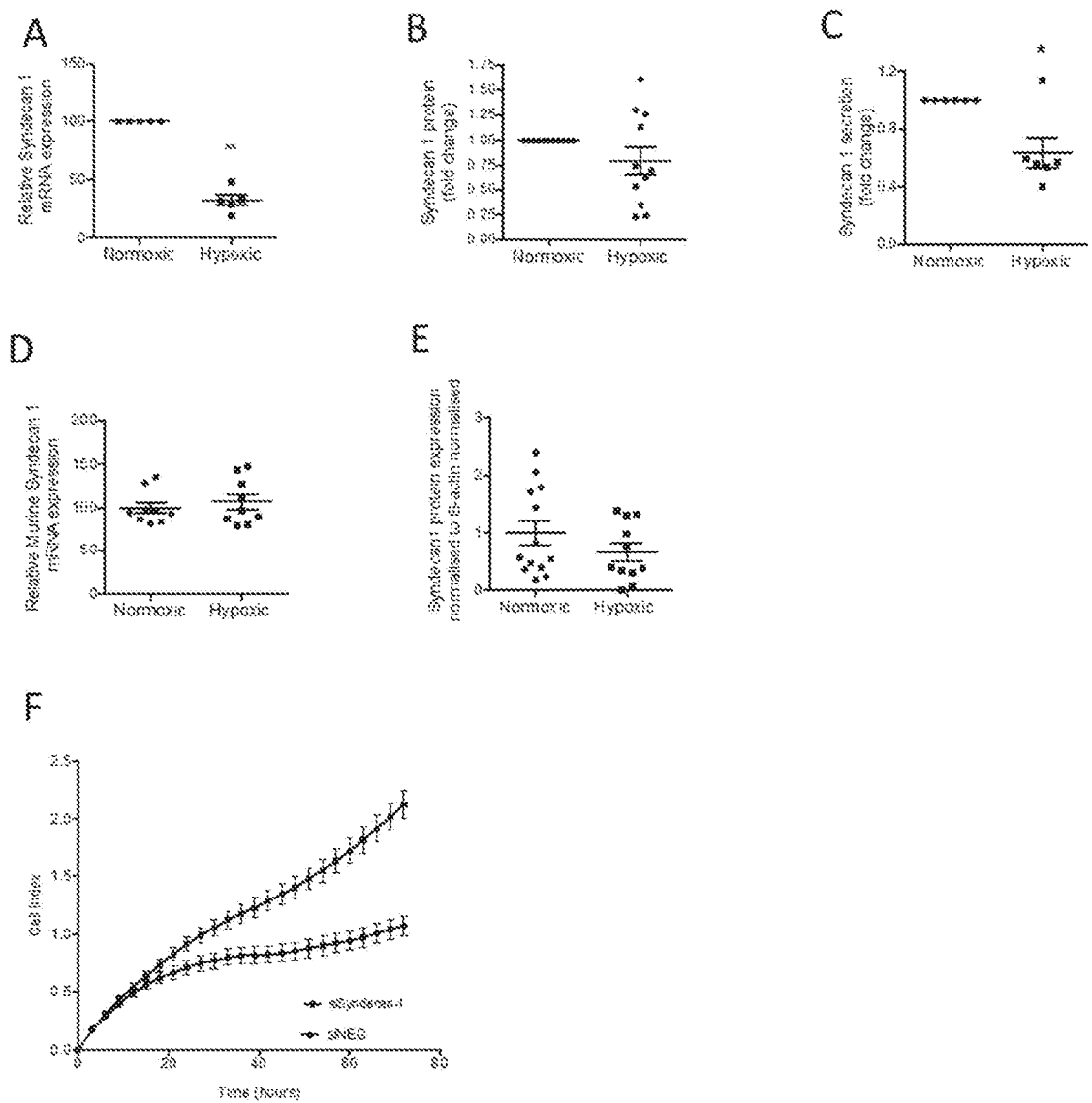
Figures 6A to F

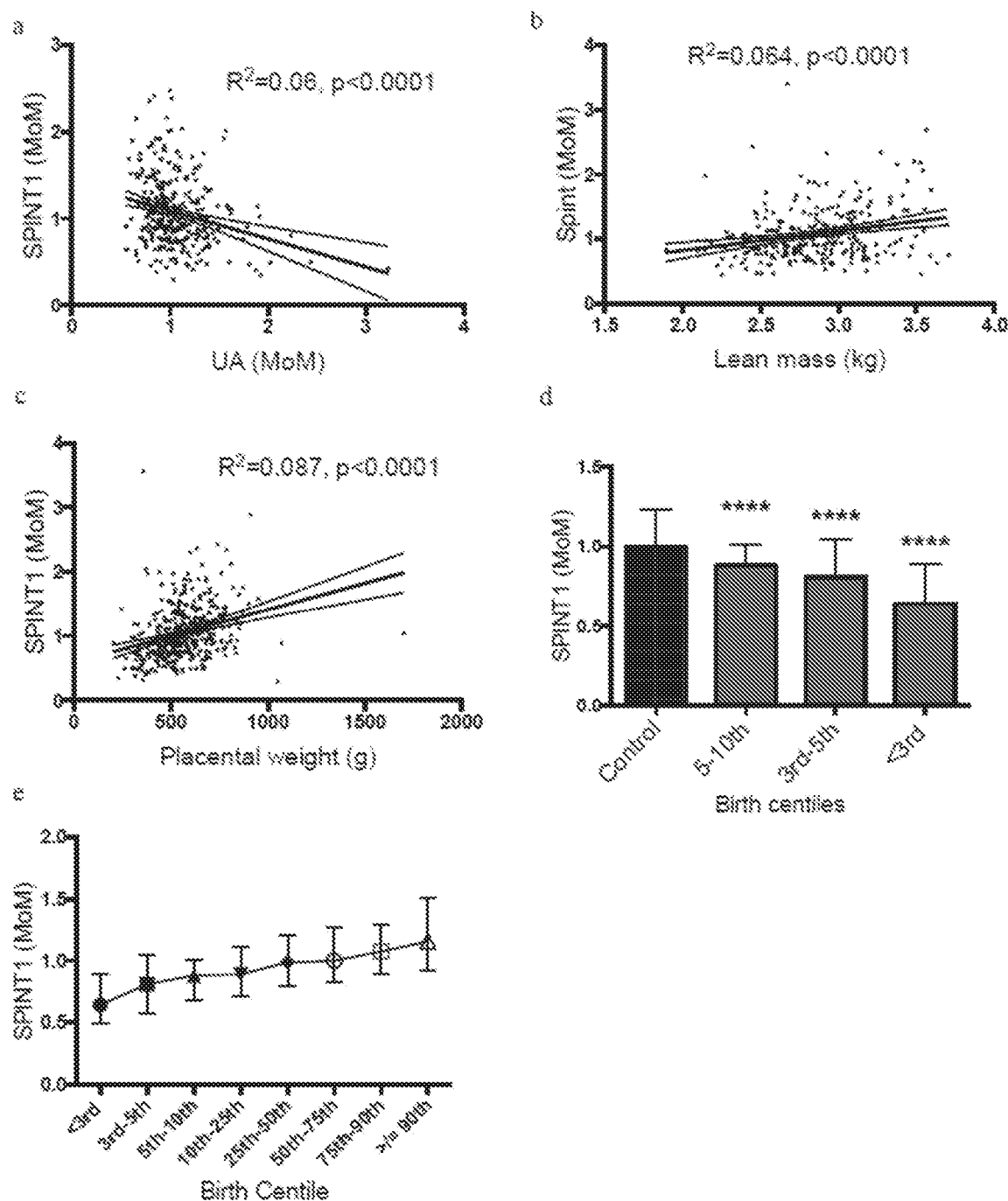
Figures 7a to e

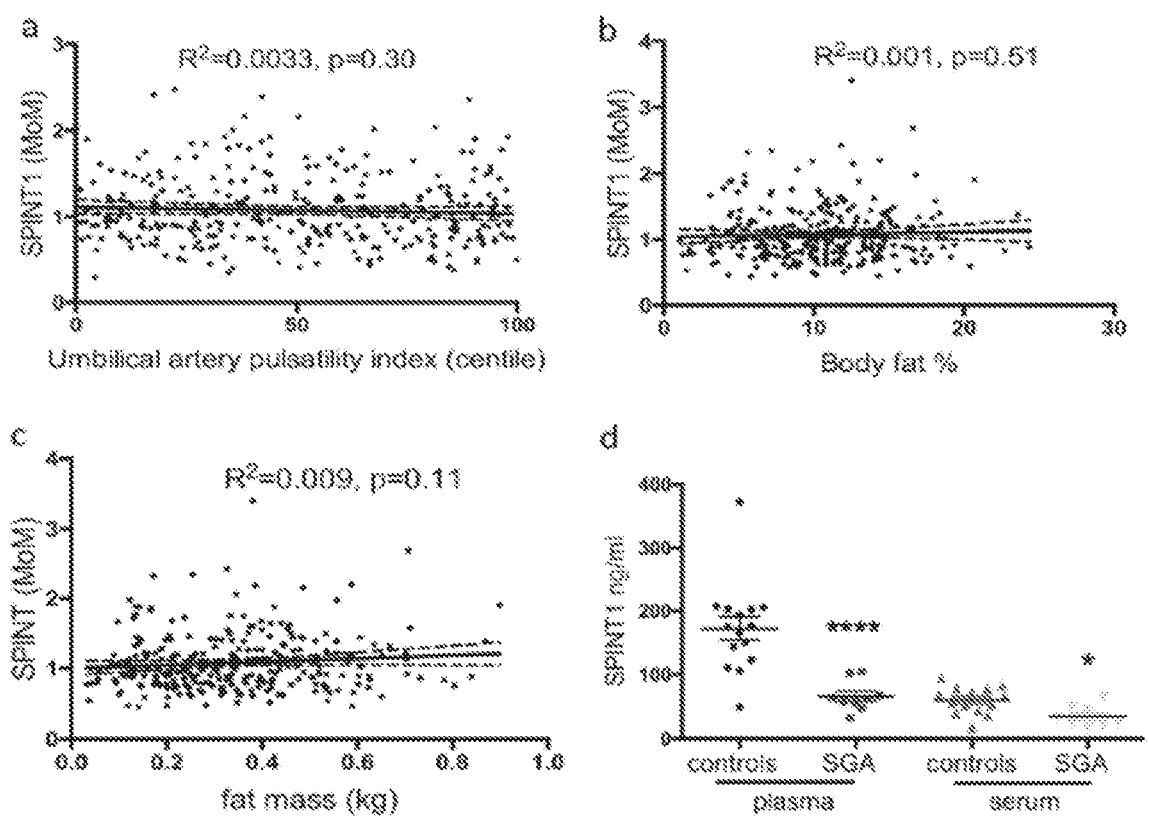
Figures 8a to d

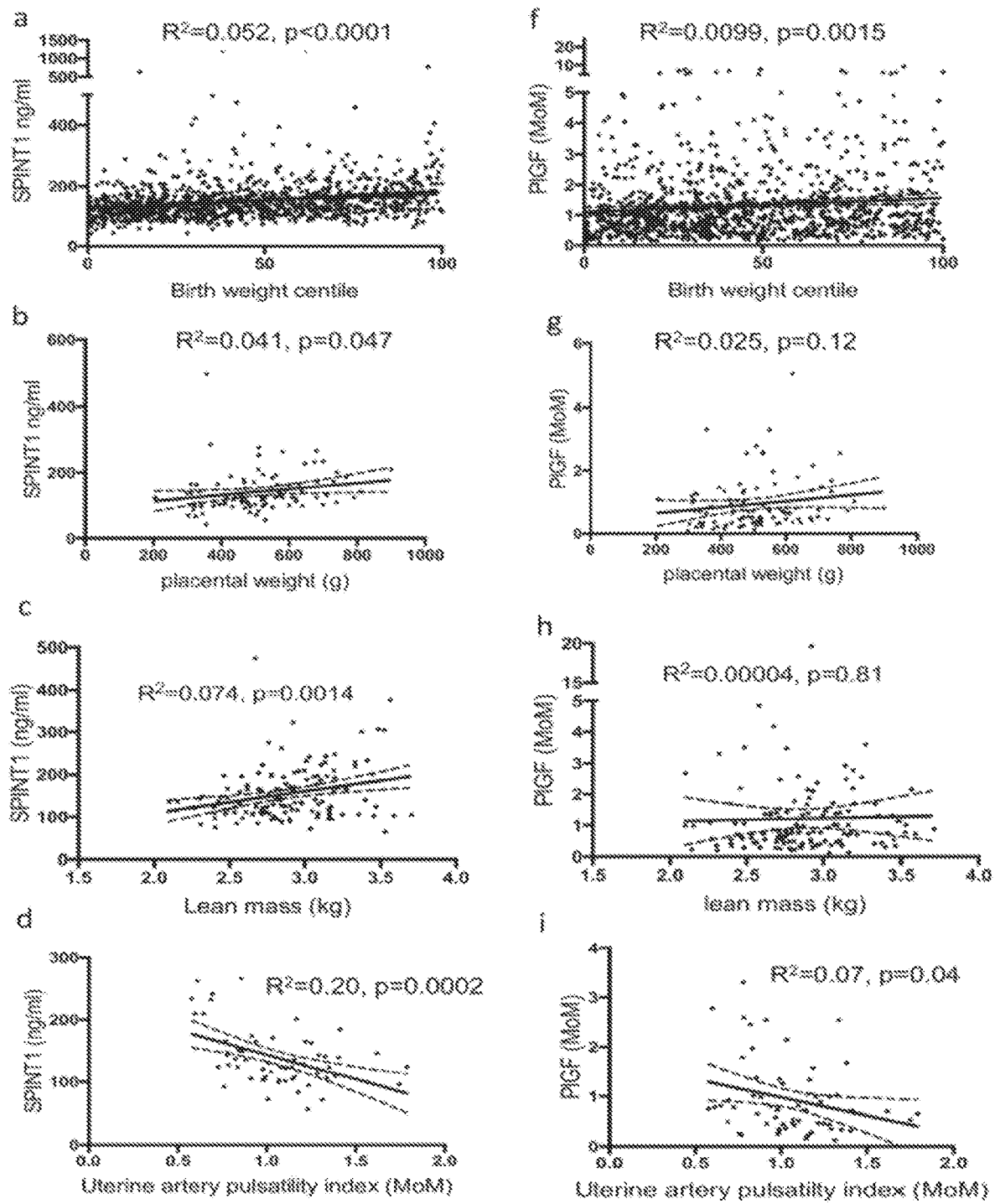
Figures 9a to d, f to i

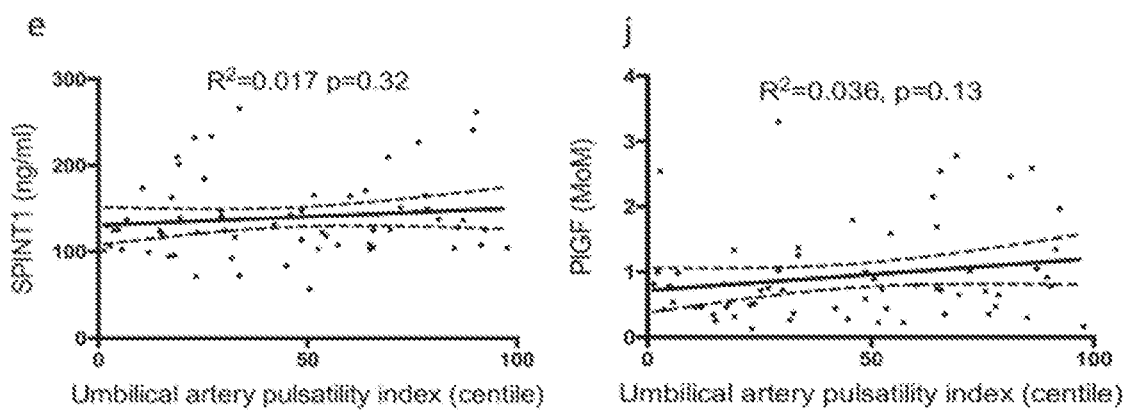
Figures 9e and j

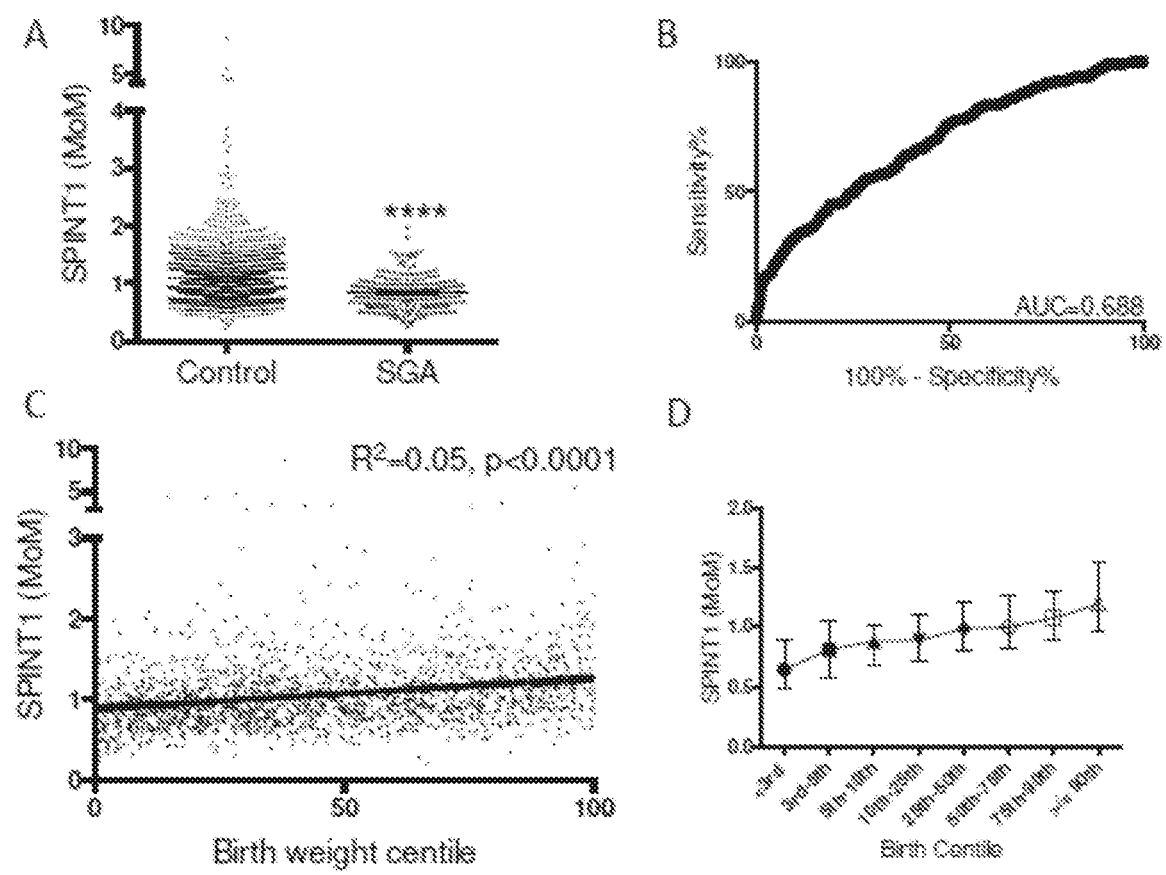
Figures 10A to D

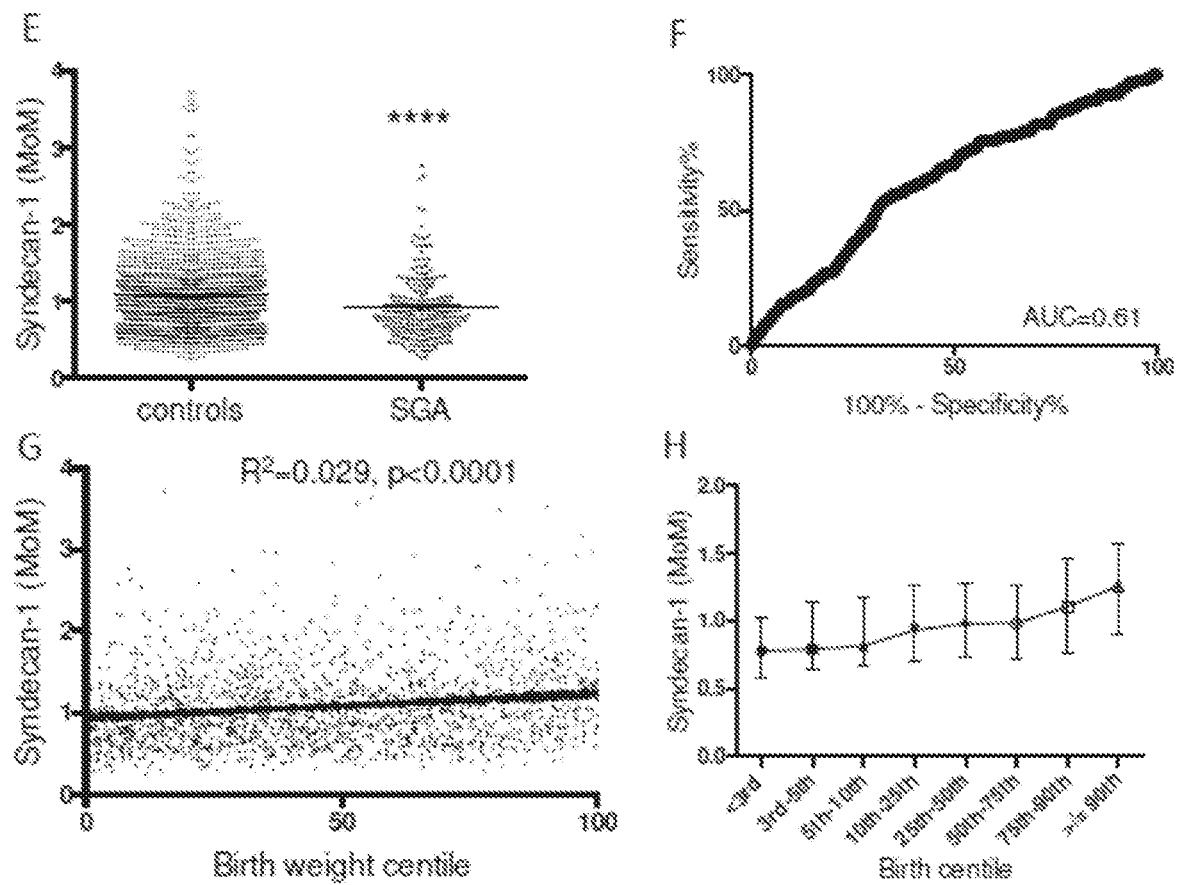
Figures 10E to H

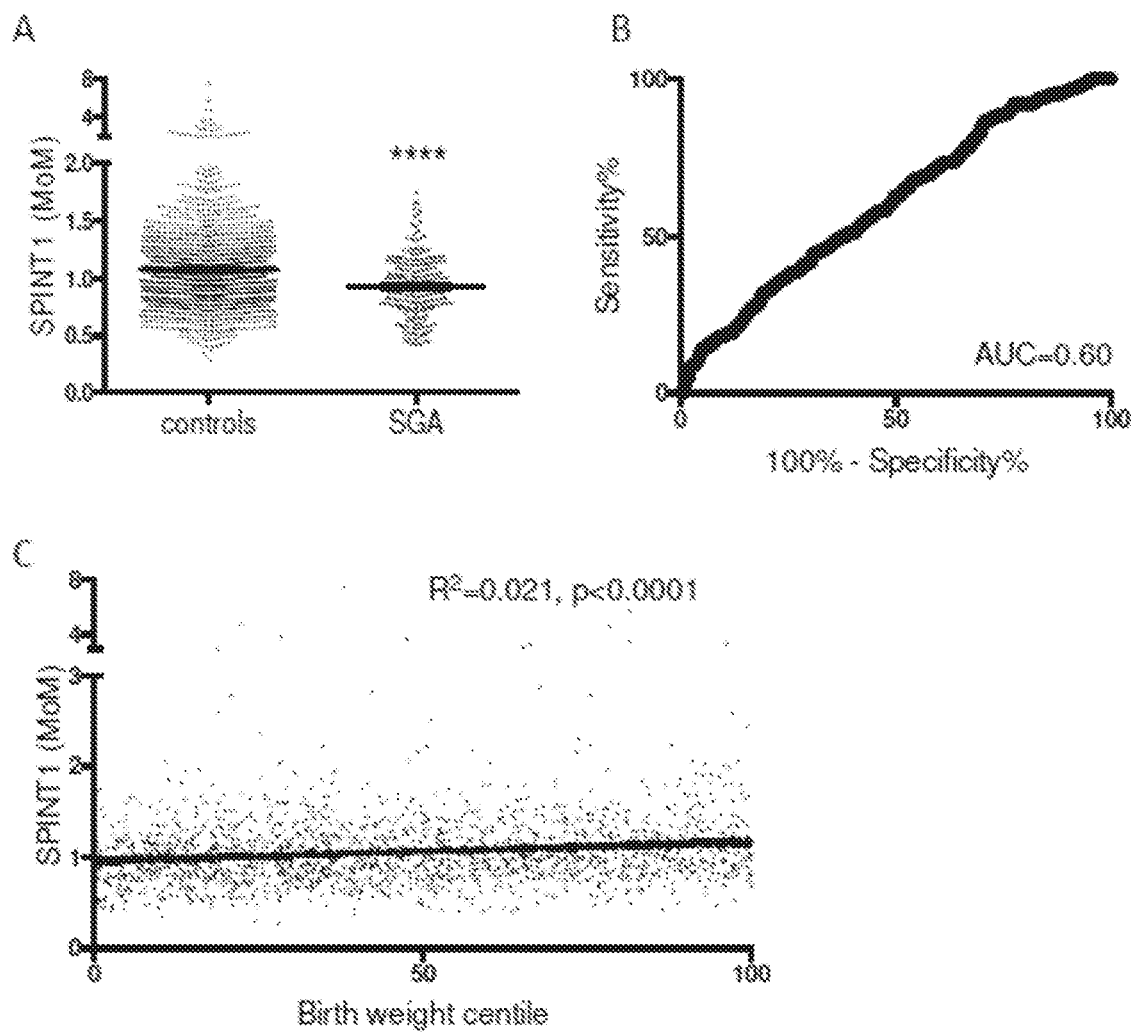
Figures 11A to C

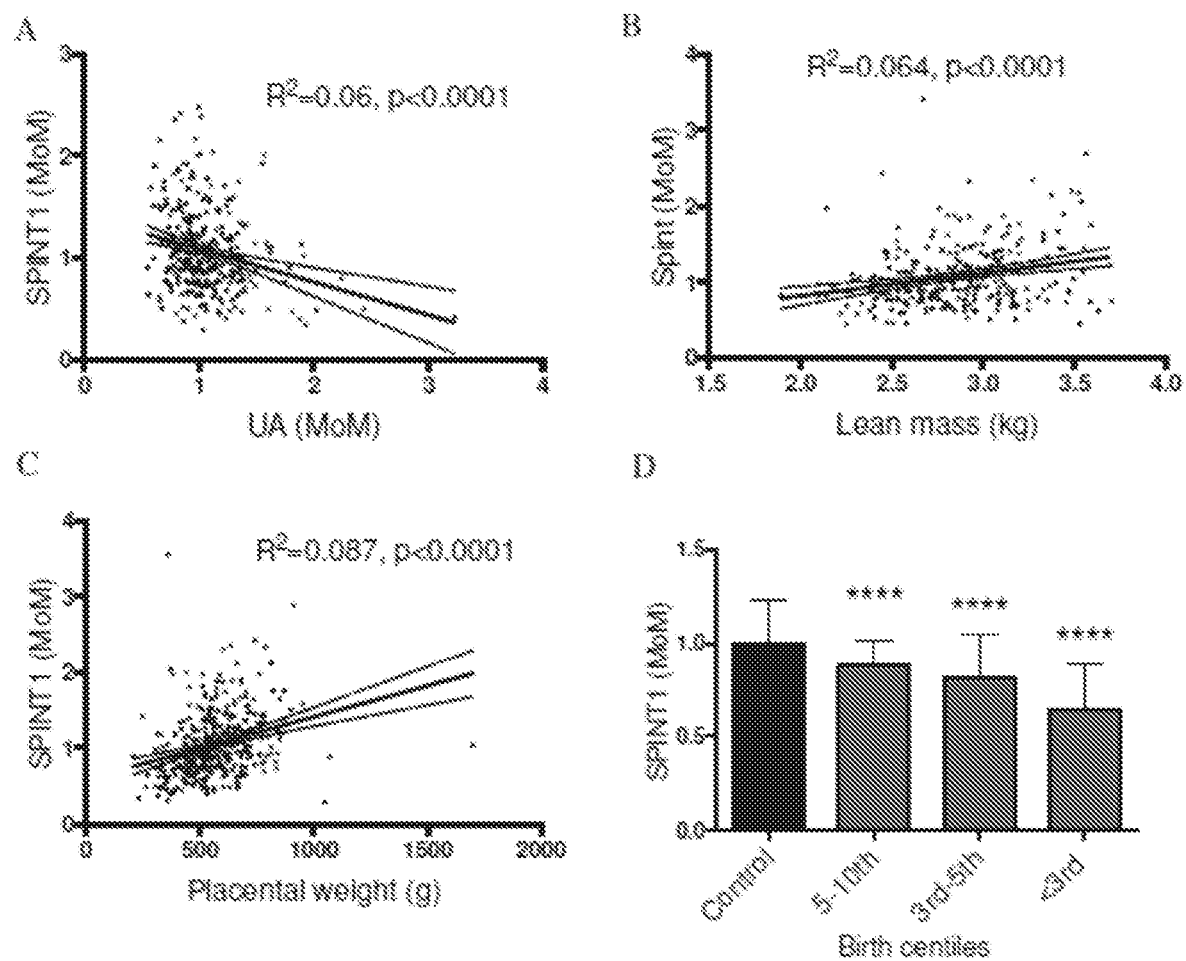
Figures 12A to D

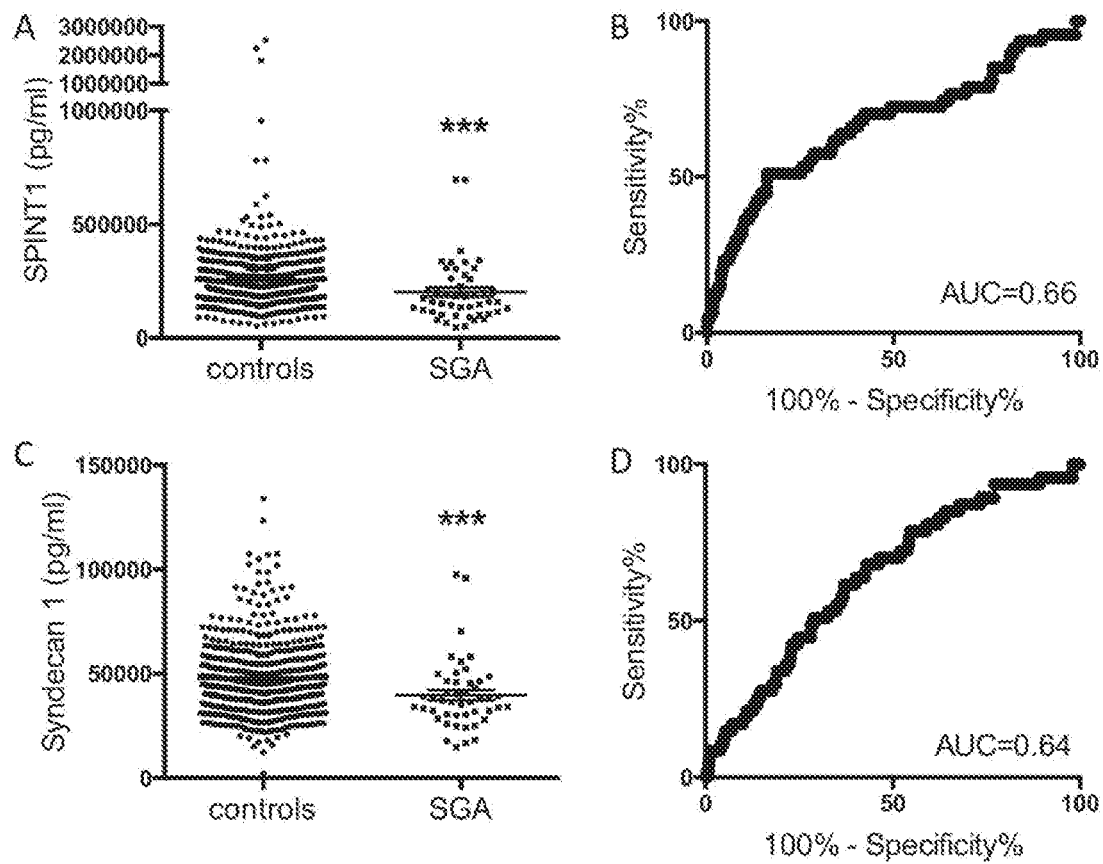
Figures 13A to D

SEQUENCE LISTING

<160> NUMBER OF SEQ ID NOS: 2

<210> SEQ ID NO 1
<211> LENGTH: 513
<212> TYPE: PRT
<213> ORGANISM: Homo sapiens

<400> SEQUENCE: 1

Met Ala Pro Ala Arg Thr Met Ala Arg Ala Arg Leu Ala Pro Ala Gly
1               5                   10                  15

Ile Pro Ala Val Ala Leu Trp Leu Leu Cys Thr Leu Gly Leu Gln Gly
                20                  25                  30

Thr Gln Ala Gly Pro Pro Pro Ala Pro Pro Gly Leu Pro Ala Gly Ala
            35                  40                  45

Asp Cys Leu Asn Ser Phe Thr Ala Gly Val Pro Gly Phe Val Leu Asp
    50                  55                  60

Thr Asn Ala Ser Val Ser Asn Gly Ala Thr Phe Leu Glu Ser Pro Thr
65                  70                  75                  80

Val Arg Arg Gly Trp Asp Cys Val Arg Ala Cys Cys Thr Thr Gln Asn
                85                  90                  95

Cys Asn Leu Ala Leu Val Glu Leu Gln Pro Asp Arg Gly Glu Asp Ala
            100                 105                 110

Ile Ala Ala Cys Phe Leu Ile Asn Cys Leu Tyr Glu Gln Asn Phe Val
        115                 120                 125

Cys Lys Phe Ala Pro Arg Glu Gly Phe Ile Asn Tyr Leu Thr Arg Glu
    130                 135                 140

Val Tyr Arg Ser Tyr Arg Gln Leu Arg Thr Gln Gly Phe Gly Gly Ser
145                 150                 155                 160

Gly Ile Pro Lys Ala Trp Ala Gly Ile Asp Leu Lys Val Gln Pro Gln
                165                 170                 175

Glu Pro Leu Val Leu Lys Asp Val Glu Asn Thr Asp Trp Arg Leu Leu
            180                 185                 190

Arg Gly Asp Thr Asp Val Arg Val Glu Arg Lys Asp Pro Asn Gln Val
        195                 200                 205

Glu Leu Trp Gly Leu Lys Glu Gly Thr Tyr Leu Phe Gln Leu Thr Val
    210                 215                 220

Thr Ser Ser Asp His Pro Glu Asp Thr Ala Asn Val Thr Val Thr Val
225                 230                 235                 240

Leu Ser Thr Lys Gln Thr Glu Asp Tyr Cys Leu Ala Ser Asn Lys Val
                245                 250                 255

Gly Arg Cys Arg Gly Ser Phe Pro Arg Trp Tyr Tyr Asp Pro Thr Glu
            260                 265                 270

Gln Ile Cys Lys Ser Phe Val Tyr Gly Gly Cys Leu Gly Asn Lys Asn
        275                 280                 285

Asn Tyr Leu Arg Glu Glu Glu Cys Ile Leu Ala Cys Arg Gly Val Gln
    290                 295                 300

Gly Pro Ser Met Glu Arg Arg His Pro Val Cys Ser Gly Thr Cys Gln

```
            305                 310                 315                 320
        Pro Thr Gln Phe Arg Cys Ser Asn Gly Cys Cys Ile Asp Ser Phe Leu
                        325                 330                 335

Glu Cys Asp Asp Thr Pro Asn Cys Pro Asp Ala Ser Asp Glu Ala Ala
                        340                 345                 350

Cys Glu Lys Tyr Thr Ser Gly Phe Asp Glu Leu Gln Arg Ile His Phe
                        355                 360                 365

Pro Ser Asp Lys Gly His Cys Val Asp Leu Pro Asp Thr Gly Leu Cys
                        370                 375                 380

Lys Glu Ser Ile Pro Arg Trp Tyr Tyr Asn Pro Phe Ser Glu His Cys
        385                 390                 395                 400

Ala Arg Phe Thr Tyr Gly Gly Cys Tyr Gly Asn Lys Asn Asn Phe Glu
                        405                 410                 415

Glu Glu Gln Gln Cys Leu Glu Ser Cys Arg Gly Ile Ser Lys Lys Asp
                        420                 425                 430

Val Phe Gly Leu Arg Arg Glu Ile Pro Ile Pro Ser Thr Gly Ser Val
                        435                 440                 445

Glu Met Ala Val Ala Val Phe Leu Val Ile Cys Ile Val Val Val
                        450                 455                 460

Ala Ile Leu Gly Tyr Cys Phe Phe Lys Asn Gln Arg Lys Asp Phe His
        465                 470                 475                 480

Gly His His His His Pro Pro Thr Pro Ala Ser Ser Thr Val Ser
                        485                 490                 495

Thr Thr Glu Asp Thr Glu His Leu Val Tyr Asn His Thr Thr Arg Pro
                        500                 505                 510

Leu

<210> SEQ ID NO 2
<211> LENGTH: 310
<212> TYPE: PRT
<213> ORGANISM: Homo sapiens

<400> SEQUENCE: 2

Met Arg Arg Ala Ala Leu Trp Leu Trp Leu Cys Ala Leu Ala Leu Ser
        1               5                   10                  15

Leu Gln Pro Ala Leu Pro Gln Ile Val Ala Thr Asn Leu Pro Pro Glu
                        20                  25                  30

Asp Gln Asp Gly Ser Gly Asp Asp Ser Asp Asn Phe Ser Gly Ser Gly
                        35                  40                  45

Ala Gly Ala Leu Gln Asp Ile Thr Leu Ser Gln Gln Thr Pro Ser Thr
                50                  55                  60

Trp Lys Asp Thr Gln Leu Leu Thr Ala Ile Pro Thr Ser Pro Glu Pro
        65                  70                  75                  80

Thr Gly Leu Glu Ala Thr Ala Ala Ser Thr Ser Thr Leu Pro Ala Gly
                        85                  90                  95

Glu Gly Pro Lys Glu Gly Glu Ala Val Val Leu Pro Glu Val Glu Pro
                        100                 105                 110

Gly Leu Thr Ala Arg Glu Gln Glu Ala Thr Pro Arg Pro Arg Glu Thr
                        115                 120                 125

Thr Gln Leu Pro Thr Thr His Gln Ala Ser Thr Thr Thr Ala Thr Thr
                        130                 135                 140

Ala Gln Glu Pro Ala Thr Ser His Pro His Arg Asp Met Gln Pro Gly
        145                 150                 155                 160

His His Glu Thr Ser Thr Pro Ala Gly Pro Ser Gln Ala Asp Leu His
```

-continued

```
            165                 170                 175
Thr Pro His Thr Glu Asp Gly Gly Pro Ser Ala Thr Glu Arg Ala Ala
            180                 185                 190

Glu Asp Gly Ala Ser Ser Gln Leu Pro Ala Ala Glu Gly Ser Gly Glu
            195                 200                 205

Gln Asp Phe Thr Phe Glu Thr Ser Gly Glu Asn Thr Ala Val Val Ala
            210                 215                 220

Val Glu Pro Asp Arg Arg Asn Gln Ser Pro Val Asp Gln Gly Ala Thr
225                 230                 235                 240

Gly Ala Ser Gln Gly Leu Leu Asp Arg Lys Glu Val Leu Gly Gly Val
                    245                 250                 255

Ile Ala Gly Gly Leu Val Gly Leu Ile Phe Ala Val Cys Leu Val Gly
                    260                 265                 270

Phe Met Leu Tyr Arg Met Lys Lys Lys Asp Glu Gly Ser Tyr Ser Leu
            275                 280                 285

Glu Glu Pro Lys Gln Ala Asn Gly Gly Ala Tyr Gln Lys Pro Thr Lys
            290                 295                 300

Gln Glu Glu Phe Tyr Ala
305                 310
```

CIRCULATORY BIOMARKERS FOR PLACENTAL OR FETAL HEALTH

CROSS-REFERENCE TO RELATED APPLICATIONS

This application is a National Stage of International Patent Application No. PCT/AU2019/050516, filed on May 24, 2019, which claims priority to Australian Patent Application No. AU 2018901813, filed on May 24, 2018, the disclosures of each of which are incorporated by reference in their entirety.

SEQUENCE LISTING

The instant application contains a Sequence Listing which has been submitted electronically in ASCII format and is hereby incorporated by reference in its entirety. The ASCII copy, created on Nov. 18, 2020, is named 103712.000031_SL and is 7,451 bytes in size.

FIELD

The present invention relates generally to a protocol to clinically manage pregnancy in mammals including humans. The present invention provides diagnostic targets and reagents to facilitate clinical management of pregnancy thereby enabling improved pre- and post-natal health outcomes for fetuses developing in an environment of placental insufficiency.

BACKGROUND

Bibliographic details of the publications referred to by author in this specification are collected alphabetically at the end of the description.

Reference in this specification to any prior publication (or information derived from it), or to any matter which is known, is not, and should not be taken as an acknowledgement or admission or any form of suggestion that the prior publication (or information derived from it) or known matter forms part of the common general knowledge in the field of endeavor to which this specification relates.

Fetal growth restriction (FGR), also known as intrauterine growth restriction (IUGR), represents a leading cause of post-natal ill health, is a leading cause of stillbirth in humans and leaves a lifelong legacy to children and family. FGR is a failure of a fetus to reach its genetically pre-determined growth potential. It represents a very serious complication of pregnancy and, as indicated above, is the biggest risk factor for stillbirth—a devastating tragedy that affects 1:130 pregnancies in Australia. In addition, approximately 27,000 FGR or small for gestational age (SGA; birthweight <10$^{th}$ centile) babies are born in Australia per year. FGR and being SGA at birth are associated outcomes of placental insufficiency.

FGR is also a major determinant of perinatal morbidity, with low-birthweight infants experiencing poorer neurodevelopmental outcomes (Miller et al. (2016) *The Journal of Physiology* 594:807-823). Moreover, FGR is associated with adverse outcomes later in life: school-aged children who were growth restricted have higher rates of impaired cognition, memory, attention and gross motor proficiencies (Miller et al. (2016) supra). Its effects can persist lifelong— adults have a higher prevalence of major chronic diseases such as cardiovascular disease, stroke and diabetes (Barker and Osmond (1986) *Lancet* 1:1077-1081; Cooper et al. (1997) *Annals of the Rheumatic Disease* 56:17-21; Hales and Barker (1992) *Diabetologia* 35:595-601; Barker (1998) *Clinical Science* 95:115-128; Barker (2000) *Theriogenology* 53:555-574). Placental insufficiency can lead to chronic fetal hypoxemia and reduced nutrient supply to the fetus which ultimately leads to a slowing of fetal growth and poor brain development which itself can lead to neurological issues. These are all features of FGR and SGA babies.

Placental insufficiency arises when the placenta fails to provide adequate oxygen and nutrient exchange to the fetus (Mifsud and Sebire (2014) *Fetal diagnosis and therapy* 36:117-128). The fetus responds by decreasing its growth and redistributing resources to ensure survival; channeling blood to vital organs such as the brain. When these survival adaptations fail, stillbirth occurs. There is a need to be able to reliably detect poor fetal growth and placental function to enable timely delivery before stillbirth occurs. A major barrier to reducing the health burden of FGR is the inability to accurately identify SGA fetuses, where FGR cases are more common.

Current methods to detect FGR are surprisingly poor. The most commonly used screening test for FGR is to detect SGA fetuses in pregnancy using a tape measure. The maternal abdomen is measured to assess the size of the uterus and an ultrasound performed if the fetus is suspected of being small. However, this approach has sensitivity (i.e. detection rate) of only around 20% to detect SGA in women of normal weight, which falls even further among women who are overweight or obese. Offering ultrasound to all women in late pregnancy might be expected to reliably pick up all small babies, but this approach has been shown to have detection rates of only 46% (Fadigas et al. (2015) *Ultrasound in obstetrics and genecology* 45:559-565)—57% (Sovio et al. (2015) *Lancet* 386:2089-2097) for SGA at birth, even in ideal research settings (Fadigas et al. (2015) supra). Cost and access to universal ultrasound precludes widespread adoption, highlighting the clear need for new tools to better identify pregnancies affected by FGR. Ultrasound is still a valuable tool in the management of pregnancy such as in detecting fetal macrosomia. The latter is a condition where a newborn has a significantly larger birth weight than average (i.e., a weight generally of more than 4 kg), which can lead to birth complications and increased risk of injury to newborn.

SUMMARY

Taught herein is an assay to monitor placental health enabling a determination of a level or state of placental insufficiency. This information is critical to the successful clinical management of a pregnancy in order to detect FGR and SGA babies. The ability to reliably detect such conditions including placental insufficiency can enable clinical intervention such as close fetal surveillance and earlier delivery. The present invention teaches that the biomarkers, SPINT1 and SYNDECAN1, individually or collectively are markers of the state of placental health. Low levels of either or both are an indicator of placental insufficiency. Elevated levels of either or both biomarkers can also be an indicator of a condition adversely affecting a fetus such as fetal macrosomia.

Accordingly, enabled herein is an assay to determine the state of placental health in a female mammalian subject, the method comprising determining the maternal circulating levels of SPINT1 and/or SYNDECAN-1 wherein a reduction in the concentration of SPINT1 and/or SYNDECAN-1 relative to a control or over time or a change in ratio relative to a control or over time is indicative of placental insufficiency and an elevation in SPINT-1 and/or SYNDECAN-1 is a measure of placental sufficiency or an improvement in placental sufficiency.

Further enabled herein is a clinical management protocol for a pregnant mammalian subject, the protocol comprising determining the levels of circulating SPINT1 and/or SYNDECAN-1 wherein a reduction over time in SPINT1 and/or SYNDECAN-1 compared to a control or a statistically validated level or a change in ratio reflecting a lowering of levels of SPINT1 and/or SYNDECAN-1 is indicative of placental insufficiency and wherein the fetus is monitored or subject to earlier delivery.

Accordingly, enabled herein is an assay to determine the state of placental health in a female mammalian subject, the method comprising determining the maternal circulating levels of SPINT1 and/or SYNDECAN-1 wherein a reduction in the concentration of SPINT1 and/or SYNDECAN-1 relative to a control or over time or a change in ratio relative to a control or over time is indicative of placental insufficiency and an elevation in SPINT-1 and/or SYNDECAN-1 is a measure of placental sufficiency or an improvement in placental sufficiency.

Also taught herein is an assay to detect abnormal fetal weight such as in macrosomia in a female mammalian subject, the method comprising determining the maternal circulating levels of SPINT1 and/or SYNDECAN-1 wherein an elevation in the concentration of SPINT1 and/or SYNDECAN-1 relative to a control or over time or a change in ratio relative to a control or over time is indicative of potential macrosomia.

Further enabled herein is a clinical management protocol for a pregnant mammalian subject, the protocol comprising determining the levels of circulating SPINT1 and/or SYNDECAN-1 wherein a reduction over time in SPINT1 and/or SYNDECAN-1 compared to a control or a statistically validated level or a change in ratio reflecting a lowering of levels of SPINT1 and/or SYNDECAN-1 is indicative of placental insufficiency and wherein the fetus is monitored or subject to earlier delivery.

Also taught herein is a clinical management protocol for macrosomia in a pregnant mammalian subject, the protocol comprising determining the levels of circulating SPINT1 and/or SYNDECAN-1 wherein an elevation over time in SPINT1 and/or SYDNECAN-1 compared to a control or a statistically validated level or a change in ratio reflecting elevating placental insufficiency and macrosomia wherein the fetus is monitored or subject to earlier delivery.

The determination of the concentrations or levels of the biomarkers enables establishment of a diagnostic rule based on the concentrations relative to controls. Alternatively, the diagnostic rule is based on the application of a statistical and machine learning algorithm or analytics function or process or other data processing means. Such an algorithm or analytics function or process or other data processing means uses relationships between biomarkers and state of placental sufficiency observed in training data (with known placental sufficiency status) to infer relationships which are then used to predict the status of patients with unknown status. An algorithm or analytics function or process or other data processing means may be employed which provides an index of probability that a patient has placental insufficiency. The algorithm or analytics function or process or other data processing means may perform a multivariate or monovariate analysis function or other statistical operation.

Hence, in an embodiment, the present invention provides a diagnostic rule based on the application of a statistical and machine learning algorithm or analytics function or process or other data processing means. Such an algorithm or analytics function or process or other data processing means uses the relationships between biomarkers and placental sufficiency or insufficiency status observed in training data (with known placental sufficiency status) to infer relationships which are then used to predict the status of patients with unknown placental sufficiency status. Practitioners skilled in the art of data analysis recognize that many different forms of inferring relationships in the training data may be used without materially changing the present invention.

The present invention further contemplates a panel of biomarkers for the detection of placental insufficiency or state of placental health or dysfunction in a subject, the panel comprising agents which bind specifically to biomarkers, the biomarkers selected from SPINT1, SYNDECAN-1, both SPINT1 and SYNDECAN-1; or one of SPINT1 or SYNDECAN-1 and at least one other biomarker to determine levels of the biomarkers and then optionally subjecting the levels to an algorithm or analytics function or process or other data processing means generated from a first knowledge base of data comprising the levels of the same biomarkers from a subject of known status with respect to the conditions wherein the algorithm or analytics function or process or other data processing means provides an index of probability of the subject having or not having placental insufficiency.

The assay taught herein includes the determination of levels of SPINT1, SYNDECAN-1, SPINT1 and SYNDECAN-1 and/or the determination of levels of SPINT1 and/or SYNDECAN-1 with at least one other biomarker.

Reference to at least one other biomarker includes but is not limited to one or more of placental growth factor (PlGF), soluble fms-like tyrosine kinase-1 (sFlt) and/or vascular endothelial growth factor (VEGF) amongst other biomarkers and/or physiochemical parameters of placental insufficiency or its effects such as FGR (e.g. data for ultrasound).

In an embodiment, the mammalian subject is a human female. However, the present invention extends to veterinary applications. Generally, circulating SPINT1 and/or SYNDECAN-1 is determined in whole blood, plasma or serum. Other fluid may also be tested including ascites, lymph fluid or urine.

In an embodiment, where a subject is determined to have placental insufficiency, the pregnancy clinically managed to maximize the health outcome of the fetus. This includes earlier delivery of the fetus. Similarly where fetal macrosomia is suggested due to elevation in SPINT1 and/or SYNDECAN-1 with or without ultrasound or other physicochemical tests early delivery of the baby may be indicated.

The assay of the present invention extends to the direct or indirect detection of the biomarker proteins or via RNA encoding the biomarkers and/or circulating RNA markers of placental insufficiency or its effects such as FGR.

Whilst the present invention relates in an embodiment to monitoring for a reduction in levels of the biomarkers as an indicator of placental insufficiency, the detection of elevated levels of SPINT1 and/or SYNDECAN-1 is used as an indicator or predictor of fetal macrosomia and this forms part of the subject invention.

A list of abbreviations used throughout the subject specification are provided in Table 1.

TABLE 1

Abbreviations

| ABBREVIATION | DESCRIPTION |
| --- | --- |
| AUC | Area under the curve |
| FGR | Fetal growth restriction (equivalent to IUGR) |
| FLAG | Fetal longitudinal assessment of growth |
| HAI-1 | Hepatocyte growth activator inhibitor-1 |
| IUGR | Intrauterine growth restriction (equivalent to FGR) |
| PE | Preeclampsia |
| PIGF | Placental growth factor |
| sFlt-1 | Soluble fms-like tyrosine kinase-1 |
| SGA | Small for gestational age |
| SPINT1 | Biomarker of placental insufficiency (serine peptidase inhibitor, kunitz type 1) |
| SYNDECAN-1 | Biomarker of placental insufficiency |
| VEGF | Vascular endothelial growth factor |

BRIEF DESCRIPTION OF THE FIGURES

Some figures contain color representations or entities. Color photographs are available from the Patentee upon request or from an appropriate Patent Office. A fee may be imposed if obtained from a Patent Office.

FIGS. 1A through P are graphical representations showing circulating SPINT1 and SYNDECAN-1 measured in plasma using commercially available ELISAs. SPINT1 from Sigma Aldrich and SYNDECAN-1 from Thermo Fisher Scientific. sFLT-1 and PlGF were measured using diagnostic test assays from Roche. A case control cohort was selected from patients who provided a blood sample at 36 weeks gestation. SPINT1 levels (n=210 controls, n=104 SGA) were significantly reduced in patients that delivered a SGA baby (<$10^{th}$ centile birthweight relative to the gestational age; A) with an area under the receiver operator curve (AUC) of 0.75 (B). When SYNDECAN-1 was measured in a case control cohort (n=99 control, n=89 SGA), it was also found to be significantly reduced in women who subsequently delivered a SGA infant (C) with a AUC of 0.73 (D). In contrast, circulating sFLT-1 (n=207 control, n=102 SGA) was significantly increased in women who delivered a SGA infant (E) with an AUC of 0.58 (F), whilst circulating PlGF (n=210 controls, 104 SGA) was significantly reduced (G) with an AUC of 0.66 (H). The inventors subsequently moved on to validate the results from the case control cohort in a sample set consisting of 1004 samples collected at 36 weeks gestation. 920 controls and 84 cases where the mother subsequently delivered a SGA infant. The inventors found that circulating SPINT1 was significantly reduced in women who subsequently delivered a SGA infant (I) with an AUC of 0.74 (J). Similarly, SYNDECAN-1 was significantly reduced in women who delivered an SGA infant (K) with an AUC of 0.65 (L). It was then assessed how early in pregnancy these proteins might be reduced in the maternal circulation. To do this, a case control cohort was selected and measured circulating SPINT1 (n=130 controls, n=104 SGA) and SYNDECAN-1 (n=100 control, n=84 SGA) at 28 weeks gestation. At 28 weeks gestation, SPINT1 was already significantly reduced in women who subsequently delivered a SGA baby (M) with an AUC of 0.69 (N). Similarly, SYNDECAN-1 was significantly reduced at 28 weeks gestation (O) with an AUC of 0.69 (P). Data expressed as mean+/−SEM—each symbol represents an individual patient *$p<0.05$, ****$p<0.0001$.

FIGS. 2A through D are graphical representations showing birthweight centile for each study infant, which was customized accounting for maternal parity, booking weight, height, for infant sex, and for exact gestational age in days. To determine whether there was a relationship between birth weight and circulating SPINT1 levels, two data sets were graphed. FIG. 2A shows that circulating maternal SPINT1 at 36 weeks gestation is associated with the subsequent birth centile of the infant—this correlation is plotted for each of the 1004 patients in panel B, where there is a statistically significant correlation. Panel C demonstrates that circulating maternal SPINT1 at 36 weeks gestation (n=145) is significantly correlated with neonatal lean mass measured within days after birth. Panel D demonstrates that while SPINT1 at 36 weeks is associated with neonatal lean mass, it is not associated with a skinfold body fat percentage also measured within days after birth (n=145).

FIGS. 3A through P are graphical representations showing observational studies to determine whether placental SPINT1 is altered in cases of human SGA. To do this, a cohort of placentas was selected from either control, preeclamptic or SGA pregnancies. SPINT1 mRNA was measured using quantitative RT-PCR and showed that in patients who delivered their baby at <34 weeks gestation SPINT1 mRNA was significantly reduced in both the PE and SGA cohort compared to controls (A). No change in SPINT1 mRNA expression was detected in placentas collected from patients who delivered at >34 weeks gestation (B). SPINT1 protein expression was assessed using Western blot and commercially available antibodies (C,D). In samples collected at both <34 weeks gestation (C) and >34 weeks gestation (D) SPINT1 protein was significantly reduced in the placentas from women delivering a SGA baby. Growth restriction is often associated with placental insufficiency and poor oxygen delivery to the placenta, resulting in placental hypoxia. The inventors assessed whether exposure of primary placental cells (cytotrophoblast cells isolated from term human placentas) to low oxygen conditions (1% Oxygen for hypoxia vs 8% oxygen for normoxia) would alter SPINT1 mRNA and protein expression and protein secretion. The inventors initially assessed mRNA expression by qRT-PCR (E) and found that exposure of primary placental cells to hypoxia resulted in significantly reduced SPINT1 mRNA expression, with a similar finding observed for cellular protein measured by western blot (F). Secretion of SPINT1 was measured into the media that bathes the placental cells using the same ELISA that was used to measure plasma SPINT1 in the blood, and found that the level of SPINT1 in the media was also significantly reduced when placental cells were rendered hypoxic (G). Thus strong evidence was found that placental hypoxia reduces SPINT1. Given previous evidence in mice that a lack of SPINT1 may be associated with a poorly developed placenta, the inventors next set out to assess whether silencing SPINT1 using siRNA knockdown in the HTR8 placental cell line would affect cellular proliferation assessed in real time using the xCELLigence system. Indeed, when SPINT1 in HTR8 cells were silenced it was found that proliferation was impaired (N). The inventors next wondered whether this effect on proliferation may be a result of enhanced apoptosis. To determine this, SPINT1 in HTR8 cells were silenced before collecting protein and measuring apoptosis markers BAX, BCL2 and cleaved caspase 3 by Western blot. Whilst a significant reduction in SPINT1 protein expression was found as expected (top panel showing lack of bands under siSPINT), there was no significant change in expression of apoptosis markers, suggesting that the reduced proliferation when SPINT1 is silenced is not a result of increased apoptosis (O). B-actin was used as a loading control. It was next sought to assess whether enhancing SPINT1 would alter HTR8 placental cell line proliferation. To do this, a commercially available SPINT1 mimetic called SRI31215 (Glixx laboratories) was administered to HTR8 cells and their proliferation monitored using the xCELLigence system. Indeed it was found that 5 or 10 uM of SRI31215 enhanced HTR8 proliferation (P). Data expressed as mean+/−SEM—each symbol represents an individual patient or mouse $*p<0.05$, $p<0.01$, $*p<0.001$ $****p<0.0001$.

FIGS. 4A through C are graphical representations showing that circulating SYNDECAN-1 increases with birth centile of the infant (A). Maternal SYNDECAN-1 is significantly associated with neonatal lean mass (B) and skinfold body fat percentage (C), measured a few days after birth.

FIGS. 5A through E are graphical representations showing observational studies to determine whether placental SYNDECAN-1 is altered in cases of human SGA. To do this, a cohort of placentas was selected from either control, preeclamptic or SGA pregnancies (same cohort used to measure SPINT1). SYNDECAN-1 mRNA was measured using quantitative RT-PCR and showed that in patients who delivered their baby at <34 weeks gestation, placental SYNDECAN-1 mRNA was significantly increased in both the preeclamptic (PE) and small for gestational age (SGA) cohort compared to controls (A). Protein expression was subsequently measured. The commercial antibody used for Western blot produced 3 different bands, that are likely to correspond to different isoforms of SYNDECAN-1. Densiometric analysis of these bands indicated that the 85 (B) and 80 (C) kDa bands were not changed, whilst the 33 kDa band was significantly reduced in SGA placentas (D). SYNDECAN-1 mRNA expression was subsequently measured in placentas delivered at >34 weeks gestation and found no significant alteration in expression (E). Data expressed as mean+/−SEM—each symbol represents an individual patient $*p<0.05$, $p<0.01$, $*p<0.001$ $****p<0.0001$.

FIGS. 6A through F are diagrammatic representations of functional studies to determine whether placental SYNDECAN-1 is altered by hypoxia and whether silencing its expression alters cellular proliferation. Panels A, B and C demonstrate that in primary human trophoblast, SYNDECAN-1 mRNA (A) is significantly reduced under hypoxia, whilst cellular protein is not different (B). Secreted SYNDECAN-1 protein is significantly reduced under hypoxia (C). In pregnant mice exposed to hypoxia, there is no change in murine SYNDECAN-1 within the placenta (D,E). When SYNDECAN-1 is silenced using siRNA in placental cell line HTR8 cells, cellular proliferation is impaired (F). Data expressed as mean+/−SEM—each symbol represents an individual patient $*p<0.05$, $**p<0.01$.

FIGS. 7$a$ through $e$ show plasma SPINT1 at 36 weeks is associated with clinical markers of placental insufficiency. Plasma SPINT1 concentrations at 36 weeks' gestation were correlated with uterine artery (UA) Doppler flow resistance (a), lean mass of the neonate (b), and placental weight (c). There was a step-wise reduction in plasma SPINT1 concentration in women whose babies were subsequently born with a birthweight below the $10_{th}$, centile (d). Plasma SPINT1 concentrations at 36 weeks were correlated with birth centiles (e). SPINT1 MoMs were combined for both cohort 1 and cohort 2 and grouped according to the birth centile. Graphs D and E depict median+/− interquartile range. Each individual symbol (c-e) represents a patient. $****p<0.0001$ relative to control (Mann-Whitney).

FIGS. 8$a$ through $d$ show SPINT1 levels are not associated with umbilical artery resistance, and infant body fat percentage or fat mass. A sub-cohort of the entire FLAG cohort had infant body composition assessed after birth using the PEAPOD air displacement plethysmography device. There was no relationship between circulating SPINT1 levels at 36 weeks and umbilical artery pulsatility index (A), body fat percentage (B) or fat mass (C). SPINT1 concentrations were measured in plasma and serum samples of women who delivered a <10th centile baby at <34 wks and compared to the concentration of SPINT1 from plasma and serum samples of healthy controls (plasma and serum samples were obtained at the same blood draw). The data show that, while SPINT1 was significant reduced in the serum of women with SGA, the degree of change was far less than that observed in plasma. Individual symbols represent an individual patient. $****p<0.0001$, $*p<0.05$).

FIGS. 9$a$ through $j$ show a comparison between the strength of association between SPINT1 or PlGF and clinical markers of placental insufficiency. At 36 weeks, plasma SPINT1 concentrations appeared to have a stronger association with birth weight centile (a vs f), placental weight (b vs g), lean mass (c vs h), and uterine artery resistance (d vs i), compared to than PlGF. Neither molecule was correlated with umbilical artery resistance (e and j). Individual symbols represent an individual patient.

FIGS. 10A through H show the association between SPINT1 or SYNDECAN-1 and various clinical parameters of placental insufficiency in a larger cohort of samples obtained from up to 2040 women. Each symbol represents an individual patient. Figure D, data expressed as median+/− interquartile range. $****p<0.0001$.

FIGS. 11A through C validate SPINT1 changes at 28 weeks in the entire cohort of n=2040 (n=1827 controls, n=213 cases). The data confirm that circulating SPINT1 at 28 weeks was significantly reduced in women who delivered an SGA infant (A) with an AUC of 0.60 (B). At 28 weeks gestation, SPINT1 continuously correlated with birth weight centile (C). Each symbol represents an individual patient. $****p<0.0001$.

FIGS. 12A through D validate changes in plasma SPINT1 at 36 weeks and show the association with markers of placental insufficiency in a larger cohort. Plasma SPINT1 concentrations at 36 weeks' gestation were correlated with uterine artery (UA) Doppler flow resistance (A, n=325), lean mass of the neonate (B, n=281), and placental weight (C, n=378). There was a step-wise reduction in plasma SPINT1 concentration in women whose babies were subsequently born with a birthweight below the $10^{th}$ centile (D). Graph D depicts median+/−interquartile range. Each individual symbol (A-D) represents a patient. $****p<0.0001$ relative to control.

FIG. 13A through D shows SPINT1 and SYNDECAN-1 measured in an independent cohort of n=556 samples collected on the day of delivery (Caesarean section or induction) at the Mercy Hospital for Women in Melbourne, Australia. In this cohort, we confirmed that SPINT1 (A,B) was also significantly reduced in women carrying an SGA infant with an AUC of 0.66 (n=47 SGA, n=509 controls). Similarly, SYNDECAN-1 was also significantly reduced in women carrying a SGA infant in this cohort (C,D) with an AUC of 0.644.

DETAILED DESCRIPTION

Throughout this specification, unless the context requires otherwise, the word "comprise", or variations such as "comprises" or "comprising", will be understood to imply the inclusion of a stated element or integer or method step or group of elements or integers or method steps but not the exclusion of any other element or integer or method step or group of elements or integers or method steps.

As used in the subject specification, the singular forms "a", "an" and "the" include plural aspects unless the context clearly dictates otherwise. Thus, for example, reference to "a biomarker" includes a single biomarker, as well as two or more biomarkers; reference to "an assay" includes a single assay, as well as two or more assays; reference to "the disclosure" includes single and multiple aspects taught by the disclosure; and so forth. Aspects taught and enabled herein are encompassed by the term "invention". Any variants and derivatives contemplated herein are encompassed by "forms" of the invention. All aspects and forms of the invention are enabled across the width of the claims.

The use of numerical values in the various ranges specified in this application, unless expressly indicated otherwise, are stated as approximations as though the minimum and maximum values within the stated ranges were both preceded by the word "about". In this manner, slight variations above and below the stated ranges can be used to achieve substantially the same results as values within the ranges. Also, the disclosure of these ranges is intended as a continuous range including every value between the minimum and maximum values. In addition, the present invention extends to ratios of two or more markers providing a numerical value associated with a level of risk of placental insufficiency.

The present invention relates to an assay to determine circulating levels of one or either or both of the biomarker SPINT1 and/or the biomarker SYNDECAN-1 in a pregnant mammalian subject. SPINT1 and/or SYNDECAN-1 may be assayed separately or together, alone or in combination with one or more other biomarkers and/or one or more physiochemical parameters such as data from an ultrasound. These biomarkers are proposed to be indicators of placental insufficiency when present at a reduced level. When elevated, alone or in combination with one or more biomarkers and one or more physicochemical parameters such as data from an ultrasound it is proposed to indicate fetal weight abnormality, including, but not limited to, fetal macrosomia.

The term "assay" includes but is not limited to a method, protocol, step or series of steps and/or a process for determining the level or velocity of SPINT1 and/or SYNDECAN-1. The level of SPINT1 and/or SYNDECAN-1 may be compared to a standardized control or may be compared to a statistically validated pre-determined level. An example of a standardized control is the level in a normal pregnant female subject of the same age and physical characteristics. The velocity includes a rate or extent of increase or decrease in the level of either biomarker. The level or velocity of SPINT1 and/or SYNDECAN-1 may be expressed as a concentration level in an amount of, but not limited to, picogram, nanogram, microgram or milligram per volume of circulating fluid (generally in millilitres although may be expressed in any volume amount). Alternatively, the level or velocity of the biomarkers is rationalized in the form of a ratio between each other and/or a ratio between one or other and another biomarker such as placenta growth factor (PlGF) or soluble fms-like tyrosine kinase-1 (sFlt) or vascular endothelial growth factor (VEGF) amongst other markers.

The levels or velocities of SPINT1 and/or SYNDECAN-1 may also be subject to analysis by but not limited to a multivariate or monovariate algorithm or other analytics function to establish a value which is compared to a control or statistically validated pre-determined level.

In essence, the present invention teaches that a reduction in level or velocity of SPINT1 and/or SYNDECAN-1 is indicative of placental insufficiency in a pregnant female mammalian subject. Depending on what clinical intervention is initiated, the level of SPINT1 and/or SYNDECAN-1 can be monitored throughout pregnancy and/or measured at pre-determined stages including at any time in the first, second or third trimester periods. For the avoidance of doubt, the assay may be performed at any gestational time point or window throughout the gestational time period. The ability to detect placental insufficiency via a biomarker or combination of biomarkers increases sensitivity and specificity to a far greater level than physical measurements, ultrasound, examination and/or birthweights or predicted fetal weights. These are encompassed by the term "physiochemical parameters".

Accordingly, enabled herein is an assay to determine the state of placental health in a female mammalian subject, the method comprising determining the circulating levels of SPINT1 and/or SYNDECAN-1 wherein a reduction in the concentration of SPINT1 and/or SYNDECAN-1 relative to a control or over time or a change in ratio relative to a control or over time is indicative of placental insufficiency and an elevation in SPINT-1 and/or SYNDECAN-1 is a measure of placental sufficiency or an improvement in placental sufficiency.

As used herein, the term "indicative" (e.g., indicative of placental insufficiency or indicative of placental sufficiency) means a sign or indication or factor to be considered, as opposed to being definitive proof in and of itself, and generally refers to an increased likelihood of the presence of a particular condition. For example, a reduction in the level or concentration of SPINT1 and/or SYNDECAN-1 relative to a control or over time or a change in ratio relative to a control or over time generally correlates with an increased likelihood of placental insufficiency. Likewise, an elevation in the level or concentration of SPINT1 and/or SYNDECAN-1 relative to a control or over time or a change in ratio relative to a control or over time generally correlates with an increased likelihood of placental sufficiency.

In an embodiment, the assay determines the state of placental health in a female mammalian subject, the method comprising determining the circulating levels of SPINT1 wherein a reduction in the concentration of SPINT1 relative to a control or over time or a change in ratio relative to a control or over time is indicative of placental insufficiency and an elevation in SPINT-1 is a measure of placental sufficiency or an improvement in placental sufficiency.

In an embodiment, the assay determines the state of placental health in a female mammalian subject, the method comprising determining the circulating levels of SYNDECAN-1 wherein a reduction in the concentration of SYNDECAN-1 relative to a control or over time or a change in ratio relative to a control or over time is indicative of placental insufficiency and an elevation in SYNDECAN-1 is a measure of placental sufficiency or an improvement in placental sufficiency.

In an embodiment, the assay determines the state of placental health in a female mammalian subject, the method comprising determining the circulating levels of SPINT1 and at least one other biomarker wherein a reduction in the concentration of SPINT1 and a change in at least one other biomarker relative to a control or over time or a change in ratio relative to a control or over time is indicative of placental insufficiency and an elevation in SPINT-1 and a change in at least one other biomarker is a measure of placental sufficiency or an improvement in placental sufficiency.

In an embodiment, the assay determines the state of placental health in a female mammalian subject, the method comprising determining the circulating levels of SYNDECAN-1 and a change in at least one other biomarker wherein a reduction in the concentration of SYNDECAN-1 and at least one other biomarker relative to a control or over time or a change in ratio relative to a control or over time is indicative of placental insufficiency and an elevation in SYNDECAN-1 and a change in at least one other biomarker is a measure of placental sufficiency or an improvement in placental sufficiency.

Enabled herein is an assay to determine the state of placental health in a female mammalian subject, the method comprising determining the maternal circulating levels of SPINT1 and/or SYNDECAN-1 wherein a reduction in the concentration of SPINT1 and/or SYNDECAN-1 relative to a control or over time or a change in ratio relative to a control or over time is indicative of placental insufficiency and an elevation in SPINT-1 and/or SYNDECAN-1 is a measure of placental sufficiency or an improvement in placental sufficiency.

Also taught herein is an assay to detect abnormal fetal weight such as in macrosomia in a female mammalian subject, the method comprising determining the maternal circulating levels of SPINT1 and/or SYNDECAN-1 wherein an elevation in the concentration of SPINT1 and/or SYNDECAN-1 relative to a control or over time or a change in ratio relative to a control or over time is indicative of potential macrosomia.

Also enabled herein is an assay to detect abnormal fetal weight in a female mammalian subject, said method comprising determining the maternal circulating levels of SPINT1 and/or SYNDECAN-1 wherein an elevation in the concentration of SPINT1 and/or SYNDECAN-1 relative to a control or over time or a change in ratio relative to a control or over time is indicative of potential high fetal weight and a reduction in the concentration of SPINT1 and/or SYNDECAN-1 relative to a control or over time or a change in ratio relative to a control or over time is indicative of potential low fetal weight or small-for-gestational age or fetal growth restriction.

The present invention extends to any mammalian subject such as a human, non-human primate, a farm animal (e.g. a sheep, cow, horse, pig, alpaca, llama), a racing animal (e.g. a horse, camel or greyhound dog) or a domestic animal (e.g. dog or cat). A racing equine animal includes a quarter horse, thoroughbred, Arab and a warmblood horse. Hence, the present invention has application in human and veterinary clinical practice.

In an embodiment, the mammalian subject is a pregnant human female. In another embodiment, the mammalian subject is a pregnant mare. In yet another embodiment, the mammalian subject is a pregnant thoroughbred mare.

The results of the assay may be used in combination with one or more risk factors associated with the subject to further assist in making a diagnosis. The term "risk factors" is meant to include any factor that statistically increases the risk of abnormal fetal weight. Risk factors related to abnormal fetal weight include but are not limited to maternal age, pregestational body mass index, education, smoking, alcohol consumption, in vitro fertilization, anemia in pregnancy, preeclampsia, diabetes, gestational age, pregnancy weight gain, gender of the newborn, history of fetal macrosomia, history of low fetal weight or small-for-gestational age or fetal growth restriction.

Hence, taught herein is an assay to determine the state of placental health in a pregnant human female subject, the method comprising determining the circulating levels of SPINT1 and/or SYNDECAN-1 wherein a reduction in the concentration of SPINT1 and/or SYNDECAN-1 relative to a control or over time or a change in ratio relative to a control or over time is indicative of placental insufficiency and an elevation in SPINT-1 and/or SYNDECAN-1 is a measure of placental sufficiency or an improvement in placental sufficiency.

In an embodiment, the assay determines the state of placental health in a pregnant human female subject, the method comprising determining the circulating levels of SPINT1 wherein a reduction in the concentration of SPINT1 relative to a control or over time or a change in ratio relative to a control or over time is indicative of placental insufficiency and an elevation in SPINT-1 is a measure of placental sufficiency or an improvement in placental sufficiency.

In an embodiment, the assay determines the state of placental health in a pregnant human female subject, the method comprising determining the circulating levels of SYNDECAN-1 wherein a reduction in the concentration of SYNDECAN-1 relative to a control or over time or a change in ratio relative to a control or over time is indicative of placental insufficiency and an elevation in SYNDECAN-1 is a measure of placental sufficiency or an improvement in placental sufficiency.

In an embodiment, the assay determines the state of placental health in a pregnant human subject, the method comprising determining the circulating levels of SPINT1 and at least one other biomarker wherein a reduction in the concentration of SPINT1 and a change in at least one other biomarker relative to a control or over time or a change in ratio relative to a control or over time is indicative of placental insufficiency and an elevation in SPINT-1 and a change in at least one other biomarker is a measure of placental sufficiency or an improvement in placental sufficiency.

In an embodiment, the assay determines the state of placental health in a pregnant human subject, the method comprising determining the circulating levels of SYNDECAN-1 and at least one other biomarker wherein a reduction in the concentration of SYNDECAN-1 and a change in at least one other biomarker relative to a control or over time or a change in ratio relative to a control or over time is indicative of placental insufficiency and an elevation in SYNDECAN-1 and a change in at least one other biomarker is a measure of placental sufficiency or an improvement in placental sufficiency.

Further enabled herein is a clinical management protocol for a pregnant human subject, the protocol comprising determining the levels of circulating SPINT1 and/or SYNDECAN-1 wherein a reduction over time in SPINT1 and/or SYNDECAN-1 compared to a control or a statistically validated level or a change in ratio reflecting a lowering of levels of SPINT1 and/or SYNDECAN-1 is indicative of placental insufficiency and wherein the fetus is monitored or subject to earlier delivery.

Further taught wherein is a clinical management protocol for macrosomia in a pregnant human subject, the protocol comprising determining the levels of circulating SPINT1 and/or SYNDECAN-1 wherein an elevation over time in SPINT1 and/or SYNDECAN-1 compared to a control or a statistically validated level or a change in ratio reflecting elevation of levels of SPINT1 and/or SYNDECAN-1 is indicative of macrosomia wherein the fetus is monitored and potentially subject to earlier delivery.

The term "subject" includes a patient, pregnant mother and a female of child bearing age.

The biomarkers are determined within maternal circulatory fluid which includes whole blood, plasma and serum. Other circulatory fluid such as lymph fluid, ascites or urine may also be assayed. The biomarker may be assayed alongside or in combination with physiochemical data obtained such as, by ultrasound.

The assay may be performed in any number of ways including direct measure of the biomarker or indirectly using a ligand to the biomarker. A "ligand" includes an antibody and a receptor for the biomarker. Conveniently, the assay is an immunoassay such as an ELISA and uses antibodies to specifically bind to and directly or indirectly detect SPINT1 or SYNDECAN-1. The assay may be quantitated. The assay may also be genetic such as detecting RNAs encoding the biomarkers and/or other circulating RNA species (or non-RNA nucleic acid species) indicative of placental insufficiency or its associated conditions such as FGR.

Hence, a rapid, efficient and sensitive assay is provided for the identification of placental insufficiency. The condition of placental insufficiency includes the effects caused directly or indirectly by placental insufficiency such as FGR and SGA babies. In a particular embodiment, the assay enables early detection of placental insufficiency. Notwithstanding, the present invention is not limited to just the early detection of placental insufficiency since the assay may be used at any gestational stage of a pregnancy. In addition, elevated levels of SPINT1 and/or SYNDECAN-1 or their ratios indicating an elevation in either or both is proposed to be an indicator of fetal macrosomia.

As noted elsewhere herein, the inventors have also surprisingly found that the circulating level of SPINT1 in pregnant female subjects correlates with clinical parameters of placental insufficiency, such as uterine blood flow (uterine artery Doppler velocity) at the time of sampling ($R^2=0.111$; $p<0.0001$), neonatal lean mass ($R^2=0.064$; $p<0.0001$), placental weight ($R^2=0.087$; $p<0.0001$) and placental surface area ($R^2=0.028$; $p<0.013$).

Identified are circulating biomarkers useful in the detection of placental insufficiency or to assess the level of placental health. The biomarkers are SPINT1 (also known as hepatocyte growth factor activator inhibitor-1; HAI-1) and SYNDECAN-1. Reference to "SPINT1" and "SYNDECAN-1" includes a modified or homolog form thereof. A modified form includes a derivative, polymorphic variant, truncated form (truncate) and aggregated or multimeric forms or forms having expansion elements (e.g. amino acid expansion elements). For brevity, such modified and homolog forms are included by reference to any or some or all of the biomarkers.

In an embodiment, SPINT1 comprises an amino acid sequence of SEQ ID NO:1 (GenBank Accession No: AB000095.1), or an amino acid sequence having at least 70% sequence identity thereto:

```
                                           (SEQ ID NO: 1)
MAPARTMARARLAPAGIPAVALWLLCTLGLQGTQAGPPPAPPGLPAGADC

LNSFTAGVPGFVLDTNASVSNGATFLESPTVRRGWDCVRACCTTQNCNLA

LVELQPDRGEDAIAACFLINCLYEQNFVCKFAPREGFINYLTREVYRSYR
```

```
-continued
QLRTQGFGGSGIPKAWAGIDLKVQPQEPLVLKDVENTDWRLLRGDTDVRV

ERKDPNQVELWGLKEGTYLFQLTVTSSDHPEDTANVTVTVLSTKQTEDYC

LASNKVGRCRGSFPRWYYDPTEQICKSFVYGGCLGNKNNYLREEECILAC

RGVQGPSMERRHPVCSGTCQPTQFRCSNGCCIDSFLECDDTPNCPDASDE

AACEKYTSGFDELQRIHFPSDKGHCVDLPDTGLCKESIPRWYYNPFSEHC

ARFTYGGCYGNKNNFEEEQQCLESCRGISKKDVFGLRREIPIPSTGSVEM

AVAVFLVICIVVVVAILGYCFFKNQRKDFHGHHHHPPPTPASSTVSTTED

TEHLVYNHTTRPL.
```

In an embodiment, SYNDECAN-1 comprises an amino acid sequence of SEQ ID NO:2 (GenBank Accession No: AJ551176.1), or an amino acid sequence having at least 70% sequence identity thereto:

```
                                           (SEQ ID NO: 2)
MRRAALWLWLCALALSLQPALPQIVATNLPPEDQDGSGDDSDNFSGSGAG

ALQDITLSQQTPSTWKDTQLLTAIPTSPEPTGLEATAASTSTLPAGEGPK

EGEAVVLPEVEPGLTAREQEATPRPRETTQLPTTHQASTTTATTAQEPAT

SHPHRDMQPGHHETSTPAGPSQADLHTPHTEDGGPSATERAAEDGASSQL

PAAEGSGEQDFTFETSGENTAVVAVEPDRRNQSPVDQGATGASQGLLDRK

EVLGGVIAGGLVGLIFAVCLVGFMLYRMKKKDEGSYSLEEPKQANGGAYQ

KPTKQEEFYA.
```

Modified or homolog forms of SPINT1 will be familiar to persons skilled in the art, illustrative examples of which are described in GenBank Accession Nos: NM_001032367.1 to NP_001027539.1 (isoform 2 precursor), NM_003710.3 to NP_003701.1 (isoform 2 precursor), and NM_181642.2 to NP_857593.1 (isoform 1 precursor), the contents of which are incorporated herein by reference in their entirety.

Modified or homolog forms of SYNDECAN-1 will also be familiar to persons skilled in the art, illustrative examples of which are described in GenBank Accession Nos: XM_005262622.2 to XP_005262679.1 (isoform X3), GenBank Accession Nos: XM_005262620.4 to XP_005262677.1 (isoform X1) and GenBank Accession Nos: XM_005262621.3 to XP_005262678.3 (isoform X2), the contents of which are incorporated herein by reference in their entirety. Further illustrative examples of modified or homolog forms of SYNDECAN-1 are described in Romaris et al. (1999, *The Journal of Biological Chemistry*, 274, 18667-18674), the contents of which are incorporated herein by reference in their entirety.

Reference to "at least 70% sequence identity" includes 70%, 71%, 72%, 73%, 74%, 75%, 76%, 77%, 78% 79%, 80%, 85%, 86%, 87%, 88%, 89%, 90%, 91%, 92%, 93%, 94%, 95%, 96%, 97%, 98%, 99% or 100% sequence identity, for example, after optimal alignment or best fit analysis. Thus, in an embodiment, the amino acid sequence of SPINT1 comprises at least 85%, preferably at least 86%, preferably at least 87%, preferably at least 88%, preferably at least 89%, preferably at least 90%, preferably at least 91%, preferably at least 92%, preferably at least 93%, preferably at least 94%, preferably at least 95%, preferably at least 96%, preferably at least 97%, preferably at least 98%, preferably at least 99% or more preferably 100% sequence identity to SEQ ID NO:1, as described herein. In another embodiment, the amino acid sequence of SYNDE- CAN-1 comprises at least 85%, preferably at least 86%, preferably at least 87%, preferably at least 88%, preferably at least 89%, preferably at least 90%, preferably at least 91%, preferably at least 92%, preferably at least 93%, preferably at least 94%, preferably at least 95%, preferably at least 96%, preferably at least 97%, preferably at least 98%, preferably at least 99% or more preferably 100% sequence identity to SEQ ID NO:2, as described herein.

The terms "identity", "similarity", "sequence identity", "sequence similarity", "homology", "sequence homology" and the like, as used herein, mean that at any particular amino acid residue position in an aligned sequence, the amino acid residue is identical between the aligned sequences. The term "similarity" or "sequence similarity" as used herein, indicates that, at any particular position in the aligned sequences, the amino acid residue is of a similar type between the sequences. For example, leucine may be substituted for an isoleucine or valine residue. As noted elsewhere herein, this may be referred to as conservative substitution. In an embodiment, modified or homolog forms of SPINT1 and SYNDECAN-1 have an amino acid sequence that differs from SEQ ID NOs:1 and 2, respectively, by way of one or more conservative substitution of any of the amino acid residues contained therein.

In some embodiments, sequence identity with respect to a peptide sequence relates to the percentage of amino acid residues in the candidate sequence which are identical with the residues of the corresponding peptide sequence after aligning the sequences and introducing gaps, if necessary, to achieve the maximum percentage homology, and not considering any conservative substitutions as part of the sequence identity. Neither N- or C-terminal extensions, nor insertions shall be construed as reducing sequence identity or homology. Methods and computer programs for performing an alignment of two or more amino acid sequences and determining their sequence identity or homology are well known to persons skilled in the art. For example, the percentage of identity or similarity of two amino acid sequences can be readily calculated using algorithms, for example, BLAST, FASTA, or the Smith-Waterman algorithm. Techniques for determining an amino acid sequence "similarity" are well known to persons skilled in the art. In general, "similarity" means an exact amino acid to amino acid comparison of two or more peptide sequences or at the appropriate place, where amino acids are identical or possess similar chemical and/or physical properties such as charge or hydrophobicity. A so-termed "percent similarity" then can be determined between the compared peptide sequences. In general, "identity" refers to an exact amino acid to amino acid correspondence of two peptide sequences. Two or more peptide sequences can also be compared by determining their "percent identity". The percent identity of two sequences may be described as the number of exact matches between two aligned sequences divided by the length of the shorter sequence and multiplied by 100. An approximate alignment for nucleic acid sequences is provided by the local homology algorithm of Smith and Waterman, Advances in Applied Mathematics 2:482-489 (1981). This algorithm can be extended to use with peptide sequences using the scoring matrix developed by Dayhoff (Atlas of Protein Sequences and Structure, M. O. Dayhoff ed., 5 suppl. 3:353-358, National Biomedical Research Foundation, Washington, D.C., USA), and normalized by Gribskov (*Nucl. Acids Res.* 14(6):6745-6763, 1986). Suitable programs for calculating the percent identity or similarity between sequences are generally known in the art. Optimal alignment of sequences for aligning a comparison window may be conducted by computerized implementations of algorithms (GAP, BESTFIT, FASTA, and TFASTA in the Wisconsin Genetics Software Package Release 7.0, Genetics Computer Group, 575 Science Drive Madison, WI, USA) or by inspection and the best alignment (i.e., resulting in the highest percentage homology over the comparison window) generated by any of the various methods selected. Reference also may be made to the BLAST family of programs as for example disclosed by Altschul et al., (1997, *Nucl. Acids Res.* 25:3389. A detailed discussion of sequence analysis can be found in Unit 19.3 of Ausubel et al. ("Current Protocols in Molecular Biology", John Wiley & Sons Inc, 1994-1998, Chapter 15).

As described herein, modified or homolog forms of SPINT1 and SYNDECAN-1 include non-human isoforms. Illustrative examples of non-human isoforms include SPINT1 and SYNDECAN-1 isoforms native to primates, companion animals such as cats and dogs and the like, working animals such as horses, donkeys and the like, livestock animals such as sheep, cows, goats, pigs and the like, laboratory test animals such as rabbits, mice, rats, guinea pigs, hamsters and the like and captive wild animals such as those in zoos and wildlife parks, deer, dingoes and the like.

Accordingly, another aspect enabled herein is an assay for determining the state of placental sufficiency in a subject, the assay comprising determining the concentration of biomarkers in a circulating biological sample from the subject selected from SPINT1 and SYNDECAN-1, wherein an alteration in the levels of the biomarkers relative to a control provides an indication of the state of placental sufficiency. In an embodiment, a reduction in SPINT1 and/or SYNDECAN-1 is indicative of placental insufficiency or a propensity to develop same.

In an alternative embodiment, the present invention contemplates an assay for determining the state of placental sufficiency in a subject, the assay comprising determining the concentration of biomarkers in a circulating biological sample from the subject selected from SPINT1 and SYNDECAN-1; subjecting the levels to an algorithm or analytics function or process or other data processing means generated from a first knowledge base of data comprising the levels of the same biomarkers from a subject or cohort of subjects of known status with respect to placental sufficiency wherein the algorithm or analytics or data processing provides an index of probability of the subject having or not having placental insufficiency or placental sufficiency. Reference to the "algorithm" includes an algorithm which performs, but is not limited to, a multivariate or monovariate analysis function.

The above aspects also apply to the detection or monitoring of fetal macrosomia by screening for elevated levels of SPINT1 and/or SYNDECAN-1.

The determination of the concentrations or levels of the biomarkers enables establishment of a diagnostic rule based on the concentrations relative to controls. Alternatively, the diagnostic rule is based on the application of a statistical and machine learning algorithm. Such an algorithm uses relationships between biomarkers and state of placental sufficiency observed in training data (with known placental sufficiency status) to infer relationships which are then used to predict the status of patients with unknown status. An algorithm may be employed which provides an index of probability that a patient has placental insufficiency. As indicated above, the algorithm may perform but is not limited to, a multivariate or monovariate analysis function. Alternatively, the data is subject to analytics or analytical functions or processing.

Hence, in an embodiment, the present invention provides a diagnostic rule based on the application of a statistical and machine learning algorithm. Such an algorithm uses the relationships between biomarkers and placental sufficiency or insufficiency status observed in training data (with known placental sufficiency status) to infer relationships which are then used to predict the status of patients with unknown placental sufficiency status. Practitioners skilled in the art of data analysis recognize that many different forms of inferring relationships in the training data may be used without materially changing the present invention. Other analytics may also be employed to analyse data and identify associations between biomarkers and/or physiochemical parameters and placental insufficiency or its associated conditions such as FGR.

Hence, the present invention contemplates the use of a knowledge base of training data comprising levels of biomarkers selected from SPINT1, SYNDECAN-1, both SPINT1 and SYNDECAN-1; or one of SPINT1 or SYNDECAN-1 and at least one other biomarker from a subject with known placental sufficiency status to generate an algorithm or analytics function or process or other data processing means which, upon input of a second knowledge base of data comprising levels of the same biomarkers from a patient with an unknown placental sufficiency status, provides an index of probability that predicts the nature of the placenta. Other analytics functions may also be used.

As indicated above, the "subject" is generally a human female. However, the present invention extends to veterinary applications.

The term "training data" includes knowledge of levels of biomarkers relative to a control. A "control" includes a comparison to levels of biomarkers in a subject with adequate placental sufficiency or with known placental insufficiency or may be a statistically determined level based on trials. A statistically determined level may be a statistically validated predetermined level or cut-off that has already been validated as being linked or associated with placental sufficiency or with placental insufficiency. The term "levels" also encompasses ratios of levels of biomarkers and their velocities.

The "training data" also include the concentration of one or more of SPINT1 and/or SYNDECAN-1. The data may comprise information on an increase or decrease in either or both biomarkers.

The present invention further contemplates a panel of biomarkers for the detection of placental insufficiency or state of placental health or dysfunction in a subject, the panel comprising agents which bind specifically to biomarkers, the biomarkers selected from SPINT1, SYNDECAN-1, both SPINT1 and SYNDECAN-1; or one of SPINT1 or SYNDECAN-1 and at least one other biomarker to determine levels of the biomarkers and then optionally subjecting the levels to an algorithm or analytics function or process or other data processing means generated from a first knowledge base of data comprising the levels of the same biomarkers from a subject of known status with respect to the conditions wherein the algorithm provides an index of probability of the subject having or not having placental insufficiency.

The levels or concentrations of the biomarkers (SPINT1 and/or SYNDECAN-1) provide the input test data referred to herein as a "second knowledge base of data". The second knowledge base of data either is considered relative to a control or is fed into an algorithm generated by a "first knowledge base of data" which comprise information of the levels of biomarkers in a subject with a known placental sufficiency or insufficiency. The second knowledge base of data is from a subject of unknown status with respect to placental sufficiency or insufficiency. The output of the algorithm or analytics function or process or other data processing means is a probability or risk factor, referred to herein as an index of probability, of a subject having a particular level of placental sufficiency or insufficiency. The algorithm or analytics function or process or other data processing means may perform a multivariate or monovariate analysis function or other statistical operation.

The agents which "specifically bind" to the biomarkers generally include an immunointeractive molecule such as an antibody or hybrid, derivative including a recombinant or modified form thereof or an antigen-binding fragment thereof. The agents may also be a receptor or other ligand. The antibodies or receptors may be specific for the biomarker from a particular species of mammal or may be raised from a different species if they cross react. All these agents assist in determining the level of the biomarkers. Information on the level is input data for the algorithm.

Hence, the present invention further provides a panel of immobilized ligands to SPINT1, SYNDECAN-1, both SPINT1 and SYNDECAN-1; or one of SPINT1 or SYNDECAN-1 and at least one other biomarker.

The ligands, such as antibodies specific to the biomarkers, enable the quantitative or qualitative detection or determination of the level of the biomarkers. Reference to "level" includes concentration as weight per volume, activity per volume or units per volume or other convenient representative as well as ratios of levels and velocities.

As indicated above, the "sample" is generally circulatory maternal fluid such as whole blood, plasma or serum. Alternatively, the sample is a tissue sample which is being histologically examined or is ascites, lymph fluid or urine.

As indicated above, the "ligand" or "binding agent" and like terms, refer to any compound, composition or molecule capable of specifically or substantially specifically (that is with limited cross-reactivity) binding to an epitope on SPINT1 or SYNDECAN-1. The "binding agent" generally has a single specificity. Notwithstanding, binding agents having multiple specificities for both SPINT1 and SYNDECAN-1 are also contemplated herein. The binding agents (or ligands) are typically antibodies, such as monoclonal antibodies, or derivatives or analogs thereof, but also include, without limitation: Fv fragments; single chain Fv (scFv) fragments; Fab' fragments; F(ab')2 fragments; humanized antibodies and antibody fragments; camelized antibodies and antibody fragments; and multivalent versions of the foregoing. Multivalent binding reagents also may be used, as appropriate, including without limitation: monospecific or bispecific antibodies; such as disulfide stabilized Fv fragments, scFv tandems [(scFv)$_2$ fragments], diabodies, tribodies or tetrabodies, which typically are covalently linked or otherwise stabilized (i.e. leucine zipper or helix stabilized) scFv fragments. "Binding agents" also include aptamers, as are described in the art.

Methods of making antigen-specific binding agents, including antibodies and their derivatives and analogs and aptamers, are well-known in the art. Polyclonal antibodies can be generated by immunization of an animal. Monoclonal antibodies can be prepared according to standard (hybridoma) methodology. Antibody derivatives and analogs, including humanized antibodies can be prepared recombinantly by isolating a DNA fragment from DNA encoding a monoclonal antibody and subcloning the appropriate V regions into an appropriate expression vector according to standard methods. Phage display and aptamer technology is described in the literature and permit in vitro clonal amplification of antigen-specific binding reagents with very affinity low cross-reactivity. Phage display reagents and systems are available commercially, and include the Recombinant Phage Antibody System (RPAS), commercially available from Amersham Pharmacia Biotech, Inc. of Piscataway, New Jersey and the pSKAN Phagemid Display System, commercially available from MoBiTec, LLC of Marco Island, Florida. Aptamer technology is described for example and without limitation in U.S. Pat. Nos. 5,270,163; 5,475,096; 5,840,867 and 6,544,776.

ECLIA, ELISA and Luminex LabMAP immunoassays are examples of suitable assays to detect levels of the biomarkers. In one example a first binding reagent/antibody is attached to a surface and a second binding reagent/antibody comprising a detectable group binds to the first antibody. Examples of detectable-groups include, for example and without limitation: fluorochromes, enzymes, epitopes for binding a second binding reagent (for example, when the second binding reagent/antibody is a mouse antibody, which is detected by a fluorescently-labeled anti-mouse antibody), for example an antigen or a member of a binding pair, such as biotin. The surface may be a planar surface, such as in the case of a typical grid-type array (for example, but without limitation, 96-well plates and planar microarrays) or a non-planar surface, as with coated bead array technologies, where each "species" of bead is labeled with, for example, a fluorochrome (such as the Luminex technology described in U.S. Pat. Nos. 6,599,331, 6,592,822 and 6,268,222), or quantum dot technology (for example, as described in U.S. Pat. No. 6,306,610). Such assays may also be regarded as laboratory information management systems (LIMS).

In the bead-type immunoassays, the Luminex LabMAP system can be utilized. The LabMAP system incorporates polystyrene microspheres that are dyed internally with two spectrally distinct fluorochromes. Using precise ratios of these fluorochromes, an array is created consisting of 100 different microsphere sets with specific spectral addresses. Each microsphere set can possess a different reactant on its surface. Because microsphere sets can be distinguished by their spectral addresses, they can be combined, allowing up to 100 different analytes to be measured simultaneously in a single reaction vessel. A third fluorochrome coupled to a reporter molecule quantifies the biomolecular interaction that has occurred at the microsphere surface. Microspheres are interrogated individually in a rapidly flowing fluid stream as they pass by two separate lasers in the Luminex analyzer. High-speed digital signal processing classifies the microsphere based on its spectral address and quantifies the reaction on the surface in a few seconds per sample.

As used herein, "immunoassay" refers to immune assays, typically, but not exclusively sandwich assays, capable of detecting and quantifying a desired biomarker, namely SPINT1, SYNDECAN-1, both SPINT1 and SYNDECAN-1; or one of SPINT1 or SYNDECAN-1 and at least one other biomarker.

Data generated from an assay to determine circulatory fluid levels of SPINT1, SYNDECAN-1, both SPINT1 and SYNDECAN-1; or one of SPINT1 or SYNDECAN-1 and at least one other biomarker, can be used to determine the likelihood of or progression of the state of placental insufficiency in the subject. The input of data comprising the levels of the biomarkers is compared with a control or is put into the algorithm which provides a risk value of the likelihood that the subject has or will develop placental insufficiency.

In context of the present disclosure, "circulatory fluid" includes any blood fraction, for example serum or plasma, which can be analyzed according to the methods described herein. By measuring blood levels of a particular biomarker, it is meant that any appropriate blood fraction can be tested to determine blood levels and that data can be reported as a value present in that fraction. Other fluids contemplated herein include ascites, lymph fluid and urine.

The present invention further encompasses a composition comprising a sample obtained from a pregnant mammalian subject and an antibody that binds specifically to SPINT1 or SYNDECAN-1. In some embodiments, the composition comprises an antibody that binds specifically to SPINT1 and an antibody that binds specifically to SYNDECAN-1. The sample is suitably a circulatory maternal fluid such as whole blood, plasma or serum. Alternatively, the sample is a tissue sample which is being histologically examined or is ascites, lymph fluid or urine. The antibody or antibodies are suitably labeled with a detectable group or substance.

As described above, methods for diagnosing a state of placental health or dysfunction by determining levels of a specific biomarker and using this level as second knowledge base data in an algorithm generated with first knowledge base data or levels of the same biomarkers in patents with a known placental health. Also provided are methods of detecting placental dysfunction comprising determining the presence and/or velocity of specific identified biomarkers in a subject's sample. By "velocity" it is meant the change in the concentration of the biomarker in a patient's sample (the maternal circulatory fluid) over time.

In an embodiment, the subject invention contemplates a method for monitoring the progression of a pregnancy in a patient, comprising:
  (a) providing a circulatory fluid sample from a patient;
  (b) determining the level of SPINT1, SYNDECAN-1, both SPINT1 and SYNDECAN-1; or one of SPINT1 or SYNDECAN-1 and at least one other biomarker and subjecting the levels to an algorithm or analytics function or process or other data processing means to provide an index of probability of the patient having a placental sufficiency or insufficiency; and
  (c) repeating steps (a) and (b) at a later point in time and comparing the result of step (b) with the result of step (c) wherein a difference in the index of probability is indicative of the progression of the placental health.

In an embodiment, an increased index of probability of placental dysfunction developing at the later time point may indicate that the condition is progressing and that the treatment (if applicable) is not being effective. In contrast, a decreased index of probability at the later time point may indicate that placental sufficiency is improving and that the treatment (if application) is effective. The treatment may include early or earlier delivery of the baby.

As used herein, the terms "early delivery" and "earlier delivery" are used interchangeably herein to refer to delivery of a fetus before a pregnant subject undergoes natural labor and includes a delivery assistance intervention such as induction of labor. The earlier or earlier delivery may be pre-term (e.g., before 37 weeks of gestation), term (e.g., 37, 38, 39, 40, 41 or 42 weeks of gestation) or post-term (e.g., after 42 weeks of gestation) and includes vaginal, instrumental (forceps or vacuum birth), or Caesarean delivery. In specific embodiments, the terms "early delivery" and "earlier delivery" refer to a delivery assistance intervention (e.g., induction of labor) at 38, 38.5 or 39 weeks of gestation.

As indicated above, antibodies may be used in any of a number of immunoassays which rely on the binding interaction between an antigenic determinant of the biomarker and the antibodies. Examples of such assays are radioimmunoassay, enzyme immunoassays (e.g. ECLIA, ELISA), immunofluorescence, immunoprecipitation, latex agglutination, hemagglutination and histochemical tests. The antibodies may be used to detect and quantify the level of the biomarker in a sample in order to determine the level of placental sufficiency or insufficiency.

The antibody or circulatory fluid sample may be immobilized on a carrier or solid support which is capable of immobilizing cells, antibodies etc. For example, the carrier or support may be nitrocellulose, or glass, polyacrylamides, gabbros, and magnetite. The support material may have any possible configuration including spherical (e.g. bead), cylindrical (e.g. inside surface of a test tube or well, or the external surface of a rod), or flat (e.g. sheet, test strip) Indirect methods may also be employed in which the primary antigen-antibody reaction is amplified by the introduction of a second antibody, having specificity for the antibody reactive against biomarker protein. By way of example, if the antibody having specificity against biomarker protein is a rabbit IgG antibody, the second antibody may be goat anti-rabbit gamma-globulin labeled with a detectable substance as described herein.

Where a radioactive label is used as a detectable substance, the biomarker may be localized by radioautography. The results of radioautography may be quantitated by determining the density of particles in the radioautographs by various optical methods, or by counting the grains.

The methods of the present invention described herein may also be performed using microarrays, such as oligonucleotide arrays, mRNA arrays, cDNA arrays, genomic DNA arrays, or tissue arrays. Any nucleic acid species present in maternal circulatory fluid and which is associated directly or indirectly with placental insufficiency or its associated conditions such as FGR or SGA babies may be assayed.

In one embodiment, the method of the present invention involves the detection of expression of nucleic acid molecules encoding SPINT1, SYNDECAN-1, both SPINT1 and SYNDECAN-1; or one of SPINT1 or SYNDECAN-1 and at least one other biomarker and to determine the level of biomarkers based on level of expression. Alternatively, another nucleic acid species (e.g. RNA species other than mRNA) may be assayed which is associated directly or indirectly with placental insufficiency or its associated conditions such as FGR or SGA babies. Those skilled in the art can construct nucleotide probes for use in the detection of mRNA sequences encoding the biomarker or other RNA species in samples. Suitable probes include nucleic acid molecules based on nucleic acid sequences encoding at least five sequential amino acids from regions of the biomarker, preferably they comprise 15 to 30 nucleotides. A nucleotide probe may be labeled with a detectable substance such as a radioactive label which provides for an adequate signal and has sufficient half-life such as $^{32}P$, $^{3}H$, $^{44}C$ or the like. Other detectable substances which may be used include antigens that are recognized by a specific labeled antibody, fluorescent compounds, enzymes, antibodies specific for a labeled antigen, and luminescent compounds. An appropriate label may be selected having regard to the rate of hybridization and binding of the probe to the nucleotide to be detected and the amount of nucleotide available for hybridization. Labeled probes may be hybridized to nucleic acids on solid supports such as nitrocellulose filters or nylon membranes as generally described in Sambrook et al, *Molecular Cloning, A Laboratory Manual.* (2nd ed.), 1989. The nucleic acid probes may be used to detect genes, for example, in human cells, that encode the biomarker. The nucleotide probes may also be useful in the diagnosis of placental disorders involving SPINT1 and/or SYNDECAN-1, in monitoring the progression of such disorders, or in monitoring a therapeutic treatment. In an embodiment, the probes are used in the diagnosis of, and in monitoring the progression of placental sufficiency or insufficiency.

The probe may be used in hybridization techniques to detect expression of genes that encode biomarker proteins. The technique generally involves contacting and incubating nucleic acids (e.g. mRNA or other RNA species) obtained from a sample from a patient or other cellular source with a probe under conditions favorable for the specific annealing of the probes to complementary sequences in the nucleic acids. After incubation, the non-annealed nucleic acids are removed, and the presence of nucleic acids that have hybridized to the probe if any are detected.

The detection of mRNA may involve converting the mRNA to cDNA and/or the amplification of specific nucleotide sequences using an amplification method such as polymerase chain reaction (PCR), followed by the analysis of the amplified molecules using techniques known to those skilled in the art. Suitable primers can be routinely designed by one of skill in the art.

Hybridization and amplification techniques described herein may be used to assay qualitative and quantitative aspects of expression of genes encoding the biomarker. For example, RNA may be isolated from a cell type or tissue known to express a gene encoding the biomarker or otherwise associated with placental insufficiency, and tested utilizing the hybridization (e.g. standard Northern analyses) or PCR techniques referred to herein. The techniques may be used to detect differences in transcript size which may be due to normal or abnormal alternative splicing. The techniques may be used to detect quantitative differences between levels of full length and/or alternatively splice transcripts detected in normal individuals relative to those individuals exhibiting symptoms of placental insufficiency involving a biomarker protein or gene.

Accordingly, the present invention provides a method of detecting the state of placental health in a subject comprising:
  (a) providing a circulatory fluid sample from the patient;
  (b) extracting a nucleic acid molecule comprising mRNA encoding a biomarker or portion thereof or other RNA species from the sample or cells within a sample;
  (c) amplifying the extracted mRNA or RNA using the polymerase chain reaction;
  (d) determining the level of mRNA encoding the biomarker or other RNA species; and
  (e) subjecting the levels of the biomarker to an algorithm or analytics function or process or other data processing means which provides an index of probability of the patient having placental sufficiency or insufficiency.

The methods described herein may be performed by utilizing pre-packaged diagnostic kits comprising the necessary reagents to perform any of the methods of the invention. For example, the kits may include at least one specific nucleic acid or antibody described herein, which may be conveniently used, e.g. in clinical settings, to screen and diagnose patients and to screen and identify those individuals exhibiting a predisposition to developing placental dysfunction. The kits may also include nucleic acid primers for amplifying nucleic, acids encoding the biomarker in the polymerase chain reaction. The kits can also include nucleotides, enzymes and buffers useful in the method of the invention as well as electrophoretic markers such as a 200 bp ladder. The kit also includes detailed instructions for carrying out the methods of the present invention.

The present invention further provides an algorithm-based screening assay to screen circulatory fluid samples from patients. Generally, input data are collected based on levels of a biomarker (or levels of expression of genes encoding a biomarker) and subjected to an algorithm to assess the statistical significance of any elevation or reduction in levels which information is then output data. Computer software and hardware for assessing input data are encompassed by the present invention.

The assay of the present invention permits integration into existing or newly developed pathology architecture or platform systems. For example, the present invention contemplates a method of allowing a user to determine the status of a subject with respect to a level of placental sufficiency or insufficiency, the method including:
  (a) receiving data in the form of levels or concentrations of SPINT1, SYNDECAN-1, both SPINT1 and SYNDECAN-1; or one of SPINT1 or SYNDECAN-1 and at least one other biomarker from the user via a communications network;
  (b) processing the subject data via an algorithm or analytics function or process or other data processing means which provides a disease index value;
  (c) determining the status of the subject in accordance with the results of the disease index value in comparison with predetermined values; and
  (d) transferring an indication of the status of the subject to the user via the communications network.

Conveniently, the method generally further includes:
  (a) having the user determine the data using a remote end station; and
  (b) transferring the data from the end station to the base station via the communications network.

The base station can include first and second processing systems, in which case the method can include:
  (a) transferring the data to the first processing system;
  (b) transferring the data to the second processing system; and
  (c) causing the first processing system to perform the algorithmic function to generate the disease index value.

The method may also include:
  (a) transferring the results of the algorithmic function to the first processing system; and
  (b) causing the first processing system to determine the status of the subject.

In this case, the method also includes at least one of:
  (a) transferring the data between the communications network and the first processing system through a first firewall; and
  (b) transferring the data between the first and the second processing systems through a second firewall.

The second processing system may be coupled to a database adapted to store predetermined data and/or the algorithm, the method may include:
  (a) querying the database to obtain at least selected predetermined data or access to the algorithm from the database; and
  (b) comparing the selected predetermined data to the subject data or generating a predicted probability index.

Reference to an "algorithm" or "algorithmic functions" as outlined above includes the performance of, but not limited to, a multivariate or monovariate analysis function. Other analytic functions may also or alternatively be performed. A range of different architectures and platforms may be implemented in addition to those described above. It will be appreciated that any form of architecture suitable for implementing the present invention may be used. One technique is the use of distributed architectures. This can increase the efficiency of the system by reducing data bandwidth costs and requirements, as well as ensuring that if one base station becomes congested or a fault occurs, other end stations could take over. This also allows load sharing or the like to ensure access to the system is available at all times.

In the above aspects, the term "data" means the levels or concentrations or velocities of a biomarker. This may be assayed alone or in combination with physical, chemical or physiochemical parameters such as data obtained from ultrasound or other physical testing procedures. The "communications network" includes the internet. When a server is used, it is generally a client server or more particularly a simple object application protocol (SOAP).

The present assay can be incorporated into present diagnostic architecture as an additional test during pregnancy or a stand-alone test. For example, the assay may be associated with ultrasound or physical measurements.

Once the information is available, the data can be used in a clinical management protocol for a pregnancy. This may include a decision to deliver a baby earlier than otherwise planned.

Hence, a clinical management protocol for a pregnant mammalian subject, the protocol comprising determining the levels of circulating SPINT1 and/or SYNDECAN-1 wherein a reduction over time in SPINT1 and/or SYNDECAN-1 compared to a control or a statistically validated level or a change in ratio reflecting a lowering of levels of SPINT1 and/or SYNDECAN-1 is indicative of placental insufficiency and wherein the fetus is monitored or subject to earlier delivery.

In an embodiment, a clinical management protocol for a pregnant mammalian subject, the protocol comprising determining the levels of circulating SPINT1 wherein a reduction over time in SPINT1 compared to a control or a statistically validated level or a change in ratio reflecting a lowering of levels of SPINT1 is indicative of placental insufficiency and wherein the fetus is monitored or subject to earlier delivery.

In an embodiment, a clinical management protocol for a pregnant mammalian subject, the protocol comprising determining the levels of circulating SYNDECAN-1 wherein a reduction over time in SYNDECAN-1 compared to a control or a statistically validated level or a change in ratio reflecting a lowering of levels of SYNDECAN-1 is indicative of placental insufficiency and wherein the fetus is monitored or subject to earlier delivery.

In an embodiment, a clinical management protocol for a pregnant mammalian subject, the protocol comprising determining the levels of circulating SPINT1 and at least one other biomarker wherein a reduction over time in SPINT1 and change in at least one other biomarker compared to a control or a statistically validated level or a change in ratio reflecting a lowering of levels of SPINT1 and at least one other biomarker is indicative of placental insufficiency and wherein the fetus is monitored or subject to earlier delivery.

In an embodiment, a clinical management protocol for a pregnant mammalian subject, the protocol comprising determining the levels of circulating SYNDECAN-1 and at least one other biomarker wherein a reduction over time in SYNDECAN-1 and change in at least one other biomarker compared to a control or a statistically validated level or a change in ratio reflecting a lowering of levels of SYNDE- CAN-1 and at least one other biomarker is indicative of placental insufficiency and wherein the fetus is monitored or subject to earlier delivery.

Further enabled herein is a clinical management protocol for a pregnant mammalian subject, the protocol comprising determining the levels of circulating SPINT1 and/or SYNDECAN-1 wherein a reduction over time in SPINT1 and/or SYNDECAN-1 compared to a control or a statistically validated level or a change in ratio reflecting a lowering of levels of SPINT1 and/or SYNDECAN-1 is indicative of placental insufficiency and wherein the fetus is monitored or subject to earlier delivery.

Further taught wherein is a clinical management protocol for macrosomia in a pregnant mammalian subject, the protocol comprising determining the levels of circulating SPINT1 and/or SYNDECAN-1 wherein an elevation over time in SPINT1 and/or SYNDECAN-1 compared to a control or a statistically validated level or a change in ratio reflecting elevating placental insufficiency and macrosomia wherein the fetus is monitored or subject to earlier delivery.

As indicated above, whilst there are veterinary applications, in an embodiment, the mammalian subject is a pregnant human female subject. The sample tested is circulatory maternal fluid.

Hence, a clinical management protocol for a pregnant human female subject, the protocol comprising determining the levels of circulating SPINT1 and/or SYNDECAN-1 wherein a reduction over time in SPINT1 and/or SYNDECAN-1 compared to a control or a statistically validated level or a change in ratio reflecting a lowering of levels of SPINT1 and/or SYNDECAN-1 is indicative of placental insufficiency and wherein the fetus is monitored or subject to earlier delivery.

In an embodiment, a clinical management protocol for a pregnant human female subject, the protocol comprising determining the levels of circulating SPINT1 wherein a reduction over time in SPINT1 compared to a control or a statistically validated level or a change in ratio reflecting a lowering of levels of SPINT1 is indicative of placental insufficiency and wherein the fetus is monitored or subject to earlier delivery.

In an embodiment, a clinical management protocol for a pregnant human female subject, the protocol comprising determining the levels of circulating SYNDECAN-1 wherein a reduction over time in SYNDECAN-1 compared to a control or a statistically validated level or a change in ratio reflecting a lowering of levels of SYNDECAN-1 is indicative of placental insufficiency and wherein the fetus is monitored or subject to earlier delivery.

In an embodiment, a clinical management protocol for a pregnant human female subject, the protocol comprising determining the levels of circulating SPINT1 and at least one other biomarker wherein a reduction over time in SPINT1 and at least one other biomarker compared to a control or a statistically validated level or a change in ratio reflecting a lowering of levels of SPINT1 and at least one other biomarker is indicative of placental insufficiency and wherein the fetus is monitored or subject to earlier delivery.

Further enabled herein is a clinical management protocol for a pregnant human subject, the protocol comprising determining the levels of circulating SPINT1 and/or SYNDECAN-1 wherein a reduction over time in SPINT1 and/or SYNDECAN-1 compared to a control or a statistically validated level or a change in ratio reflecting a lowering of levels of SPINT1 and/or SYNDECAN-1 is indicative of placental insufficiency and wherein the fetus is monitored or subject to earlier delivery.

Further taught herein is a clinical management protocol for macrosomia in a pregnant human subject, the protocol comprising determining the levels of circulating SPINT1 and/or SYNDECAN-1 wherein an elevation over time in SPINT1 and/or SYNDECAN-1 compared to a control or a statistically validated level or a change in ratio reflecting elevating placental insufficiency and macrosomia wherein the fetus is monitored or subject to earlier delivery.

In an embodiment, a clinical management protocol for a pregnant human female subject, the protocol comprising determining the levels of circulating SYNDECAN-1 and at least one other biomarker wherein a reduction over time in SYNDECAN-1 and at least one other biomarker compared to a control or a statistically validated level or a change in ratio reflecting a lowering of levels of SYNDECAN-1 and at least one other biomarker is indicative of placental insufficiency and wherein the fetus is monitored or subject to earlier delivery.

In an embodiment the present invention encompasses an assay for determining the state of fetal macrosomia in a subject, the assay comprising determining the concentration of biomarkers in a circulating biological sample from the subject selected from SPINT1 and SYNDECAN-1; subjecting the levels to an algorithm or analytics function or process or other data processing means generated from a first knowledge base of data comprising the levels of the same biomarkers from a subject or cohort of subjects of known status with respect to fetal macrosomia wherein the algorithm or analytics or data processing provides an index of probability of the subject having or not having a baby with fetal macrosomia.

As indicated herein, the levels of SPINT1 and/or SYNDECAN-1 are indicators of fetal health whether due to the level of placental sufficiency or insufficiency or as markers of fetal macrosomia. Hence, encompassed herein is the screening for and determination of lower or higher levels of SPINT1 and/or SYNDECAN-1 compared to a control to monitor or detect FGR or SGA babies (if SPINT1 and/or SYNDECAN-1 is low) or fetal macrosomia (if SPINT1 and/or SYNDECAN-1 is high).

As noted elsewhere herein, the inventors have developed and validated a 4-tier model of risk assessment for different low birthweight ranges based on different SPINT1 MoM cut offs levels. For instance, a circulating SPINT1 MoM (measured from about 35-37 weeks gestation) of <0.63 represents a high risk (tier 1); of 0.63 to 1.1 represents a normal risk (tier 2); of 1.1 to 1.6 represents lower risk (tier 3); and of >1.6 represents a lowest risk (tier 4) of delivery of a neonate with low birthweight. The highest tier (tier 1) was associated with a 14.1%, 19.7%, 28.2% and 46.5% risk of women delivering neonates with birthweights <$3^{rd}$, <$5^{th}$, <$10^{th}$ and <$20^{th}$ centiles, respectively. In contrast, the lowest tier (tier 4) was associated with 0.0 to 6.6% risk of birthing neonates at these fetal weight centiles. Thus, in an embodiment, the pregnant female subject is determined to be at high risk of delivery of a low birthweight neonate if the subject has a circulating level SPINT1 of less than about 0.63 (MoM). In another embodiment, the pregnant female subject is determined to be at low risk of delivery of a low birthweight neonate if the subject has a circulating level SPINT1 of greater than about 1.1 (MoM).

Also provided herein is a clinical management protocol for a pregnant female subject, the protocol comprising determining the levels of circulating SPINT1 wherein a circulating SPINT1 concentration of less than about 0.63 MoM at from about 35 to about 37 weeks' gestation is indicative of an elevated risk of delivering a low birthweight infant and wherein the fetus is monitored or subject to earlier delivery.

In another embodiment, there is provided a clinical management protocol for a pregnant human subject, the protocol comprising determining the levels of circulating SPINT1 wherein a circulating SPINT1 concentration of less than about 0.63 MoMs at about 36 weeks' gestation is indicative of an elevated risk of delivering a low birthweight infant and wherein the fetus is monitored or subject to earlier delivery.

As described elsewhere herein, the inventors have surprisingly found that levels of SPINT1 and SYNDECAN-1 are already significantly lower at about 27 to 29 weeks gestation in women who subsequently delivered an SGA baby, as compared to women who do not subsequently delivered an SGA baby. Thus, it is to be understood that the assays, methods and protocols disclosed herein may be performed using levels of SPINT1 and/or SYNDECAN-1 measure in a sample obtained from the pregnant mammalian subject at about 27 to about 36 weeks gestation. By "about 27 to about 36 weeks" includes about 27 weeks, preferably about 28 weeks, preferably about 29 weeks, preferably about 30 weeks, preferably about 31 weeks, preferably about 32 weeks, preferably about 33 weeks, preferably about 34 weeks, preferably about 35 weeks, or about 36 weeks gestation.

Thus, in an embodiment, there is provided a clinical management protocol for a pregnant mammalian subject, the assays, methods or protocols, as described herein, comprise determining the levels of circulating SPINT1 in a sample obtained from the subject at a time point from about 27 weeks to about 36 weeks gestation, preferably from about 27 weeks to about 29 weeks gestation, or more preferably from about 28 weeks gestation.

In an embodiment, the protocol further comprises monitoring or subjecting the fetus of the subject identified as having placental insufficiency, and/or at risk of low birthweight, to earlier delivery.

In certain embodiments, the subject is monitored using the assays, methods or protocols of the present invention to determine the presence or absence of placental insufficiency or its associated conditions such as FGR or SGA, or macrosomia, to provide an indicator as to whether an earlier delivery of the fetus may be required. The monitoring is often conducted by serial testing. In some instances, the pregnant subject is monitored as needed (e.g., on an as-needed basis) using the methods described herein. Alternatively, or in addition, the pregnant subject can be monitored weekly, monthly, or at any pre-specified intervals. In some instances, the pregnant subject is monitored at least once every 24 hours. In some instances the pregnant subject is monitored at least once every 1 day to 30 days. In some instances the pregnant subject is monitored at least once every at least 1 day. In some instances the pregnant subject is monitored at least once every at most 30 days. In some instances the pregnant subject is monitored at least (optionally on average) once every 1 day to 5 days, 1 day to 10 days, 1 day to 15 days, 1 day to 20 days, 1 day to 25 days, 1 day to 30 days, 5 days to 10 days, 5 days to 15 days, 5 days to 20 days, 5 days to 25 days, 5 days to 30 days, 10 days to 15 days, 10 days to 20 days, 10 days to 25 days, 10 days to 30 days, 15 days to 20 days, 15 days to 25 days, 15 days to 30 days, 20 days to 25 days, 20 days to 30 days, or 25 days to 30 days. In some instances the pregnant subject is monitored at least once every 1, 2, 3, 4, 5, 6, 7, 8, 9, 10, 11, 12, 13, 14, 15, 16, 17, 18, 19, 20, 21, 28, 29, 30 or 31 days. In some instances, the pregnant subject is monitored at least once every 1, 2, or 3 months. In some instances, the pregnant subject is monitored via the methods described herein no more frequently than one week, 10 days, two weeks, three weeks, or one month. In other words, the predictive value of the some of the methods described herein can be of clinical use for at least one week, at least 10 days, at least two week, at least three weeks, or at least one month.

Without wishing to be bound by theory or mode of operation, it is proposed that early delivery of a fetus can be associated with greater risk that the baby will suffer complications in the near (e.g., respiratory distress) or long (e.g., IQ and attention deficit) term. In particular, it is known that delivery before 37 weeks gestation carries significantly increased risk and it is likely that a decision to intervene with a delivery assistance intervention (e.g., labour induction) would be taken on the basis of SPINT1 and/or SYNDECAN-1 and optionally one or more other physiochemical parameters and/or risk factors. It is also known that delivery from 37-38 weeks comes with a manageable, but non-zero, risk and is likely to be considered on a case by case basis. By contrast, it is known that delivery at about 38.5-39.5 weeks is not associated with significant risk of complications to the fetus. Furthermore, clinical trials have shown induction is also not associated with an increased risk of medical interventions to the mother, such as caesarean section or instrumental assisted birth (Grobman et al. *NEJM* 2018, 379:513-523).

Accordingly, in specific embodiments, a pregnant subject is monitored periodically (as described for example above) using the assays, methods or protocols of the present invention from about 35-37 weeks gestation, and the fetus is subjected to early delivery between about 38 weeks of gestation and about 39 weeks of gestation, on the basis that the results of the assays, methods or protocols indicate placental insufficiency or fetal growth restriction or macrosomia. It is believed that such an intervention could decrease the likelihood of stillbirths (the risk of stillbirth increases significantly post 38 weeks gestation), fetal or maternal injury in pregnancies where there is suspected macrosomia (where the pregnancy is not induced at term gestation and left to continue until spontaneous labour occurs (Boulvain et al. *Lancet* 2015; 385 (9987):2600-2605) and also other complications that might otherwise occur post 39 weeks gestation. Conversely, if in these embodiments, the results of the assays, methods or protocols indicate placental sufficiency and/or expected weight within the normal range, the fetus is not subjected to early delivery and the pregnant subject is permitted to proceed to later gestations.

As demonstrated elsewhere herein, the present inventors have surprisingly found that the circulating level of SPINT1 and/or SYNDECAN-1 in pregnant female subjects is indicative of the risk of low birthweight, noting that pregnant female subjects with a low level of SPINT1 and/or SYNDECAN-1 from as early as about 27-29 weeks gestation are at significant risk of giving birth to a low birthweight (small for gestational age) neonate. These findings may be applied to a birthweight calculator; that is, to an apparatus or method of predicting the birthweight of a neonate by correlating the circulating level of SPINT1 and/or SYNDECAN-1 in a pregnant female subject to predetermined circulating levels of SPINT1 and/or SYNDECAN-1 of a female subject for which the birthweight of the neonate is known. Thus, the present disclosure extends to a method of predicting the birthweight of a neonate, the method comprising (i) determining a circulating level of SPINT1 and/or SYNDECAN-1 in a sample from a pregnant female subject; (ii) providing a predetermined correlation between circulating levels of SPINT1 and/or SYNDECAN-1 of a plurality of pregnant female subjects of the same species and neonatal birthweight; and (iii) predicting the birthweight of the neonate from the circulating level of SPINT1 and/or SYNDECAN-1 as determined in step (i) based on the predetermined correlation of step (ii).

The present disclosure also extends to an apparatus for predicting the birthweight of a neonate, the apparatus comprising (i) a receiver operative to receive biomarker information, wherein said biomarker information is a circulating level of SPINT1 and/or SYNDECAN-1 in a sample from a pregnant female subject; and (ii) a birthweight determiner operative to employ said biomarker information to provide an output that represents a prediction of the birthweight of the neonate; wherein said predicted birthweight is based on a predetermined correlation between circulating levels of SPINT1 and/or SYNDECAN-1 of a plurality of pregnant female subjects of the same species and neonatal birthweight.

In an embodiment, the predetermined correlation between (a) circulating levels of SPINT1 and/or SYNDECAN-1 of a plurality of pregnant female subjects of the same species and (b) neonatal birthweight is defined by a regression coefficient ($R^2$) of from about 0.020 and 0.060. In an embodiment, the predetermined correlation is defined by a regression coefficient of from about 0.026 to about 0.52. In an embodiment, the predetermined correlation is defined by a regression coefficient of about 0.52

As noted elsewhere herein, the inventors have unexpectedly found that the circulating level of SPINT1 in pregnant female subjects correlates with clinical parameters of placental insufficiency, such as neonatal lean mass ($R^2$=0.064; p<0.0001), and placental weight ($R^2$=0.087; p<0.0001). Accordingly, the present disclosure extends to an assay to determine the placental weight and/or the placental surface area in a pregnant female mammalian subject, the method comprising determining the maternal circulating levels of SPINT1 and/or SYNDECAN-1 wherein a reduction in the concentration of SPINT1 and/or SYNDECAN-1 relative to a control or over time or a change in ratio relative to a control or over time is indicative of lower placental weight and lower placental surface area. Further enabled herein is a clinical management protocol for a pregnant mammalian subject, the protocol comprising determining the maternal circulating levels of SPINT1 and/or SYNDECAN-1 wherein a reduction in the concentration of SPINT1 and/or SYNDECAN-1 relative to a control or over time or a change in ratio relative to a control or over time is indicative of lower placental weight and lower placental surface area and wherein the fetus is monitored or subject to earlier delivery.

The present disclosure also extends to an assay to determine the lean mass of a neonate, the method comprising determining the circulating levels of SPINT1 and/or SYNDECAN-1 in a pregnant female mammalian subject, wherein a reduction in the concentration of SPINT1 and/or SYNDECAN-1 relative to a control or over time or a change in ratio relative to a control or over time is indicative of the neonate having a lower lean mass. Further enabled herein is a clinical management protocol for a pregnant mammalian subject, the protocol comprising determining the maternal circulating levels of SPINT1 and/or SYNDECAN-1 wherein a reduction in the concentration of SPINT1 and/or SYNDECAN-1 relative to a control or over time or a change in ratio relative to a control or over time is indicative of the neonate having a lower lean mass and wherein the fetus is monitored or subject to earlier delivery and/or the subject is exposed to a treatment to enhance the lean mass of the neonate.

EXAMPLES

Aspects disclosed herein are further described with reference to the following non-limiting examples.

Example 1

Placental Specific Proteins

The Fetal Longitudinal Assessment of Growth (FLAG) study was designed to examine the predictive ability of mRNA coding placental specific genes, and their proteins, in maternal blood measured at 28 and 36 weeks' gestation for term FGR. Longitudinal samples were collected from 2000 pregnant women; 10.5% subsequently birthed a SGA (<10th centile) baby. Over 18 months a 1:1 case control set was systematically selected from the first 1000 FLAG samples (i.e., 105 cases of SGA and 105 matched controls) for 28 of the 51 surface proteins using ELISA. SPINT1 was identified as a promising new candidate marker of placental insufficiency.

SPINT1 is a protease inhibitor that regulates cell surface and extracellular serine proteases involved in tissue remodelling (Tanaka et al. (2005) *Mol Cell Biol* 25:5687-5698). SPINT1 was originally identified as an inhibitor of hepatocyte growth factor activator. It is also known as HAI-1. Its importance in placental development is highlighted by the fact that SPINT1 knockout mice have severe growth restriction and embryonic lethality, due to failed placental development and function (Tanaka et al. (2005) supra). SPINT1 knockout mice have impaired formation of the labyrinth layer—a layer critically important in maternal/fetal exchange. Until now, the field has not considered the potential role that altered SPINT1 may have in human FGR. Another placental specific protein is SYNDECAN-1. The present invention determined that SPINT1 and SYNDECAN-1 are new markers of placental insufficiency.

Example 2

SPINT1 and SYNDECAN-1 as Markers of FGR

SPINT1 performs better than Placental Growth Factor (PlGF) as a marker of FGR. To date, PlGF has been considered the strongest biomarker for placental insufficiency. It is highly expressed by the placenta and reduced circulating levels have been associated with FGR (Benton et al. (2012) *Am J Obstet Gynecol* 206(163):e161-167; Griffin et al. (2015) *Ultrasound in obstetrics and genecology* 46:182-190).

FIGS. 1A through P are graphical representations showing circulating SPINT1 and SYNDECAN-1 measured in plasma using commercially available ELISAs. SPINT1 from Sigma Aldrich and SYNDECAN-1 from Thermo Fisher Scientific. sFLT-1 and PlGF were measured using diagnostic test assays from Roche. A case control cohort was selected from patients who provided a blood sample at 36 weeks gestation. SPINT1 levels (n=210 controls, n=104 SGA) were significantly reduced in patients that delivered a SGA baby (<10$^{th}$ centile; 1A,B) with an area under the receiver operator curve (AUC) of 0.75. When SYNDECAN-1 was measured in a case control cohort (1C,D; n=99 control, n=89 SGA), it was also found to be significantly reduced in women who subsequently delivered a SGA infant with a AUC of 0.73. In contrast, circulating sFLT-1 (1E,F; n=207 control, n=102 SGA) was significantly increased in women who delivered a SGA infant with an AUC of 0.58, whilst circulating PlGF (1G, H; n=210 controls, 104 SGA) was significantly reduced with an AUC of 0.66 (H). The superior clinical test characteristics of SPINT1 and SYNDECAN-1 were evidenced by a better Area under the ROC curve (AUC) than PlGF. Data expressed as mean+/−SEM—each symbol represents an individual patient $*p<0.05$, $****p<0.0001$.

Measuring just PlGF does not yield a diagnostic test that is efficacious enough to be integrated into clinical care. Measuring PlGF at 30-34 weeks plus assessment of maternal risk factors only has 58% sensitivity for identifying SGA infants delivered within 5 weeks, and only 34% sensitivity for those delivered beyond 5 weeks (at 90% specificity) [Bakalis et al. (2015) *Ultrasound in obstetrics and gynecology* 46:2089-215]. PlGF levels are also significantly lower among women with infants of birthweight <5th centile when measured at 35-37 weeks' gestation, but it adds surprisingly little predictive power to that of maternal risk factor assessment alone for the detection of the SGA (Fadigas et al. (2015) *Ultrasound in obstetrics and gynecology* 46:191-197). Refer to FIGS. 1A through P. Next, the results from the case control cohort were validated in a sample set consisting of 1004 samples collected at 36 weeks gestation. 920 controls and 84 cases where the mother subsequently delivered a SGA infant. Circulating SPINT1 was significantly reduced in women who subsequently delivered a SGA infant with an AUC of 0.74 (FIGS. 1I,J). Notably, the AUC for SPINT1 did not reduce—0.74 compared to 0.75 in the case/control set. Similarly, SYNDECAN-1 remained significantly reduced in women who delivered an SGA infant with an AUC of 0.65 (FIGS. 1K,L).

Next, the aim was to assess whether these proteins might be reduced in the maternal circulation at an earlier gestation among those destined to have an SGA fetus. To do this, a case control cohort was selected and we measured circulating SPINT1 (n=130 controls, n=104 SGA) and SYNDECAN-1 (n=100 control, n=84 SGA) at 28 weeks gestation. At 28 weeks gestation, SPINT1 was already significantly reduced in women who subsequently delivered a SGA baby with an AUC of 0.69 (FIGS. 1M,N). Similarly, SYNDECAN-1 was significantly reduced at 28 weeks gestation among those destined to deliver an SGA fetus with an AUC of 0.69 (FIGS. 1O,P). This was a particularly significant finding given the women with reduced plasma SPINT1 and SYNDECAN-1 may have not delivered their SGA baby until 10-12 weeks later. Notably, PlGF levels were not significantly altered at 28 weeks gestation. Data expressed as mean+/−SEM—each symbol represents an individual patient $****p<0.0001$.

When circulating SPINT1 concentrations measured in 1000 women, it was found that it strongly correlated across the continuum of birth weight centiles (2A,B), suggesting an intimate continuous relationship between circulating SPINT1 levels and fetal size.

At birth, a subset of babies had body fat mass and lean mass measured using a peapod machine, and also body fat percentage estimated by measurement of subcutaneous fat with calipers at the level of the infant's mid-triceps and subscapular regions. It was found that SPINT1 correlated with neonatal lean mass (2C) but not skinfold body fat percentage (2D).

Together, these data provide compelling evidence that circulating SPINT1 and SYNDECAN-1 are clinically useful biomarkers of fetal growth.

Example 3

SPINT1 is Reduced in FGR Placentas and by Hypoxia

This Example determines whether SPINT1 was reduced in FGR placentas and if this may be the reason for reduced circulating levels. FIGS. 3A through P are graphical representations showing observational studies to determine whether placental SPINT1 is altered in cases of human SGA. To do this, a cohort of placentas was selected from either control, preeclamptic or SGA pregnancies. SPINT1 mRNA was measured using quantitative RT-PCR and showed that in patients who delivered their baby at <34 weeks gestation SPINT1 mRNA was significantly reduced in both the preeclampsia and SGA cohort, compared to controls. No change in SPINT1 mRNA expression was detected in placentas collected from patients who delivered at >34 weeks gestation. SPINT1 protein expression was assessed using Western blot and commercially available antibodies. In samples collected at both <34 weeks gestation and >34 weeks gestation, SPINT1 protein was significantly reduced in the placentas from women delivering a SGA baby. Data expressed as mean+/−SEM—each symbol represents an individual patient or mouse $*p<0.05$, $p<0.01$, $*p<0.001$ $****p<0.0001$.

Given placental insufficiency is characterized by chronic placental hypoxia, it was next assessed whether hypoxia would reduce placental SPINT1 expression. Primary human trophoblast (ie placental cells isolated from placentas that were freshly delivered) was exposed to either 1% (hypoxia) or 8% (normoxia) oxygen ($O_2$).

The next step was to assess whether exposure of primary placental cells (cytotrophoblast cells isolated from term human placentas) to low oxygen conditions (1% v/v oxygen for hypoxia vs 8% v/v oxygen for normoxia) would alter SPINT1 mRNA and protein expression and protein secretion. mRNA expression was initially assessed by qRT-PCR and we found exposure of primary placental cells to hypoxia resulted in significantly reduced SPINT1 mRNA expression (3E), with a similar finding observed for cellular protein measured by Western blot (3F). Next measured was secretion of SPINT1 into the media that bathes the placental cells using the same ELISA that was used to measure plasma SPINT1 in the blood, and we found that the level of SPINT1 in the media was also significantly reduced when placental cells were rendered hypoxic (3G). Thus, strong evidence is obtained that placental hypoxia reduces SPINT1 transcription and protein production.

SPINT1 was assessed in a mouse model of FGR induced by maternal hypoxia. In this model, pregnant mice are exposed to hypoxia (10% inspired $O_2$) or normoxia (21% inspired $O_2$) [Higgins et al. (2016) *The Journal of physiology* 594:1341-1356] from E14-19 before being culled on E19.5 (note, term in mice is approximately day 20). Exposure of pregnant dams to hypoxia significantly compromises labyrinth zone formation (equivalent to the placental interface in human placenta), reducing the surface area and density of fetal capillaries and compromising substrate exchange and blood flow to the growing feto-placental unit. It was initially demonstrated that the placentas in which SPINT1 mRNA was measured had hypoxia-induced growth restricted fetuses but there was no change in placental weight (3H,I). It was subsequently shown that indeed placental SPINT1 mRNA expression was significantly reduced in the placentas of mice that were exposed to hypoxia (3J). Placental SPINT1 protein expression was then measured.

Again we confirmed this hypoxia reduced fetal weight but not placental weight (3K,L). In this set of animal studies we confirmed that placental SPINT1 protein was also significantly reduced under hypoxia (3M). Thus, strong evidence is obtained to indicate that SPINT1 is reduced in the placentas of SGA babies and that the reduction in SPINT1 may be associated with placental hypoxia.

Thus, these data show that hypoxia reduces placental SPINT1 expression and that SPINT1 is significantly reduced in the placentas of growth restricted fetuses. It is therefore likely that the decreased circulating SPINT1 concentrations observed in our FLAG cohort is of placental origin.

Next the inventors set out to assess whether silencing SPINT1 using siRNA knockdown in the HTR8 placental cell line would affect cellular proliferation assessed in real time using the xCELLigence system. Indeed, when the SPINT1 was silenced in HTR8 cells it was found that proliferation was impaired (3N).

The inventors sought to determine whether the reduced proliferation may be a result of enhanced apoptosis, the SPINT1 was silenced in HTR8 cells prior to collecting protein and measuring apoptosis markers BAX, BCL2 and cleaved caspase 3 by Western blot (3O). Whilst it found a significant reduction in SPINT1 protein expression was found as expected (top panel showing lack of bands under siSPINT), there was no significant change in expression of apoptosis markers, suggesting that the reduced proliferation when SPINT1 is silenced is not a result of increased apoptosis. B-actin was used as a loading control.

The inventors also sought to determine whether enhancing SPINT1 would alter HTR8 placental cell line proliferation. To do this, a commercially available SPINT1 mimetic called SRI31215 (Glixx laboratories) was administered to HTR8 cells and proliferation monitored using the xCELLigence system. It was found that 5 or 10 uM of SRI31215 enhanced HTR8 proliferation.

Example 4

SPINT1 is Critical to Normal Placental Function

The aims of this Example are: to characterize the expression of matriptase in FGR placentas and assess the effect of reduced placental SPINT1 on matriptase activity in isolated trophoblast cells; to assess the effect of reduced placental SPINT1 on normal human placental cell function, including syncytialization, invasion and proliferation; and to characterize the precise timing of SPINT1 dependency for normal placental development using a conditional placental SPINT1 knockout mouse model.

General experimental approach: Normal and FGR placental samples are collected from women who are delivering by caesarean section (to avoid the confounding effects of labour). First trimester samples are obtained from elective termination of pregnancy cases. Two placental primary tissue types are used: 1) human placental explants (5 mm$^3$ placental pieces) and 2) primary isolated trophoblast cells from either term or first trimester placentas (Kaitu'u-Lino et al. (2014) *Pregnancy hypertension* 4:287-295). Equal numbers of placentas are obtained from both male and female pregnancies. Details on methods for trophoblast isolation, placental explant culture, RNA extraction, qPCR, or Western blot are disclosed in Kaitu'u-Lino et al. (2014) supra; Brownfoot et al. (2015) *Am J Obstet Gyneocol*; Brownfoot et al. (2015) *Hypertension* 66:687-697; Kaitu'u-Lino et al. (2012) *The American journal of pathology* 180:888-894; Tong et al. (2015) *Hypertension* 66:1073-1081; Onda et al. (2017) *Hypertension* 69:457-468; Kaitu'u-Lino et al. (2017) *Hypertension* 70:1014-1024.

Statistics (for entire document): Normally distributed data were compared using parametric tests; non-normally distributed data are compared with non-parametric tests. Primary trophoblast experiments are repeated 4-5 times and placental explant studies 5-7 times (as there is increased variability). Biological replicates were done on samples from different patients and each experiment was done in triplicate. Statistical analysis was performed on the median (or means) from the biological replicate experiments. For animal studies, linear mixed model repeated measures was used, which take into account that each fetus is a repeat measure in a litter.

To characterize the expression of matriptase in FGR placentas and assess the effect of reduced placental SPINT1 on matriptase activity in isolated trophoblast cells. As a protease inhibitor, SPINT1 targets 3 known proteases—one of which is matriptase. SPINT1 knockout in mice results in failed placental development, embryonic lethality and elevated matriptase levels. Simultaneous knockout of SPINT1 and matriptase rescued placental development and embryonic lethality, demonstrating that increased matriptase activity contributes to the placental defects and embryonic lethality (Szabo et al. (2007) *Oncogene* 26:1546-1556; Szabo et al. (2014) *PLoS genetics* 10:e1004470). mRNA, protein expression and localization of matriptase in FGR placentas (same cohorts used in FIG. 2) are characterized. The effect of silencing SPINT1 is assessed on matriptase activity in human placental cells. SPINT1 is silenced in isolated primary trophoblast using siRNA, and matriptase activity measured using commercially available assays to determine if activity is increased as seen in mouse placentas. Both term trophoblast and first trimester trophoblast are assessed. A second model of reduced SPINT1 is induced by placental hypoxia. Exposing isolated primary trophoblast to hypoxia (1% Oxygen) reduces SPINT1 (FIG. 3). Primary trophoblast and placental explants to hypoxia (1% oxygen) or normoxia (8% oxygen) to reduce SPINT1 expression and measure the effect on matriptase activity.

This provides the first evidence that reduced SPINT1 results in excessive matriptase activity in primary human placental cells.

To assess the effect of reduced placental SPINT1 expression on placental cell invasion, migration and syncytialization. Placental insufficiency and FGR are associated with poor placental growth, including reduced trophoblast invasion, migration and proliferation. In addition, evidence from mouse models (Tanaka et al. (2005) supra; Szabo et al. (2007) supra) suggest a critical role for SPINT1 in the establishment of the maternal/fetal interface, the labyrinth zone. The effect of SPINT1 knockdown is assessed on trophoblast invasion, migration and proliferation. Evidence is provided that silencing SPINT1 in a trophoblast cell line, HTR8 cells, results in reduced proliferation. The effect of SPINT1 knockdown (using siRNA) on HTR8 and first trimester trophoblast migration, invasion and proliferation using xCELLigence. Syncytialization is initially assessed in isolated term trophoblast. These cells spontaneously syncytialize in culture (Kaitu'u-Lino et al. (2014) supra). SPINT1 is silenced using siRNA and measure the effect on syncytialization over time by measuring markers of this process including human chorionic gonadotrophin (via ELISA) and loss of E-cadherin (PCR, Western blot and immunofluorescence). Also determined is whether reduced placental SPINT1 increases apoptosis (Caspases 3 and 9, BCL2 and Bax expression, via Western blot).

This demonstrates that loss of SPINT1 expression in human placental cells results in impaired placental cell function and development.

To characterize SPINT1 in normal murine placental development using a conditional placental SPINT1 knockout mouse model. The inventors can facilitate knockdown or overexpression of genes specifically in the placenta in mice via lentiviral transduction of genes (or shRNAs) into the cells that go on to form the placenta (trophectoderm) [Onda et al. (2017) supra]. Transduced blastocysts are then transferred into a recipient dam (Onda et al. (2017) supra; Kumasawa et al. (2010) *Proc Natl Acad Sci USA*) allowing formation of a genetically modified placenta, with unaffected mother and pup. This model is to silence SPINT1 only in the placenta.

Data from Tanaka et al. (2005) supra and Szabo et al. (2007) supra demonstrate that knockout of SPINT1 in mice results in failed placental development and growth restriction by embryonic day (E) 9.5 and embryonic lethality between days E10.5-12.5. A conditional lentivirus that can knockdown placental SPINT1 expression at specific predetermined intervals throughout gestation is used. This is achieved by including an inducible tetracycline promoter in the lentiviral plasmid backbone, which is only induced when the mother receives doxycycline (Fan et al. (2012) *Endocrinology* 153:5637-5644). Inducible promoters are employed, demonstrating this technology. A fluorescently tagged doxycycline-responsive transactivator protein that has high sensitivity to doxycycline (Fan et al. (2012) supra; Moutier et al. (2003) *Transgenic research* 12:369-373) is used. In mice, the labyrinth zone develops from approximately E8.5-9, when the villi begin to extend and branch (Anson-Cartwright et al. (2000) *Nat Genet* 25:311-314). Given the lack of labyrinth zone in SPINT1 knockout mice (Tanaka et al. (2005) supra) the inclusion of doxycycline in the drinking water is initiated on E6.5, E8.5, E9.5, E10.5, E11.5 and E12.5; consumption of doxycycline containing water will activate the lentivirus resulting in the silencing of SPINT1 expression at these specific gestations. Two control groups were used: 1) mice with blastocysts transferred containing an empty lentivirus to control for any doxycycline effects; and 2) mice that have the SPINT1 shRNA transfected but do not receive doxycycline. Pregnant dams are culled 4 days after introduction of doxycycline or vehicle control to assess: 1) placental and circulating SPINT1 mRNA (PCR) and protein expression (Western blot) to confirm knockdown; 2) fluorescent localisation to confirm trophoblast transfection; 3) placental size and morphology; and 4) litter size, fetal growth (including fetal weight, crown-rump length, limb, and liver and brain weight to assess symmetry of growth restriction and brain sparing effect). Placental parameters are measured, including markers of labyrinth development (e-cadherin and β-catenin) and assess trophoblast density, maternal blood spaces and fetal blood vessels.

This determines the precise gestational window at which SPINT1 is required for placental development and established a new mouse model of fetal growth restriction. Collectively these data demonstrate that reduced placental SPINT1 increases expression and activity of the protease matriptase in human cells, which in turn impairs placental development. In addition, a mouse model of conditional SPINT1 knockdown, which serves as a new mouse model of FGR that can be used to test potential therapeutics is developed.

Example 5

SPINT1 as a Potential Diagnostic Marker for Placental Insufficiency

SPINT1 is a new marker of FGR. Improving the detection of FGR in all stages of pregnancy is the crucial first step to improving perinatal outcomes, yet reliable screening strategies are currently lacking. As outlined earlier, SPINT1 holds great potential as a clinically useful diagnostic biomarker, being significantly reduced as early as 12 weeks preceding delivery of a SGA infant at term in the FLAG cohort. Although PlGF is one of the most widely studied markers of placental insufficiency, data from FLAG suggest it does not perform as well as SPINT1. In recent years a ratio of PlGF and anti-angiogenic molecule sFlt-1 has been assessed for its biomarker potential, with reports this ratio is associated with an increased risk of stillbirth (Chaiworapongsa et al. (2013) *Obstet Gynecol* 208(287):e281-287, e215). PlGF and sFlt-1 were measured using 36-week samples and the sensitivity as a biomarker test determined (at a fixed 90% specificity). It was found that whilst the performances of PlGF or sFlt1/PlGF ratio are modest in predicting FGR (sensitivity of 29% and 27%, respectively), SPINT1 alone already has a sensitivity of 40%. Interestingly, adding SPINT1 to the sFlt1/PlGF ratio significantly improved the detection of babies destined to be born SGA to 48%: more than twice the number detected with current routine care (tape measure and selective ultrasound), and indeed approaching the detection rate of universal ultrasound (Paiva et al. (2011) *J Clin Endocrinol Metab* 96:E1807-1815; Moutier et al. (2003) supra). Therefore, the combination of SPINT1 with sFlt1/PlGF is proposed representing a clinically useful blood-test.

The FLAG data suggest that SPINT1+/−sFlt1/PlGF holds promise as a useful biomarker for term SGA. This finding warrants validation in an independent cohort, but it would also be useful to determine whether this biomarker approach has clinical utility in improving detection of preterm FGR. This is important since these pregnancies benefit from increased surveillance, and be candidates for trials of future therapeutic interventions. Therefore, a cohort is used which provides an opportunity to determine whether SPINT1 at 28 weeks is a useful predictor of SGA, including those with severe early onset FGR. Measuring PlGF+/−sFlt1 will also allow us to assess if it can add to the predictive performance of these proposed biomarkers. It is proposed that SPINT1 will be lower at 28 weeks among those destined to deliver an SGA fetus in the cohort.

Example 6

SYNDECAN-1

See FIGS. 4A-C. As observed for SPINT1, circulating maternal SYNDECAN-1 measured at 36 weeks gestation (Expressed as multiples of the median (MOM)) appeared to be positively correlated with birth centile. Fetal parameters were also assessed were also assessed at birth and found that circulating maternal SYNDECAN-1 measured at 36 weeks gestation significantly correlated with both neonatal lean mass and skinfold body fat percentage.

FIGS. 5A through E are a graphical representations showing observational studies to determine whether placental SYNDECAN-1 is altered in cases of human SGA. To do this, a cohort of placentas was selected from either control, preeclamptic (PE) or SGA pregnancies (same cohort used to measure SPINT1). SYNDECAN-1 mRNA was measured using quantitative RT-PCR and showed that in patients who delivered their baby at <34 weeks gestation placental SYNDECAN-1 mRNA was significantly increased in both the PE and SGA cohort compared to controls. Protein expression was subsequently measured. The commercial antibody used for Western blot produced 3 different bands, possibly corresponding to different isoforms of SYNDECAN-1. Densiometric analysis of these bands indicated that the 85 and 80 kDa bands were not changed, whilst the 33 kDa band was significantly reduced in SGA placentas. SYNDECAN-1 mRNA expression was subsequently measured in placentas delivered at >34 weeks gestation and found no significant alteration in expression. Data expressed as mean+/−SEM—each symbol represents an individual patient $*p<0.05$, $p<0.01$, $*p<0.001$ $****p<0.0001$.

Given the association between SGA and placental hypoxia, FIGS. 6A through F are diagrammatic representations demonstrating the effect of placental hypoxia on syndecan mRNA and protein expression using the same samples assayed for SPINT1 in FIG. 3. qRT-PCR indicated that hypoxia induced a significant reduction in SYNDECAN1 mRNA expression (A). Whilst Western blot demonstrated no significant change in total protein expression (B), SYNDECAN-1 protein secretion from primary placental cells exposed to hypoxia was significantly reduced (C).

Murine SYNDECAN-1 expression in the placentas obtained from pregnant mice exposed to hypoxia and association with small fetuses was also measured. In those same samples in which we found reduced murine SPINT1 expression, we found no significant change in syndecan-1 mRNA (6D) or protein expression (6E).

When SYNDECAN-1 was silenced (using siRNA) in placental cell line HTR8s, there was reduced cellular proliferation (6F; measured using the xCELLigence system).

Example 7

Macrosomia

It is proposed herein that elevated levels of SPINT1 and/or SYNDECAN-1 are indicators of fetal macrosomia. Levels of either or both biomarkers are detected and measured as described herein alone or in combination with levels of other biomarkers and/or physiochemical data such as from an ultrasound and results correlated with fetal or post-natal weight. Overweight babies including those over 4 kg at birth are deemed macrosomia babies. The ability to detect potential macrosomia babies in utero can assist in clinical management of the pregnancy.

Example 8

SPINT1 is a Diagnostic Marker for Placental Insufficiency

This study investigated the association between SPINT1 and various clinical parameters of placental insufficiency in a prospective collection of blood samples from pregnant women at 28 ($27^{+0}$-$29^{+0}$) and 36 ($35^{+0}$-$37^{+0}$ days) weeks gestation from a tertiary referral hospital in Melbourne Australia. This study was approved by the Mercy Health Research Ethics Committee (Ethics Approval Number R14/12) and written informed consent was obtained from all participants.

The cohort was divided approximately in half to discover, and then subsequently validate, biomarkers, including SPINT1. Samples from the first 997 consecutively recruited participants constituted cohort 1 (Table 2) and those from the second 999 consecutively recruited participants constituted cohort 2 (Table 3).

TABLE 2

Maternal characteristics and pregnancy outcomes for Cohort 1. Data presented as mean (standard deviation) if normally distributed data, as median [$25^{th}$-$75^{th}$ percentile] if not normally distributed data, and as number (%) if categorical. Small-for-gestational age defined as birthweight <10th centile:

| | Small-for-gestational-age N = 106 (10.6%) | Controls N = 895 (89.4%) | P |
|---|---|---|---|
| Age | 32.3 (4.3) | 32.6 (4.3) | 0.46 |
| Booking body mass index | 23.8 [21.5-28.5] | 24.1 [21.7-27.4] | 0.64 |
| Nulliparous | 60 (56.6%) | 438 (48.9%) | 0.15 |
| Cigarette Smoking | | | |
| Current | 9 (8.5%) | 23 (2.6%) | 0.004 |
| Ex-smoker | 26 (24.5%) | 203 (22.7%) | |
| Never | 71 (67.0%) | 669 (74.7%) | |
| Gestational Diabetes Mellitus | 19 (17.9%) | 119 (13.2%) | 0.18 |
| Preeclampsia | 7 (6.6%) | 32 (3.6%) | 0.18 |
| Onset of labour | | | |
| Spontaneous | 38 (35.8%) | 444 (49.6%) | 0.01 |
| Induced | 49 (46.2%) | 297 (33.2%) | |
| No labour | 19 (17.9%) | 154 (17.2%) | |
| Mode of birth | | | |
| Normal vaginal birth | 48 (45.3%) | 446 (49.8%) | 0.62 |
| Instrumental delivery | 22 (20.8%) | 158 (17.7%) | |
| Caesarean section | 36 (34.0%) | 291 (32.5%) | |
| Gestation at delivery (weeks$^{+days}$) | $39^{+0}$ [$38^{+0}$-$40^{+0}$] | $39^{+5}$ [$38^{+6}$-$40^{+3}$] | <0.0001 |
| Birthweight (g) | 2728 [2448-2955] | 3510 [3250-3800] | <0.0001 |
| Birthweight centile | 5.4 [2.7-8.2] | 50.7 [30.0-75.0] | <0.0001 |

TABLE 3

Maternal characteristics and pregnancy outcomes for Cohort 2. Data presented as mean (standard deviation) if normally distributed data, as median [$25^{th}$-$75^{th}$ percentile] if not normally distributed data, and as number (%) if categorical. Small-for-gestational age defined as birthweight <10th centile:

| | Small for gestational age N = 105 (10.5%) | Controls N = 897 (89.5%) | P |
|---|---|---|---|
| Age | 33.2 (4.2) | 32.3 (4.1) | 0.04 |
| Booking body mass index | 24.7 [22.1-28.7] | 24.4 [22.0-27.7] | 0.11 |
| Nulliparous | 44 (41.9%) | 399 (44.5%) | 0.68 |
| Cigarette Smoking | | | |
| Current | 9 (8.6%) | 22 (2.5%) | 0.002 |
| Ex-smoker | 20 (19.0%) | 208 (23.2%) | |
| Never | 76 (72.4%) | 667 (74.4%) | |
| Gestational Diabetes Mellitus | 9 (8.6%) | 114 (12.7%) | 0.27 |
| Preeclampsia | 7 (6.7%) | 39 (4.3%) | 0.32 |
| Onset of labour | | | |
| Spontaneous | 42 (40.0%) | 407 (45.4%) | 0.51 |
| Induced | 42 (40.0%) | 312 (34.8%) | |
| No labour | 21 (20.0%) | 178 (19.8%) | |
| Mode of Birth | | | |
| Normal vaginal birth | 54 (51.4%) | 437 (48.7%) | 0.21 |
| Instrumental delivery | 11 (10.5%) | 154 (17.2%) | |
| Caesarean section | 40 (38.1%) | 306 (34.1%) | |
| Gestation at delivery (weeks$^{+days}$) | $39^{+1}$ ($1^{+2}$) | $39^{+3}$ ($1^{+1}$) | 0.02 |

TABLE 3-continued

Maternal characteristics and pregnancy outcomes for Cohort 2. Data presented as mean (standard deviation) if normally distributed data, as median [25$^{th}$-75$^{th}$ percentile] if not normally distributed data, and as number (%) if categorical. Small-for-gestational age defined as birthweight <10th centile:

|  | Small for gestational age N = 105 (10.5%) | Controls N = 897 (89.5%) | P |
| --- | --- | --- | --- |
| Birthweight (g) | 2750 [2590-2930] | 3450 [3190-3740] | <0.0001 |
| Birthweight centile | 5.4 [3.0-7.5] | 46.9 [28.3-70.6] | <0.0001 |

347 nulliparous women in the FLAG study were also recruited to undergo more intensive studies (FLAG B cohort). They had ultrasound assessments at 36 weeks' gestation to measure blood flow resistance in the uterine, umbilical and the fetal middle cerebral arteries. Where possible, neonatal body composition (lean body mass and fat mass) was measure within 4 days of birth by performing air displacement plethysmography studies using a PEAPOD device.

Women were screened for eligibility and invited to participate at their oral glucose tolerance test, universally offered around 28 weeks' gestation to test for gestational diabetes mellitus. English-speaking women aged over 18 years, with a singleton pregnancy and normal mid-trimester fetal morphology examination were eligible to participate. Samples from women where an SGA fetus was suspected at the time of blood sampling were not excluded. Participants donated blood samples at between 27+0 to 29+0 weeks' and/or 35+0 to 37+0 weeks' gestation inclusive. Whole blood was collected in a 10 ml ethylenediaminetetraacetic acid tube. Plasma was stored at −80° C. until the time of sample analysis.

Maternal characteristics and pregnancy outcomes were obtained following a review of each participant's medical record, investigation results and hospital database entry, by a single clinician, blinded to any protein levels. Infant birthweights were assigned a customised centile using the GROW software1 (www.gestation.net), which generates a 'term optimal weight' based on an optimised fetal weight standard, adjusted for the following: maternal height, weight and parity; infant sex; and exact gestational age. Coefficients for the Australian dataset of GROW were informed by a local dataset; the multiple regression model has a constant to which weight is added or subtracted for each of the adjusted variables. SGA was defined as customised birthweight <10$^{th}$ centile. Circulating protein levels among SGA cases were compared to those of the controls.

Some nulliparous participants were also involved in the ultrasound-based arm of the FLAG study, referred to herein as FLAG B. For this, 347 women underwent a 36 (35$^{+0}$-37$^{+0}$) week ultrasound assessment where transabdominal colour and pulsed-wave Doppler were used to measure the mean maternal uterine artery pulsatility index (PI) and the umbilical artery PI. Measurements were taken during periods of fetal apnoea and inactivity with the angle of insonation close to zero. The umbilical artery PI was measured in a free loop of umbilical cord away from cord insertion sites. For the maternal uterine artery the probe was placed in each of the iliac fossae, and the waveform recorded within 1 cm of the uterine artery crossing the external iliac artery2. PI values were measured in triplicate and the mean calculated. Average uterine artery PI values were obtained for both the right and left vessels, and these averaged to provide the overall mean PI. For each of the PI values, the gestation-dependent centile (if normally distributed), or the multiples of the median (MoM) were determined. Treating clinicians were blinded to the uterine artery PI results.

Using the data from cohort 2 (the validation run of markers discovered in cohort 1), the diagnostic performance of potential markers was measured, either alone or in combination, to predict neonates born at birthweight centiles; <20th, <10th, <5th and <3rd; and birthweight <5th centile but also required nursery admission. The specificity was set at around 90%, which equates to a 10% screen positive rate.

Ultrasounds were performed at 36 weeks gestation in a subgroup of 347 nulliparous women (spread across cohort 1 and 2), followed by air displacement plethysmography (PEAPOD) on the neonates after birth (FLAG B). SPINT1 was negatively correlated with the uterine artery (FIG. 7a) but not umbilical artery Doppler velocity (FIG. 8a) measured at 36 weeks gestation and was positively correlated with neonatal lean mass (FIG. 7b) but not fat mass (FIG. 8b,c). SPINT1 was also strongly correlated with placental weight (FIG. 2c). In contrast, the associations between PlGF and these indicators of placental insufficiency were either not significant, or more modest (FIG. 9). We also found a step-wise decrease in plasma SPINT1 concentrations between controls (>10th centile) and decreasing birthweight centiles (FIG. 7d). Plasma SPINT1 concentrations at 36 weeks were continuously correlated across all birthweight centiles (FIG. 7e).

These data show that circulating SPINT1 concentrations are correlated with several clinical parameters that are associated with placental insufficiency in a high risk cohort from a different country.

Example 9

SYNDECAN-1 and SPINT1 are Validated as Diagnostic Markers of Placental Insufficiency The data presented in this study illustrate the association between SPINT1 or SYNDECAN-1 and various clinical parameters of placental insufficiency in a larger cohort of samples. The data include some of the data described above, expanded to include whole cohorts of up to 2040 women.

When SPINT1 was validated in the entire cohort of n=1996 samples (1785 controls, 211 cases of SGA) at 36 weeks, the data confirmed that the concentration of SPINT1 was significantly reduced in women who subsequently delivered an SGA infant (FIG. 10A) with an AUC of 0.688 (FIG. 10B). When examining the entire cohort of n=1996, a strong association was confirmed with birth centile (FIGS. 10C-D).

Similarly, when SYNDECAN-1 was validated in the entire cohort, the concentration of SYNDECAN-1 was significantly reduced in women who subsequently delivered a SGA infant (FIG. 10E) with an AUC of 0.61 (FIG. 10F). The data also showed an association with birth centile in the entire cohort (FIGS. 10G-H).

The data shown in FIGS. 11A through C validate SPINT1 changes at 28 weeks in the entire cohort of n=2040 (n=1827 controls, n=213 cases). The data confirm that circulating SPINT1 at 28 weeks was significantly reduced in women who delivered an SGA infant (FIG. 11A) with an AUC of 0.60 (FIG. 11B). At 28 weeks gestation, SPINT1 continuously correlated with birth weight centile (FIG. 11C).

The data shown in FIGS. 12A through D validate changes in plasma SPINT1 at 36 weeks and show the association with markers of placental insufficiency in a larger cohort.

Plasma SPINT1 concentrations at 36 weeks' gestation were correlated with uterine artery (UA) Doppler flow resistance (FIG. 12A, n=325), lean mass of the neonate (FIG. 12B, n=281), and placental weight (FIG. 12C, n=378). There was a step-wise reduction in plasma SPINT1 concentration in women whose babies were subsequently born with a birthweight below the $10^{th}$ centile (FIG. 12D).

The data shown in FIGS. 13A through D validate changes in plasma SPINT1 and SYNDECAN-1 in an independent cohort of samples that were collected from women on the day they delivered their baby. SPINT1 was significantly reduced in women carrying a SGA infant (baby less than $10^{th}$ centile; FIG. 13A, B, n=47 SGA and n=509 controls). Similarly SYNDECAN-1 was also significantly reduced in the same women carrying a SGA infant (FIG. 13C,D).

Example 10

Development and Validation of Diagnostic Tests to Predict Low Birthweight—The 4-Tier Risk Assessment Model A 4-tier model of risk for different low birthweight ranges was developed (cohort 2), then validated (cohort 1), based on different SPINT1 MoM cut offs levels. These cut-off levels were arbitrarily chosen when developing the test in cohort 2. The investigators prospectively agreed to setting these thresholds, which were subsequently applied to cohort 1 for validation. For statistical analyses, data were summarized as mean (SD), median [$25^{th}$-$75^{th}$ percentile], median (minimum, maximum) and number (%) according to distribution. Hypothesis testing between SGA status used Mann-Whitney rank sum test for continuous and Fisher's exact test for categorical data. Predictive performance, presented as point estimate and Wilson based 95% confidence intervals, was assessed using area under receiver operating characteristic curve (ROC area), sensitivity at 90% specificity and positive (PPV) and negative (NPV) at prevalence of the data. Significance level was set at 0.05 and no adjustment was made for multiple comparisons. Statistical software used was Stata v15 (StataCorp. 2017. Stata Statistical Software: Release 15. College Station, TX: StataCorp LLC) and diagt program (Summary statistics for diagnostic tests. P. T. Seed and A. Tobias. Reprinted in Stata Technical Bulletin Reprints, vol. 10, pp. 90-93, from http://fmwww.bc.edu/RePEc/bocode/d last accessed 1 Nov. 2018) or Graphpad Prism 6 (GraphPad Software, LA Jolla, CA).

Circulating SPINT1 concentrations <0.63 MoMs at 36 weeks' gestation in cohort 2 identified a group with an elevated risk of birthing low birthweight infants (table 1). Significantly, 46.5% who screened positive had a birth-weight centile <20th. We validated the diagnostic test performance of this SPINT1 cut-off in cohort 1 from the FLAG study (Table 4).

TABLE 4

Diagnostic performance of a SPINT1 MoM <0.63 in detecting various degrees of low birthweight neonates at birth. Cohort 2 (n = 999) was used to set the threshold of SPINT1 MoM as <0.63, and Cohort 1 (n = 997) was used to validate the test performance with this set threshold.

|  | Birthweight <$3^{rd}$ centile | Birthweight <$5^{th}$ centile | Birthweight <$10^{th}$ centile | Birthweight <$20^{th}$ centile | Birthweight <5th centile and nursery admission |
|---|---|---|---|---|---|
| Cohort 2: Threshold Setting | | | | | |
| Positive Predictive Value | 14.1% (7.0-24.4) | 19.7% (11.2-30.9) | 28.2% (18.1-40.1) | 46.5% (34.5-58.7) | 7.0% (2.3-15.7) |
| Negative Predictive Value | 98.3% (97.2-99.0) | 96.3% (94.9-97.4) | 90.8% (88.8-92.6) | 78.2% (75.4-80.8) | 99.7% (99.1-99.9) |
| Risk ratio (95% CI) | 8.2 (3.8-17.3) | 5.3 (3.0-9.6) | 3.1 (2.0-4.7) | 2.1 (1.6-2.8) | 21 (5.3-89) |
| Sensitivity | 38.5% (20.2-59.4) | 29.2% (17.0-44.1) | 19.0% (12.0-27.9) | 14.0% (9.9-19.2) | 62.5% (24.5-91.5) |
| Specificity | 93.7% (92.0-95.2) | 94.0% (92.3-95.4) | 94.3% (29.6-95.7) | 95.0% (93.2-96.5) | 92.5% (91.6-94.8) |
| Cohort 1: Validation | | | | | |
| Positive Predictive Value | 13.8% (8.1-21.4) | 19.8% (13.0-28.3) | 31.9% (23.6-41.2) | 45.7% (36.4-55.2) | 8.6% (4.2-15.3) |
| Negative Predictive Value | 98.6% (97.6-99.3) | 97.2% (95.8-98.2) | 92.2% (90.2-93.9) | 82.5% (79.8-85.0) | 99.7% (99.0-99.9) |
| Risk ratio (95% CI) | 10.1 (4.9-20.9) | 7.0 (4.1-11.9) | 4.1 (2.9-5.8) | 2.6 (2.0-3.3) | 25.3 (7.1-90.7) |
| Sensitivity | 57.1% (37.2-75.5) | 47.9% (33.3-62.8) | 34.9% (25.9-44.8) | 25.6% (19.8-32.1) | 76.9% (46.2-95.0) |
| Specificity | 89.7% (87.6-91.5) | 90.2% (88.1-92.0) | 91.1% (89.1-92.9) | 92.0% (89.9-93.8) | 89.2% (87.1-91-1) |

Using cohort 2, a 4-tier risk model was developed based on different SPINT1 MoM concentrations (Table 5).

TABLE 5

Development and validation of a 4-tier risk model for delivery of neonates with different low birthweight cut-offs. Risk model developed by selecting different thresholds of circulating levels SPINT1 MOM concentrations measured among pregnant women at 35 + 0-37 + 0 weeks' gestation in cohort 2. The same set thresholds were then applied to cohort 1.

| TIER | SPINT1 MoM cut-off | % (no) within tier | Birthweight <$3^{rd}$ centile | Birthweight <$5^{th}$ centile | Birthweight <$10^{th}$ centile | Birthweight <$20^{th}$ centile | Birthweight <$5^{th}$ centile and nursery admission |
|---|---|---|---|---|---|---|---|
| % INCIDENCE Cohort 2: Threshold Setting | | | | | | | |
| 1: High risk | <0.63 | 7.1% (71) | 14.1% | 19.7% | 28.2% | 46.5% | 7.0% |
| 2: Normal risk | 0.63-1.1 | 57.0% (569) | 2.3% | 4.4% | 11.8% | 27.4% | 0.4% |
| 3: Lower risk | 1.1-1.6 | 26.8% (268) | 1.1% | 3.0% | 6.3% | 14.9% | 0.4% |
| 4: Lowest risk | >1.6 | 9.1% (91) | 0.0% | 1.1% | 1.1% | 6.6% | 0.0% |
| % INCIDENCE Cohort 1: Validation | | | | | | | |
| 1: | <0.63 | 11.6% (116) | 13.8% | 19.8% | 31.9% | 45.7% | 8.6% |
| 2: | 0-63-1.1 | 52.1% (519) | 1.5% | 3.5% | 10.0% | 21.4% | 0.2% |
| 3: | 1.1-1.6 | 28.6% (285) | 1.4% | 2.1% | 5.6% | 12.3% | 0.7% |
| 4: | >1.6 | 7.7% (77) | 0.0% | 1.3% | 1.3% | 10.4% | 0.0% |

Those among the highest tier of risk (71% of cohort 2 with the lowest SPINT1 MoMs) had 14·1%, 19·7%, 28·2% and 46·5% risk of delivering neonates with birthweights <3rd, <5th, <10th and <20th centiles respectively. In contrast, those within the lowest tier of risk (9.1% of cohort 1) had 0·0%, 1·1%, 1·1% and 6·6% risk of birthing neonates at <3rd, <5th, <10th and <20th centiles. The model validated in cohort 1 with very similar diagnostic performance (Table 7).

Rates of birthing infants at these birthweight centiles compared to the baseline population prevalence in the cohorts were elevated by 2-5 fold if circulating SPINT1 concentrations were within tier 1 (highest risk). They were similar to the background population prevalence for tier 2, around half of the population prevalence in tier 3, and were very low in tier 4 (Table 7).

These data demonstrate the development and validation of a 4-tier risk model that identifies cohorts at high or low risk of birthing a neonate of low birthweight centile where presumably, it also identifies unborn fetuses at low weights and at increased risk of stillbirth. This 4-tier risk model is able to assign a level of risk that is different from the baseline prevalence in just under half of the population who have the test (tiers 1, 3 and 4). This 4-tier risk model is useful for the clinic where those in tier 1 may be offered a planned birth at term, and those within tier 3-4 may be reassured.

Those skilled in the art will appreciate that the disclosure described herein is susceptible to variations and modifications other than those specifically described. It is to be understood that the disclosure contemplates all such variations and modifications. The disclosure also enables all of the steps, features, compositions and compounds referred to or indicated in this specification, individually or collectively, and any and all combinations of any two or more of the steps or features or compositions or compounds.

BIBLIOGRAPHY

Anson-Cartwright et al. (2000) *Nat Genet* 25:311-314
Bakalis et al. (2015) *Ultrasound in obstetrics and genecology* 46:2089-215
Barker (1998) *Clinical Science* 95:115-128
Barker (2000) *Theriogenology* 53:555-574
Barker and Osmond (1986) *Lancet* 1:1077-1081
Benton et al. (2012) *Am J Obstet Gynecol* 206(163):e161-167
Brownfoot et al. (2015) *Am J Obstet Gyneocol*
Brownfoot et al. (2015) *Hypertension* 66:687-697
Chaiworapongsa et al. (2013) *Obstet Gynecol* 208(287): e281-287, e215
Cooper et al. (1997) *Annals of the Rheumatic Disease* 56:17-21
Fadigas et al. (2015) *Ultrasound in obstetrics and genecology* 45:559-565
Fadigas et al. (2015) *Ultrasound in obstetrics and synecology* 46:191-197
Fan et al. (2012) *Endocrinology* 153:5637-5644
Griffin et al. (2015) *Ultrasound in obstetrics and genecology* 46:182-190
Hales and Barker (1992) *Diabetologia* 35:595-601
Higgins et al. (2016) *The Journal of physiology* 594:1341-1356
Kaitu'u-Lino et al. (2012) *The American journal of pathology* 180:888-894

Kaitu'u-Lino et al. (2014) *Pregnancy hypertension* 4:287-295
Kaitu'u-Linao et al. (2017) *Hypertension* 70:1014-1024
Kumasawa et al. (2010) *Proc Natl Acad Sci USA*
Miller et al. (2016) *The Journal of Physiology* 594:807-823
Mifsud and Sebire (2014) *Fetal diagnosis and therapy* 36:117-128
Moutier et al. (2003) *Transgenic research* 12:369-373
Onda et al. (2017) *Hypertension* 69:457-468
Paiva et al. (2011) *J Clin Endocrinol Metab* 96:E1807-1815
Sovio et al. (2015) *Lancet* 386:2089-2097
Szabo et al. (2007) *Oncogene* 26:1546-1556
Szabo et al. (2014) *PLoS genetics* 10:e1004470
Tanaka et al. (2005) *Mol Cell Biol* 25:5687-5698
Tong et al. (2015) *Hypertension* 66:1073-1081

The invention claimed is:

1. A method of treating a pregnant human subject carrying a small for gestational age (SGA) fetus or a fetus with fetal growth restriction (FGR), said method comprising:
 (a) obtaining a sample of whole blood, plasma, or serum from a pregnant human subject that is at least 15 weeks gestation;
 (b) incubating the sample with an antibody that binds to maternal SPINT1 protein to determine the level of circulating maternal SPINT1;
 (c) determining that the pregnant human subject is carrying a SGA fetus or a fetus with FGR when the level of circulating maternal SPINT1 protein is (i) decreased relative to a control level that is representative of a level of circulating maternal SPINT1 protein in a pregnant human subject with adequate placental sufficiency, or (ii) has decreased over time; and
 (d) treating the pregnant human subject carrying a SGA fetus or fetus with FGR by pre-term delivery of the fetus.

2. The method of claim 1, wherein step (b) further comprises measuring an amount of at least one other biomarker and/or physiochemical parameter and/or clinical risk factors.

3. The method of claim 2, wherein the physiochemical parameter is generated by ultrasound or physical measurement.

4. The method of claim 1, further comprising, prior to pre-term delivery of the fetus, assessing the pregnant human subject for one or more risk factors associated with SGA or FGR.

5. The method of claim 1, wherein the delivered fetus is of small for gestational age (SGA).

6. The method of claim 1, wherein the sample is obtained from the pregnant human subject at from about 27 to about 36 weeks gestation.

7. The method of claim 6, wherein the sample is obtained from the pregnant human subject at from about 27 to about 29 weeks gestation.

8. The method of claim 1, wherein the sample is obtained from the pregnant human subject at from at least about 28 weeks gestation.

* * * * *